US008559308B2

(12) United States Patent
Imai et al.

(10) Patent No.: US 8,559,308 B2
(45) Date of Patent: Oct. 15, 2013

(54) DATA TRANSMISSION APPARATUS FOR DISTRIBUTING PACKETS

(75) Inventors: Satoshi Imai, Kawasaki (JP); Akiko Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 589 days.

(21) Appl. No.: 12/701,086

(22) Filed: Feb. 5, 2010

(65) Prior Publication Data

US 2010/0226251 A1 Sep. 9, 2010

(30) Foreign Application Priority Data

Mar. 3, 2009 (JP) .................................. 2009-049139

(51) Int. Cl.
*H04L 12/26* (2006.01)

(52) U.S. Cl.
USPC ............ 370/231; 370/230; 370/237; 709/238

(58) Field of Classification Search
USPC ........... 370/229, 230, 231, 235, 237; 709/238
See application file for complete search history.

(56) References Cited

U.S. PATENT DOCUMENTS

| | | | |
|---|---|---|---|
| 7,729,285 B2 * | 6/2010 | Yoon .............................. | 370/254 |
| 2007/0127378 A1 * | 6/2007 | Yang et al. ..................... | 370/235 |

FOREIGN PATENT DOCUMENTS

| | | | |
|---|---|---|---|
| JP | 2001-119730 | | 4/2001 |
| JP | 2004-214816 | | 7/2004 |
| JP | 2004214816 | * | 7/2004 |
| JP | 2010-161501 | | 7/2010 |

OTHER PUBLICATIONS

Akiko Yamada, et al "A study for Green Network (3)—Eco Routing-", Fujitsu Laboratories Ltd. Mar. 2009.*
Di Caro and M. Dorigo. "AntNet: Distributed Stigmergic Control for Communications Networks", Journal of Artificial Intellegience Research (JAIR), vol. 9, pp. 317-365, 1998.*
Akiko Yamada, et al. "A Study for Green Network (3)—Eco Routing—"Fujitsu Laboratories Ltd., Mar. 2009.
Japanese Office Action dated Oct. 30, 2012, from corresponding Japanese Application No. 2009-049139.

* cited by examiner

*Primary Examiner* — Christopher Grey
*Assistant Examiner* — Siming Liu
(74) *Attorney, Agent, or Firm* — Katten Muchin Rosenman LLP

(57) ABSTRACT

An attraction acquisition unit of a first router acquires attraction values of third and fourth routers. When many packets the destination of which is a second router (identifier "A") are then inputted to the first router, a traffic control unit distributes the many packets among communication interfaces so that a higher volume of traffic is sent to a communication interface with which a larger attraction value is associated. The traffic control unit then sends the many packets via the communication interfaces. As a result, a good part of the many packets are limited to a transmission route via the third router.

15 Claims, 43 Drawing Sheets

122 TRAFFIC STORAGE UNIT

122a TRAFFIC MANAGEMENT TABLE

| COMMUNICATION INTERFACE | INFLOW TRAFFIC VOLUME | LINK CAPACITY | OUTFLOW TRAFFIC VOLUME | TRAFFIC USE LIMIT VALUE |
|---|---|---|---|---|
| I/F#1 | 30GB/s | 100GB/s | 10GB/s | 0.8 |
| I/F#2 | 20GB/s | 100GB/s | 20GB/s | 0.8 |

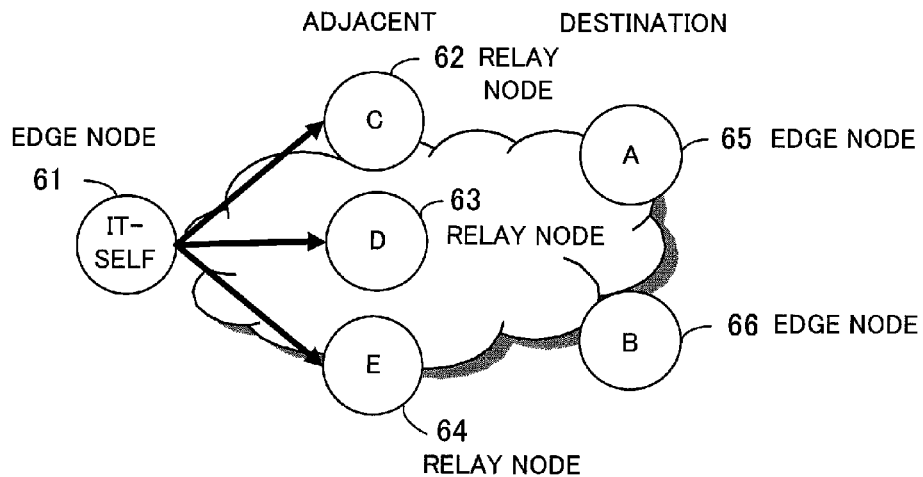

| 61a TRAFFIC ATTRACTION TABLE | | |
|---|---|---|
| OUTPUT INTERFACE (ADJACENT NODE) | TRAFFIC ATTRACTION | ASSIGNMENT PROBABILITY |
| I/F#1 (RELAY NODE "C") | $\tau_1$ | $\dfrac{\tau_1}{\tau_1+\tau_2+\tau_3}$ |
| I/F#2 (RELAY NODE "D") | $\tau_2$ | $\dfrac{\tau_2}{\tau_1+\tau_2+\tau_3}$ |
| I/F#3 (RELAY NODE "E") | $\tau_3$ | $\dfrac{\tau_3}{\tau_1+\tau_2+\tau_3}$ |

PACKET 67 — DESTINATION A

| 61b TRAFFIC ATTRACTION TABLE | | |
|---|---|---|
| OUTPUT INTERFACE (ADJACENT NODE) | TRAFFIC ATTRACTION | ASSIGNMENT PROBABILITY |
| I/F#1 (RELAY NODE "C") | $\tau_4$ | $\dfrac{\tau_4}{\tau_4+\tau_5+\tau_6}$ |
| I/F#2 (RELAY NODE "D") | $\tau_5$ | $\dfrac{\tau_5}{\tau_4+\tau_5+\tau_6}$ |
| I/F#3 (RELAY NODE "E") | $\tau_6$ | $\dfrac{\tau_6}{\tau_4+\tau_5+\tau_6}$ |

PACKET 68 — DESTINATION B

FIG. 33
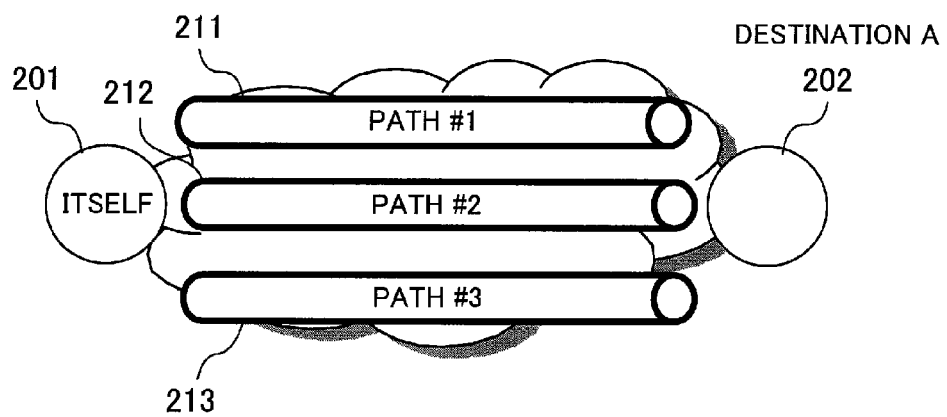
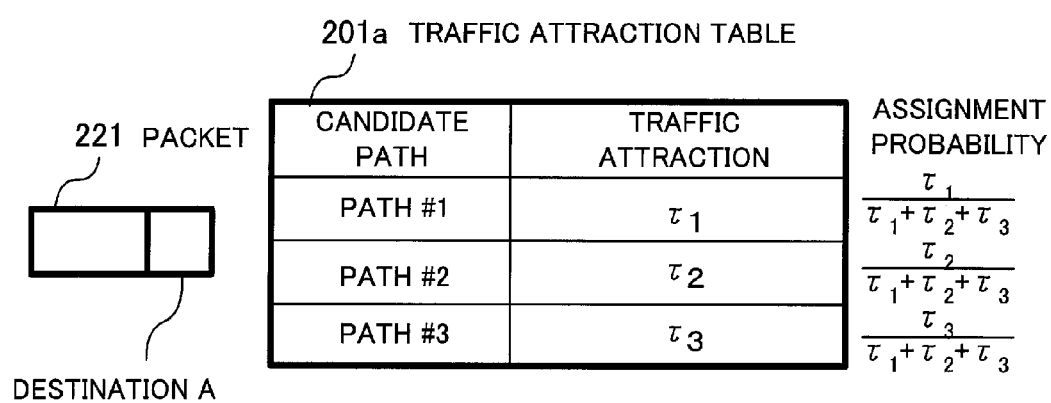

323 INTER-EDGE-NODE TRAFFIC STORAGE UNIT

323a INTER-EDGE-NODE TRAFFIC MANAGEMENT TABLE

| PATH | SOURCE EDGE NODE | DESTINATION EDGE NODE | TRAFFIC VOLUME |
|---|---|---|---|
| PATH #1 | A | B | 30Mbps |
| PATH #2 | A | C | 20Mbps |
| PATH #1 | B | A | 30Mbps |
| PATH #3 | B | C | 10Mbps |
| PATH #2 | C | A | 30Mbps |
| PATH #3 | C | B | 20Mbps |
| ... | ... | ... | ... |

FIG. 37

325 INTER-ROUTER TRAFFIC STORAGE UNIT

325a INTER-ROUTER TRAFFIC MANAGEMENT TABLE

| OUTFLOW ROUTER | INFLOW ROUTER | ESTIMATED TRAFFIC VOLUME | LINK CAPACITY | TRAFFIC USE LIMIT VALUE |
|---|---|---|---|---|
| A | h | 0.5 | 100GB/s | 0.8 |
| h | A | 0.6 | 100GB/s | 0.8 |
| h | i | 0.5 | 100GB/s | 0.8 |
| i | h | 0.4 | 100GB/s | 0.8 |
| i | B | 0.5 | 100GB/s | 0.8 |
| B | i | 0.4 | 100GB/s | 0.8 |
| i | j | 0.3 | 100GB/s | 0.8 |
| j | i | 0.5 | 100GB/s | 0.8 |
| j | C | 0.3 | 100GB/s | 0.8 |
| C | j | 0.5 | 100GB/s | 0.8 |
| ⋮ | ⋮ | ⋮ | ⋮ | ⋮ |

FIG. 38

PHYSICAL TOPOLOGY

CALCULATE TRAFFIC ATTRACTION

① TRAFFIC ATTRACTION FOR EDGE B  0.5
② TRAFFIC ATTRACTION FOR LINK i⇒B  0.5 × 0.5=0.25
③ TRAFFIC ATTRACTION FOR NODE i  Average{0.5,0.25}=0.375
④ TRAFFIC ATTRACTION FOR LINK h⇒i  0.5 × 0.375=0.1875
⑤ TRAFFIC ATTRACTION FOR NODE h  Average{0.5,0.1875}=0.34375
⑥ TRAFFIC ATTRACTION FOR LINK A⇒h  0.5 × 0.34375 =0.171875
⑦ TRAFFIC ATTRACTION FOR PATH TO B  0.171875

DATA TRANSMISSION APPARATUS FOR DISTRIBUTING PACKETS

CROSS-REFERENCE TO RELATED APPLICATION(S)

This application is based upon and claims the benefit of priority of the prior Japanese Patent Application No. 2009-049139, filed on Mar. 3, 2009, the entire contents of which are incorporated herein by reference.

FIELD

The embodiments discussed herein are related to a router and packet routing program for distributing traffic in a network.

BACKGROUND

In networks, a plurality of routers relay a packet and transmit it to a destination computer. Each router exchanges route information with other routers in order to recognize transmission routes to the destination of the packet. The route information includes a transmission route which a router that sends the route information recognizes. Each router selects a packet transfer destination on the basis of the route information received from the other routers.

If there are a plurality of transmission routes from a router to a destination computer, then the router performs route selection in accordance with a predetermined algorithm. A route selection algorithm used by each router is provided in a routing protocol such as OSPF (Open Shortest Route First) or RIP (Routing Information Protocol). With these routing protocols, basically route selection is performed so that the shortest route will be taken. Alternatively, the existing advanced control using these routing protocols is exercised. That is to say, smoothing is performed so that the peak of network usage will be minimized. At the same time route selection is performed so that the shortest route will be taken.

If the above conventional routing protocols are used, traffic such as a packet is transmitted along a predetermined route. Accordingly, even when a traffic volume is low throughout a network, it is necessary to continue starting each router.

With the improvement of network throughput, on the other hand, the consumption of power by devices included in networks has increased. Therefore, the operation which controls the power consumption of an entire network is important. As a result, the following technique is proposed. A network controller monitors the state of traffic in a communication network. When a traffic volume is low, the traffic is transmitted along a detour. As a result, a part of routes is used and switching systems can be stopped. This procedure can save electric power (see Japanese Laid-open Patent Publication No. 2001-119730).

In some networks, however, it is difficult to exercise centralized traffic control by a management system. In a large-scale network, for example, it is difficult to exercise centralized control of all traffic by a management system. In addition, if centralized traffic control is exercised on each transmission route by a management system, the influence of trouble, such as a system malfunction, may spread throughout a network. This leads to a deterioration in the reliability of an entire system.

SUMMARY

According to one aspect of the present invention, a router includes: a plurality of communication interfaces; a storage unit; an attraction acquisition unit which acquires an attraction value corresponding to volume of traffic relayed by an adjacent router connected via one of the plurality of communication interfaces from the adjacent router, associates the attraction value with the communication interface connected to the adjacent router, and stores the attraction value in the storage unit; and a traffic control unit which refers to the storage unit, distributes, in the case of a plurality of packets with a same destination being inputted, the plurality of packets inputted among communication interfaces connected to transmission routes to the destination so that a higher volume of traffic is sent to a communication interface with a larger attraction value, and sends the plurality of packets via the communication interfaces.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 1 is a view for giving an overview of an embodiment;
FIG. 2 illustrates an example of the configuration of a system according to an embodiment;
FIG. 3 illustrates an example of the hardware configuration of a router used in the embodiment;
FIG. 4 illustrates traffic limitation status in the embodiment;
FIG. 5 is a block diagram of the function of the router;
FIG. 6 illustrates an example of the structure of data in a traffic storage unit;
FIG. 7 illustrates an example of the structure of data in an attraction information storage unit;
FIG. 8 is a flow chart of a procedure for a control packet sending process;
FIG. 9 is a schematic view of control packet sending status;
FIG. 10 is a flow chart of a procedure for a control packet propagation process;
FIG. 11 is a schematic view of control packet propagation status;
FIG. 12 is a flow chart of a procedure for a traffic control process;
FIG. 13 illustrates the concept of packet distribution;
FIG. 14 illustrates an example of calculating packet distribution probabilities according to destinations;
FIG. 15 illustrates the status of packet distribution performed by the proportional distribution method;
FIG. 16 illustrates the status of updating traffic attraction by propagating a control packet;
FIG. 17 illustrates packet distribution status after the update of traffic attraction;
FIG. 18 illustrates alarm information transmission status;
FIG. 19 illustrates the status of detecting a congestion avoidance link in a complete limitation state;
FIG. 20 illustrates the status of updating traffic attraction on the basis of alarm information in a complete limitation state;
FIG. 21 illustrates the status of detecting a congestion avoidance link in a noncomplete limitation state;
FIG. 22 illustrates the status of updating traffic attraction on the basis of alarm information in a noncomplete limitation state;
FIG. 23 is a flow chart of a procedure for a sleep process;

FIG. 33 illustrates assignment probabilities according to paths in the third embodiment;

FIG. 37 illustrates an example of the structure of data in an inter-edge-node traffic storage unit;

FIG. 38 illustrates an example of the structure of data in an inter-router traffic storage unit;

DESCRIPTION OF EMBODIMENT(S)

Figure 1:
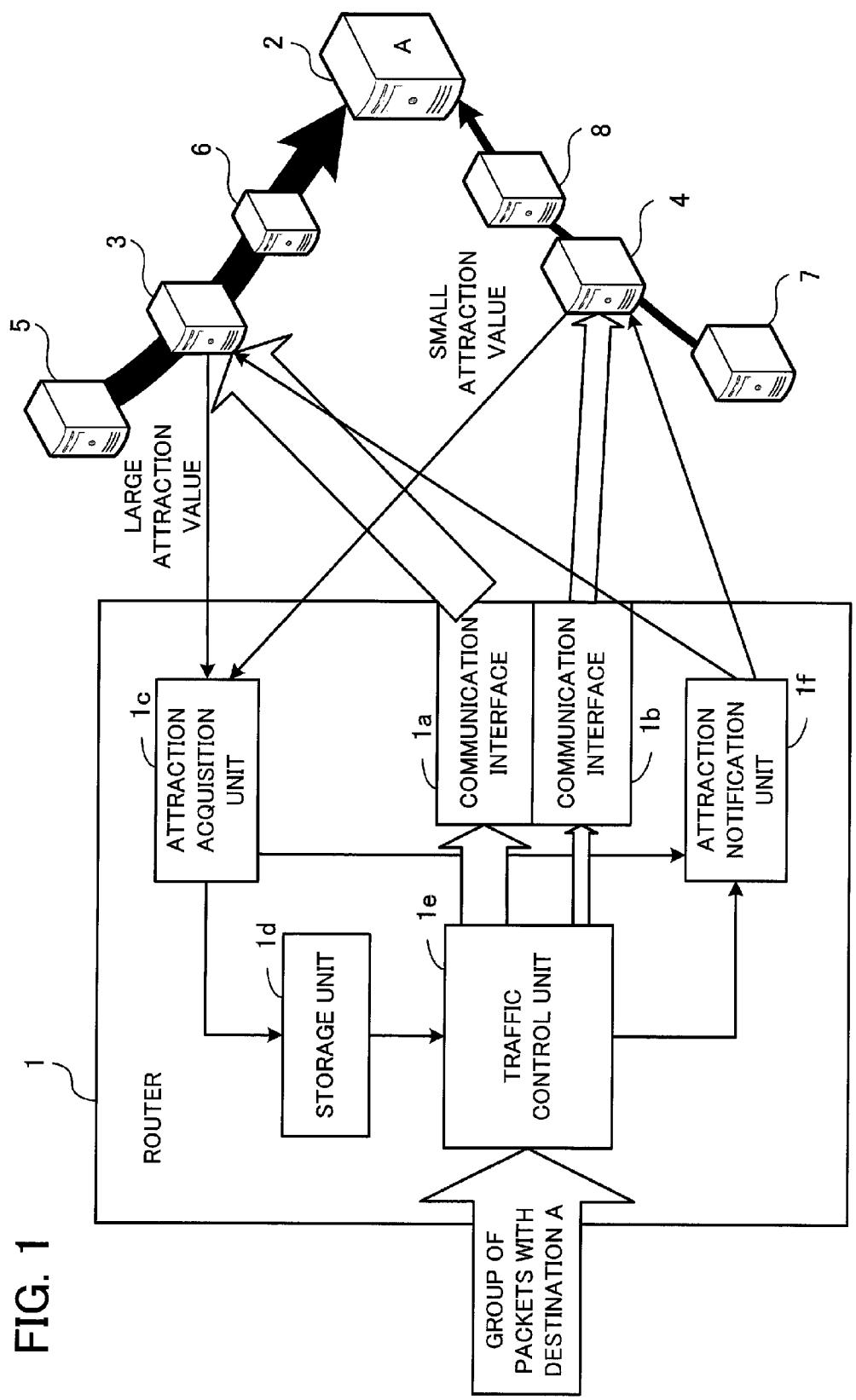

Embodiments of the present invention will now be described with reference to the accompanying drawings, wherein like reference numerals refer to like elements throughout.

FIG. 1 is a view for giving an overview of an embodiment. FIG. 1 illustrates a network including routers 1 through 8.

The router 1 includes communication interfaces 1a and 1b, an attraction acquisition unit 1c, a storage unit 1d, a traffic control unit 1e, and an attraction notification unit 1f.

The attraction acquisition unit 1c acquires attraction values corresponding to the volume of traffic relayed by the adjacent routers 3 and 4 connected via the communication interfaces 1a and 1b, respectively, from the routers 3 and 4. In addition, the attraction acquisition unit 1c associates the attraction values with the communication interfaces 1a and 1b connected to the adjacent routers 3 and 4, respectively, and stores the attraction values in the storage unit 1d.

The traffic control unit 1e refers to the storage unit 1d and distributes packets. When a plurality of packets with the same destination are inputted, the traffic control unit 1e compares the attraction values associated with the communication interfaces connected to transmission routes to the destination. In this case, the traffic control unit 1e distributes the plurality of packets inputted between the communication interfaces so that the volume of traffic to a communication interface with a larger attraction value will be higher. The traffic control unit 1e then sends the plurality of packets via the communication interfaces.

In addition, when alarm information that congestion may occur is received from an adjacent router, the traffic control unit 1e reduces the volume of traffic sent from a communication interface connected to the adjacent router which sends the alarm information.

On the basis of the volume of traffic which transmits into the communication interface 1a or 1b, the attraction notification unit 1f periodically calculates a self-attraction value (attraction which does not include attraction of an adjacent router) which becomes larger with an increase in the volume of received traffic. The attraction notification unit 1f then sends the self-attraction value calculated via the communication interface 1a or 1b.

Furthermore, when the attraction notification unit 1f acquires an attraction value from the adjacent router 3 or 4, the attraction notification unit 1f updates the attraction value on the basis of the volume of traffic which transmits into the communication interfaces 1a and 1b. The attraction notification unit 1f then sends an attraction value after the update to a communication interface other than a communication interface into which the attraction value before the update is inputted.

FIG. 1 illustrates the function of the router 1. However, each of the routers 2 through 8 has the same function. By using the network including the above routers 1 through 8, traffic which transmits in the network can be limited to specific transmission routes by autonomous control by each router.

For example, it is assumed that a great volume of traffic is being transmitted from the router 5 to the router 2. The traffic is relayed by the routers 3 and 6. In addition, it is assumed that a small volume of traffic is being transmitted from the router 7 to the router 2. The traffic is relayed by the routers 4 and 8.

In this case, the router 3 generates a large attraction value and sends the attraction value to the adjacent router 1. This attraction value is received by the attraction acquisition unit 1c via the communication interface 1a connected to the router 3. On the other hand, the router 4 generates an attraction value which is smaller than the attraction value generated by the router 3, and sends the attraction value to the adjacent router 1. This attraction value is received by the attraction acquisition unit 1c via the communication interface 1b connected to the router 4. The attraction acquisition unit 1c which acquires the attraction values generated by the routers 3 and 4 associates the attraction values with the communication interfaces from which the attraction values are inputted, and stores the attraction values in the storage unit 1d.

After that, it is assumed that many packets with the destination of the router 2 (identifier of which is "A") are inputted to the router 1. The traffic control unit 1e refers to the attraction values of the communication interfaces 1a and 1b stored in the storage unit 1d. In this case, the number of packets, which is sent from the traffic control unit 1e to the communication interface 1a is larger than that of packets which is sent from the traffic control unit 1e to the communication interface 1b. As a result, the volume of traffic, which is transmitted into the communication interface 1a the attraction value of which is larger, is more than that of traffic which transmits into the communication interface 1b. The traffic control unit 1e sends the packets via the communication interfaces which distribute packet transmission. Therefore, a large number of packets are transmitted via the router 3 to the router 2 which is the destination, and a small number of packets are transmitted via the router 4 to the router 2.

If the router 1 distributes packet transmission according to attraction, the volume of traffic in the router 3 increases. Accordingly, the attraction of the router 3 becomes stronger and the router 3 sends a larger attraction value again to the router 1. As a result, the degree of traffic centralization to transmission routes via the router 3 is increased gradually. Finally, a router which receives no packet is generated. Therefore, by stopping the router, the power consumption of the network can be reduced.

The attraction notification unit 1f of the router 1 periodically informs the adjacent routers 3 and 4 of its attraction value. Accordingly, a part of traffic with the destination of the router 2, which is relayed by the router 4, is assigned to a transmission route via the routers 1, 3, and 6. As a result, the volume of traffic relayed by the router 8 decreases further. If the volume of traffic relayed by the router 8 becomes zero, then the router 8 can be stopped and the power consumption of a system can be reduced.

In the above description each router sends its attraction value to an adjacent router. Otherwise, there is another method to inform an adjacent router of an attraction value. For example, the attraction acquisition unit 1c of the router 1 may refer to the attraction value in the adjacent router 3 or 4 via the network. In addition, the attraction acquisition unit 1c may refer to the volume of traffic measured by the adjacent router 3 or 4 via the network, and calculate the attraction value of the adjacent router 3 or 4 from the volume of traffic. If each router has the function of actively acquiring the attraction value of an adjacent router, then each router does not need the function of informing an adjacent router of its attraction value.

In addition, the above traffic centralization is realized by autonomous operation of each of the routers 1 through 8. Therefore, a device for centralized traffic management is unnecessary and this technique is applicable even to a large-scaled network. Because each router autonomously exercises control, is can realize a resilient network.

By the way, the attraction notification unit 1f of the router 1 also propagates the attraction value received from the adjacent router 3 or 4. An attraction value received by a router is updated using the attraction value of its own router in a propagation process of an attraction value. For example, the attraction notification unit 1f considers the average of the received attraction value and its own attraction value as a new attraction value. The new attraction value is sent via a communication interface other than a communication interface which receives the attraction value. For example, the attraction value received via the communication interface 1a from the router 3 is sent via the communication interface 1b to the router 4 after updating the attraction value.

If an attraction value is propagated in this way, then the influence of the attraction value can also be transmitted to a router beyond an adjacent router. That is to say, the attraction value of the router 3 is large, so the volume of traffic which is transmitted from the router 4 to the router 2 via the router 1 increases. As a result, a traffic can be centralized.

Such traffic centralization mechanism has the behavior which is like a swarm of ants. That is to say, ants leave pheromones to teach the other ants a proper route to food. When ants return from their destination to their nest, the ants secrete pheromones. By doing so, the ants teach other ants which march toward the destination a route to the destination. The ants which go toward the destination can reach the destination by following the pheromones. If the pheromones are strong, many ants gather. Like the behavior of a swarm of ants, an attraction value of a transmission route, which has the high volume of traffic, is set to a large value and each router, which autonomously operates, controls a packet transmission so that the volume of traffic, which is transmitted via the transmission route, will be high. As a result, traffic can be limited.

In particular, it is expected that the power consumption of networks will increase explosively in the future as network traffic is increased. A technique for saving the power consumption of networks themselves becomes important. Accordingly, it is expected that a power-saving router which can stop processes according to whether traffic processes or not will be important. The actual power consumption of a router hardly depends on the volume of traffic handled and the power consumption depends on the basic processes of each function. Therefore, it is effective that power-saving routers should be installed in a network, and that the number of power-saving routers which does not transmit traffic should be generated as large as possible, and these power-saving routers should be stopped.

On the other hand, excessive centralization of traffic may cause congestion. Accordingly, a technique for the traffic centralization should be combined with a technique for avoiding congestion. This makes it possible to design a network with high reliability while centralizing traffic. Embodiments for centralizing traffic without causing congestion will now be described in detail.

Traffic distribution in the following embodiments can be performed in packets or packet flows. If traffic distribution is performed in packet flows, a transmission route is selected at the beginning of a packet flow and each packet included in the packet flow is transmitted via the selected transmission route.

In the following description an attraction value will be referred to as "traffic attraction."

First Embodiment

Figure 2:
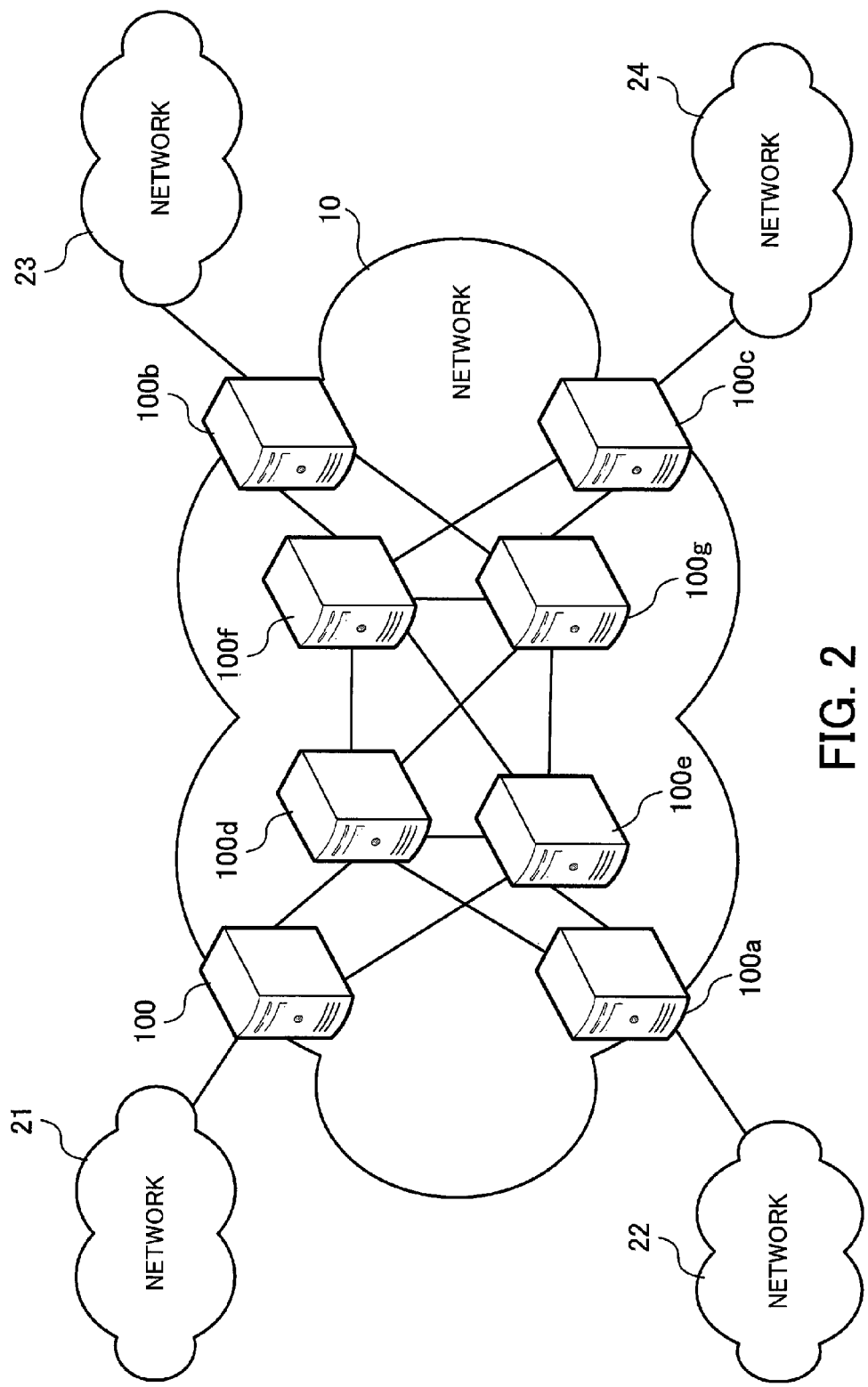

FIG. 2 illustrates an example of the configuration of a system according to an embodiment. A network 10 includes routers 100, 100a, 100b, 100c, 100d, 100e, 100f, and 100g. The router 100 is connected to the routers 100d and 100e and is connected to a network 21 other than the network 10. The router 100a is connected to the routers 100d and 100e and is connected to a network 22 other than the network 10. The router 100b is connected to the routers 100f and 100g and is connected to a network 23 other than the network 10. The router 100c is connected to the routers 100f and 100g and is connected to a network 24 other than the network 10. The routers 100d, 100e, 100f, and 100g are connected to one another. Hereinafter a transmission route by which two routers are connected will be referred to as a "link."

If routing is performed in the network 10 having the above structure, each of the routers 100, 100a, 100b, and 100c connected to the networks 21 through 24, respectively, other than the network 10 functions mainly as an edge node. Edge nodes receive traffic (individual packets or packet flows) which connect from the networks 21 through 24 other than the network 10, and transmit the traffic via the network 10. In addition, the edge nodes transmit traffic transmitted via the network 10 to the networks 21 through 24. That is to say, a router which exchanges packets with a communication device not having, for example, a control packet sending-receiving function which is necessary to distribute traffic in this embodiment functions as an edge node.

Each of the routers 100d, 100e, 100f, and 100g which are not connected to the network 21, 22, 23, or 24 other than the network 10, is operated as a relay node. Relay nodes relay traffic in the network 10. Each router, which is operated as an edge node, also has a function as a relay node for transmitting a packet in the network 10.

Figure 3:
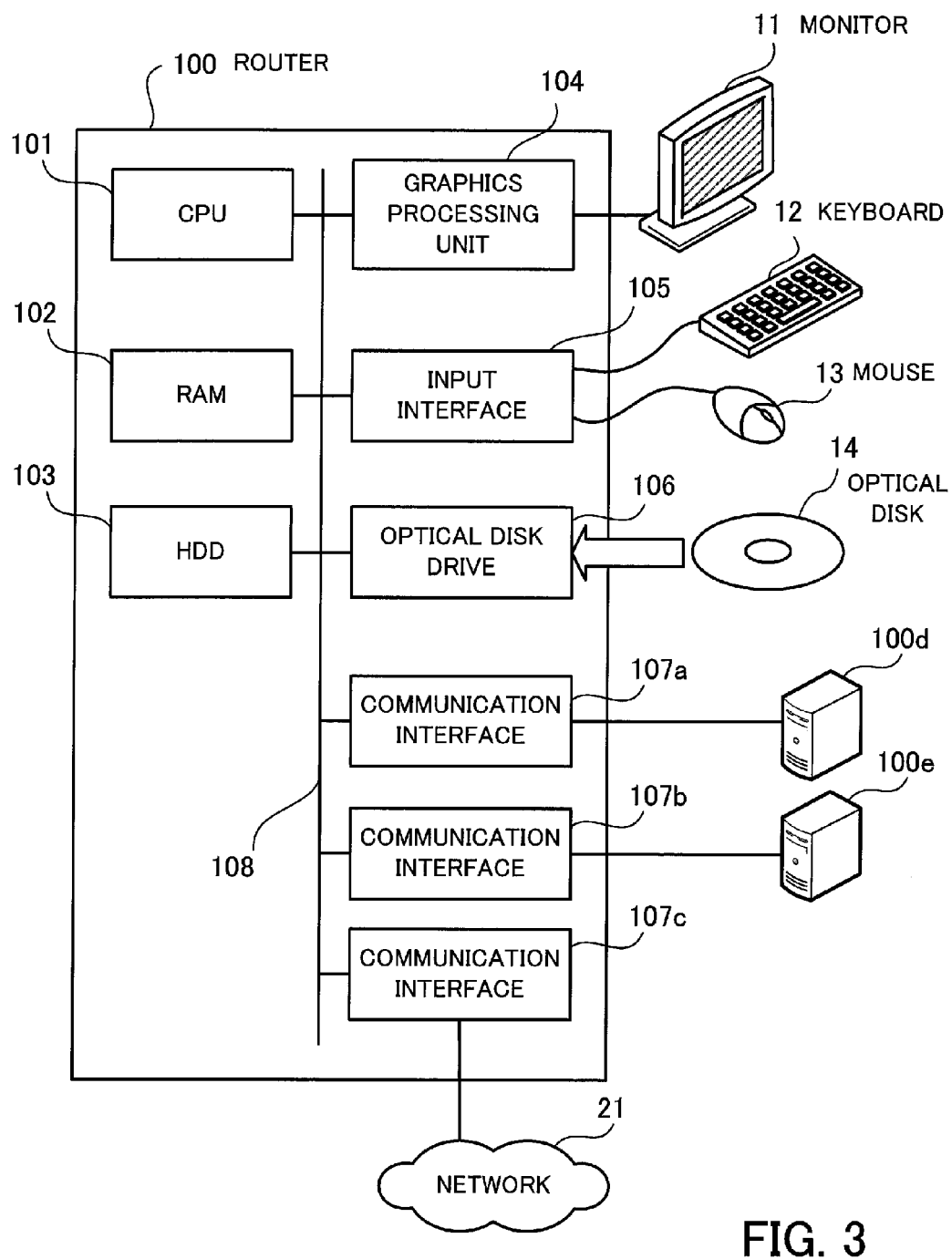

FIG. 3 illustrates an example of the hardware configuration of a router used in the embodiment. The whole of the router 100 is controlled by a central processing unit (CPU) 101. A random access memory (RAM) 102 and peripheral devices are connected to the CPU 101 via a bus 108.

The RAM 102 is used as main storage of the router 100. The RAM 102 temporarily stores at least part of an operating system (OS) or an application program executed by the CPU 101. The RAM 102 also stores various pieces of data which the CPU 101 needs to perform a process.

The peripheral devices connected to the bus 108 include HDD (Hard Disk Drive) 103, a graphics processing unit 104, an input interface 105, an optical disk drive 106, and communication interfaces 107a, 107b, and 107c.

The HDD 103 magnetically writes data to and reads out data from a built-in disk. The HDD 103 is used as auxiliary storage of the router 100. The HDD 103 stores the OS, application programs, and various pieces of data. A semiconductor memory such as a flash memory can be used as auxiliary storage.

A monitor 11 is connected to the graphics processing unit 104. In accordance with instructions from the CPU 101, the graphics processing unit 104 displays an image on a screen of the monitor 11. A display unit using a CRT (Cathode Ray Tube), a liquid crystal display, or the like is used as the monitor 11.

A keyboard 12 and a mouse 13 are connected to the input interface 105. The input interface 105 sends a signal sent from the keyboard 12 or the mouse 13 to the CPU 101. The mouse 13 is an example of a pointing device and another pointing device such as a touch panel, a tablet, a touch pad, or a track ball can be used.

The optical disk drive 106 reads data recorded on an optical disk 14 by the use of, for example, a laser beam. The optical disk 14 is a portable record medium on which data is recorded so that it can be read by the reflection of light. The optical disk 14 may be a DVD (Digital Versatile Disk), a DVD-RAM, a CD-ROM (Compact Disk Read Only Memory), a CD-R (Recordable)/RW (ReWritable), or the like.

The communication interface 107a is connected to the router 100d. The communication interface 107a sends data to and receives data from the router 100d. The communication interface 107b is connected to the router 100e. The communication interface 107b sends data to and receives data from the router 100e. The communication interface 107c is connected to the network 21. The communication interface 107c sends data to and receives data from another computer included in the network 21 via the network 21.

By adopting the above hardware configuration, the processing functions of this embodiment can be realized. FIG. 3 illustrates the hardware configuration of the router 100. However, the other routers 100a, 100b, 100c, 100d, 100e, 100f, and 100g can also be realized by the same hardware configuration. The number of communication interfaces included in each of the routers 100a, 100b, 100c, 100d, 100e, 100f, and 100g corresponds to the number of links connected thereto.

In the above system each router exercises autonomous control in order to centralize traffic without causing congestion. By centralizing traffic, traffic is transmitted into part of relay nodes. The function of such a relay node can be stopped.

Figure 4:
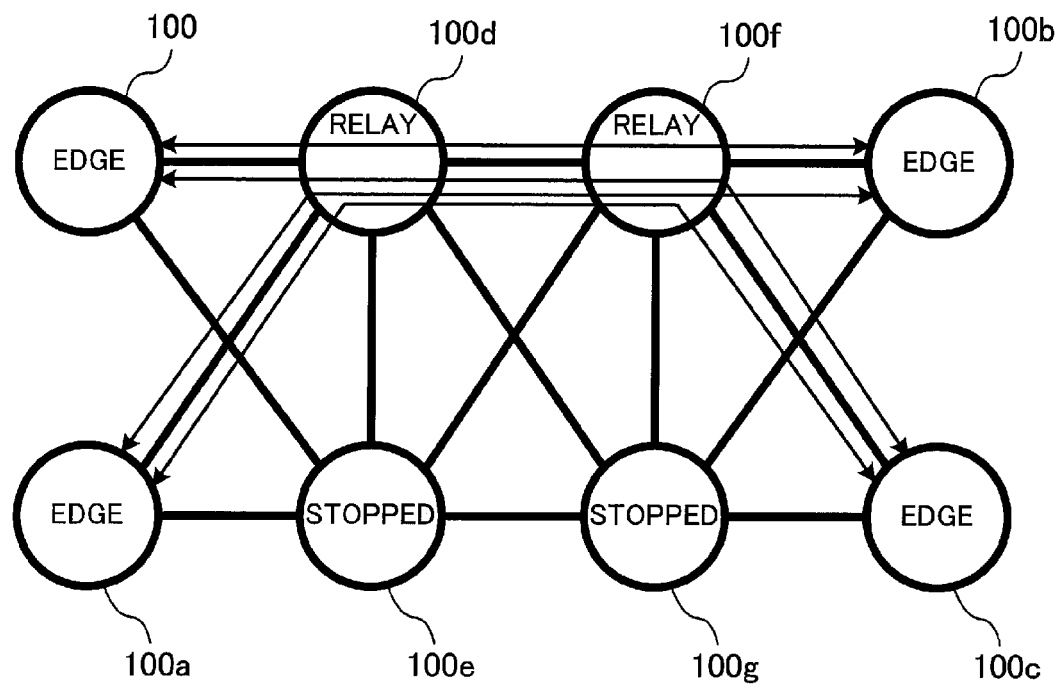

FIG. 4 illustrates a status of traffic centralization in the embodiment. In this example, traffic which flows from the router 100, which is an edge node, to the router 100b, which is an edge node, or from the router 100b to the router 100 is relayed by the routers 100d and 100f, which are relay nodes. Similarly, traffic which flows from the router 100 to the router 100c or from the router 100c to the router 100, traffic which flows from the router 100a to the router 100b or from the router 100b to the router 100a, or traffic which flows from the router 100a to the router 100c or from the router 100c to the router 100a is relayed by the routers 100d and 100f. As a result, the router 100e or 100g does not transmit traffic, so the router 100e or 100g can be stopped. If the router 100e or 100g is stopped, the power consumption of the network can be reduced. If a congestion state may occur on part of routes to which traffic is centralized, the router 100e or 100g on an alternative route which has been stopped is used. This mechanism can shift smoothly toward distributed traffic handling.

Figure 5:
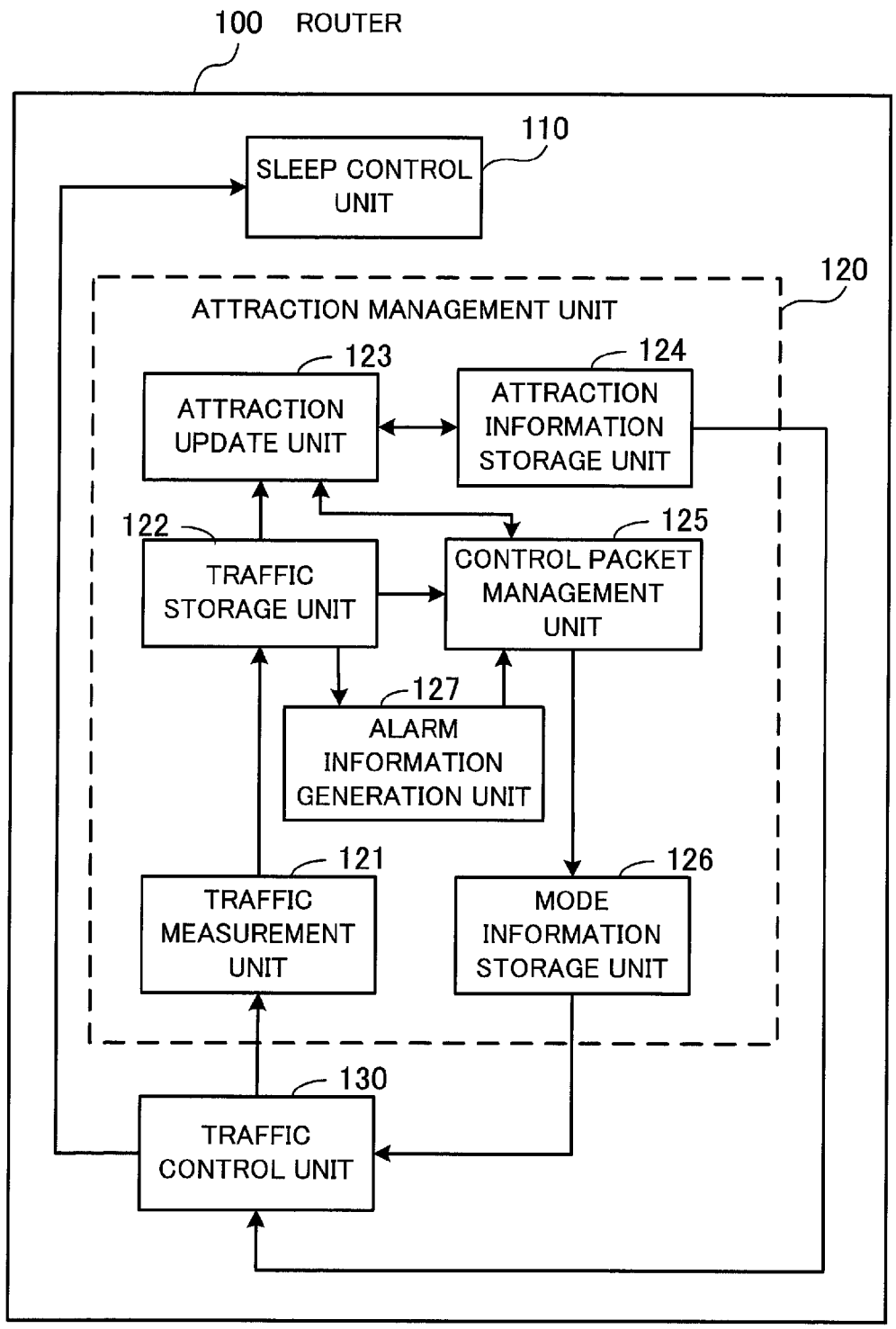

FIG. 5 is a block diagram of the function of the router. The router 100 includes a sleep control unit 110, an attraction management unit 120, and a traffic control unit 130.

When traffic is not processed, the sleep control unit 110 shifts the router 100 to sleep mode. To be concrete, the sleep control unit 110 monitors traffic control by the traffic control unit 130 and measures time which elapses after the last traffic processing. If the time which elapses after the last traffic processing is longer than a shift time to sleep mode set in advance, then the sleep control unit 110 shifts the router 100 to sleep mode. Furthermore, if the sleep control unit 110 receives a sleep message from another router, then the sleep control unit 110 shifts the router 100 to sleep mode.

In sleep mode, only the packet receiving function of the communication interfaces 107a, 107b, and 107c in the router 100 continues to operate, and the other functions in the router 100 stop. When the communication interface 107a, 107b, or 107c receives a wake-up message or traffic to be transmitted, it sends the CPU 101a signal for a return to normal operation mode. As a result, the CPU 101 starts and makes the router 100 return to normal operation mode.

The attraction management unit 120 manages traffic attraction for selecting a route via which data such as a packet is transmitted. The attraction management unit 120 includes a traffic measurement unit 121, a traffic storage unit 122, an attraction update unit 123, an attraction information storage unit 124, a control packet management unit 125, a mode information storage unit 126, and an alarm information generation unit 127.

The traffic measurement unit 121 measures the volume of traffic transmitted by each link (transmission route between the router 100 and an adjacent router). To be concrete, the traffic measurement unit 121 monitors traffic control by the traffic control unit 130 and measures the volume of traffic which is transmitted into or out of each of the communication interfaces 107a, 107b, and 107c. The traffic measurement unit 121 stores the traffic volume measured in the traffic storage unit 122.

The traffic storage unit 122 stores the volume of traffic which is transmitted into each of the communication interfaces 107a, 107b, and 107c. For example, part of a storage area in the RAM 102 is used as the traffic storage unit 122.

The attraction update unit 123 calculates traffic attraction. For example, if the router 100 functions as an edge node, then the attraction update unit 123 calculates traffic attraction of the router 100 periodically.

In addition, if the router 100 functions as a relay node, then the attraction update unit 123 receives traffic attraction included in a control packet received by the control packet management unit 125 from the control packet management unit 125. The attraction update unit 123 uses the traffic attraction acquired and calculates traffic attraction for a link receiving a control packet which traffic is transmitted to a router that sends the control packet.

In addition, the attraction update unit 123 calculates traffic attraction for a link receiving a control packet to the router 100 based on the traffic attraction in the received by a link. Moreover the attraction update unit 123 calculates traffic attraction for the destination of an edge node, which generates the control packet, based on the calculated traffic attraction.

The attraction update unit 123 updates traffic attraction for each link with the destination of an edge, stored in the attraction information storage unit 124, using traffic attraction for a received link calculated by the traffic attraction in each control packet.

The traffic attraction calculated by the attraction update unit 123 is passed to the control packet management unit 125.

The attraction information storage unit 124 stores traffic attraction according to communication interfaces regarding traffic with the destination of an edge node. For example, part of the storage area in the RAM 102 is used as the attraction information storage unit 124.

The control packet management unit 125 manages the generation and transmission of a control packet. To be concrete, if the router 100 functions as an edge node, the control packet management unit 125 receives traffic attraction generated periodically from the attraction update unit 123 and generates a control packet to be sent to each link. The generated control packet includes the traffic attraction of the router 100. The control packet management unit 125 then broadcasts the control packet via a communication interface connected to each link.

In addition, if the router 100 functions as a relay node, the control packet management unit 125 inputs the traffic attraction included in the control packet sent from another router to the attraction update unit 123. After that, the control packet management unit 125 receives the updated traffic attraction from the attraction update unit 123. Furthermore, the control packet management unit 125 copies the control packet received so that the number of the control packets will correspond to that of links along which the control packets are propagated. Next, the control packet management unit 125 updates the traffic attraction included in the control packet using the traffic attraction updated by the attraction update unit 123. The control packet management unit 125 then broadcasts the control packets via communication interfaces connected to the links along which the control packets are propagated.

In addition, the control packet management unit 125 sets a traffic distribution mode according to the contents of the control packet. There are two traffic distribution modes: centralization mode and distribution mode. The centralization mode is applied when congestion has not occurred in the network 10. In the centralization mode, a great volume of traffic is assigned to a link that the traffic attraction is strong. The distribution mode is applied when congestion has occurred in the network 10. In the distribution mode, traffic with the volume which exceeds its capacity in a congestion link is distributed to other links.

If alarm information, which indicates the possibility of the congestion, is included in the control packet, then the control packet management unit 125 determines that there is a possibility that congestion will occur on a link along which the control packet is sent. If the control packet management unit 125 receives alarm information from the alarm information generation unit 127, the control packet management unit 125 also determines that there is a possibility that congestion will occur on a link which causes the generation of the alarm information.

If the control packet management unit 125 determines that there is a possibility that congestion will occur, then the control packet management unit 125 changes the centralization mode to the distribution mode. To be concrete, if the possibility of the congestion is not detected, then the control packet management unit 125 registers information which indicates the centralization mode in the mode information storage unit 126. If the control packet management unit 125 detects the possibility of the congestion, then the control packet management unit 125 registers information which indicates the distribution mode in the mode information storage unit 126.

If the control packet management unit 125 receives the alarm information from the alarm information generation unit 127, then the control packet management unit 125 broadcasts a control packet, including the alarm information, to links other than the link on which congestion may occur. At this time the control packet management unit 125 can send a control packet, which notices traffic attraction and which includes the alarm information. In addition, the control packet management unit 125 can generate and send a control packet which only notices the alarm information without waiting until receiving a control packet which notices traffic attraction.

The mode information storage unit 126 stores information regarding a traffic distribution mode. For example, part of the storage area in the RAM 102 is used as the mode information storage unit 126.

The alarm information generation unit 127 monitors the traffic storage unit 122 and determines whether the traffic usage (traffic volume/link capacity) of each link is greater than a predetermined threshold (traffic use limit value). Traffic usage is a value obtained by normalizing traffic volume by the transmission capability of each link. If the traffic usage of any link is greater than the predetermined threshold, then the alarm information generation unit 127 generates alarm information and inputs it to the control packet management unit 125.

When the traffic control unit 130 receives a packet, the traffic control unit 130 selects a link to which the packet is transmitted in accordance with traffic attraction with the destination of an edge node. The traffic control unit 130 then transmits the packet to the selected link. To be concrete, the traffic control unit 130 refers to the mode information storage unit 126 and checks a current traffic distribution mode. Next, the traffic control unit 130 refers to the attraction information storage unit 124 and acquires traffic attraction of each link to which the packet can be transmitted. The traffic control unit 130 then uses the traffic attraction of each link and determines a link to which the packet is transmitted in accordance with a distribution algorithm corresponding to a traffic distribution mode. The traffic control unit 130 then sends the packet to be relayed via a communication interface connected to the determined link.

The traffic control unit 130 performs packet distribution by using routes set in advance using an existing routing protocol, such as OSPF or RIP, before the traffic attraction of each link is set. For example, there is no traffic just after the operation of the system is begun. Therefore, no link has traffic attraction (traffic attraction of each link remains at the initial value "0"). The traffic control unit 130 distributes traffic in the initial stages using an existing routing protocol. When the traffic reaches a destination router, the destination router generates a control packet which includes traffic attraction and transmits the control packet to another router. As a result, the router 100 also sets traffic attraction corresponding to each link. After that, the traffic control unit 130 performs traffic distribution on the basis of traffic attraction.

The correspondence between the functions illustrated in FIG. 1 and the functions illustrated in FIG. 5 is as follows. The attraction acquisition unit 1c and the attraction notification unit 1f are realized by cooperative operation performed by the control packet management unit 125 and the attraction update unit 123 illustrated in FIG. 5. The storage unit 1d illustrated in FIG. 1 is realized by the attraction information storage unit 124 illustrated in FIG. 5. The traffic control unit 1e illustrated in FIG. 1 is realized by the traffic control unit 130 illustrated in FIG. 5.

In the first embodiment, a proportional distribution method is adopted as a traffic distribution method based on traffic attraction. If the proportional distribution method is adopted, in the centralization mode, packets with the destinations of an edge node are distributed proportionally according to traffic attraction of each link.

Information held in the router 100 will now be described in detail.

FIG. 6 illustrates an example of the structure of data in the traffic storage unit. The traffic storage unit 122 stores a traffic management table 122a. The traffic management table 122a includes Communication Interface, Inflow Traffic Volume, Link Capacity, Outflow Traffic Volume, and Traffic Use Limit Value columns.

The identifier of a communication interface connected to another router in the network 10 is set in the Communication Interface column. As illustrated in FIG. 3, the two communication interfaces 107a and 107b of the router 100 are connected to the routers 100d and 100e, respectively, in the network 10. Therefore, the identifiers of the communication interfaces 107a and 107b are set in the Communication Interface column.

The volume of traffic which is transmitted into a corresponding communication interface, is set in the Inflow Traffic Volume column. The volume of traffic is indicated by inflow data capacity per second.

Maximum link transmission capacity at the time of performing communication using a corresponding communication interface is set in the Link Capacity column. Link capacity is indicated by data capacity which can transmit in per second.

The volume of traffic which transmits out via a corresponding communication interface is set in the Outflow Traffic Volume column. The volume of traffic is indicated by outflow data capacity per second.

The threshold of the usage of traffic which can flow out via a corresponding communication interface without causing congestion is set in advance in the Traffic Use Limit Value column.

Figure 7:
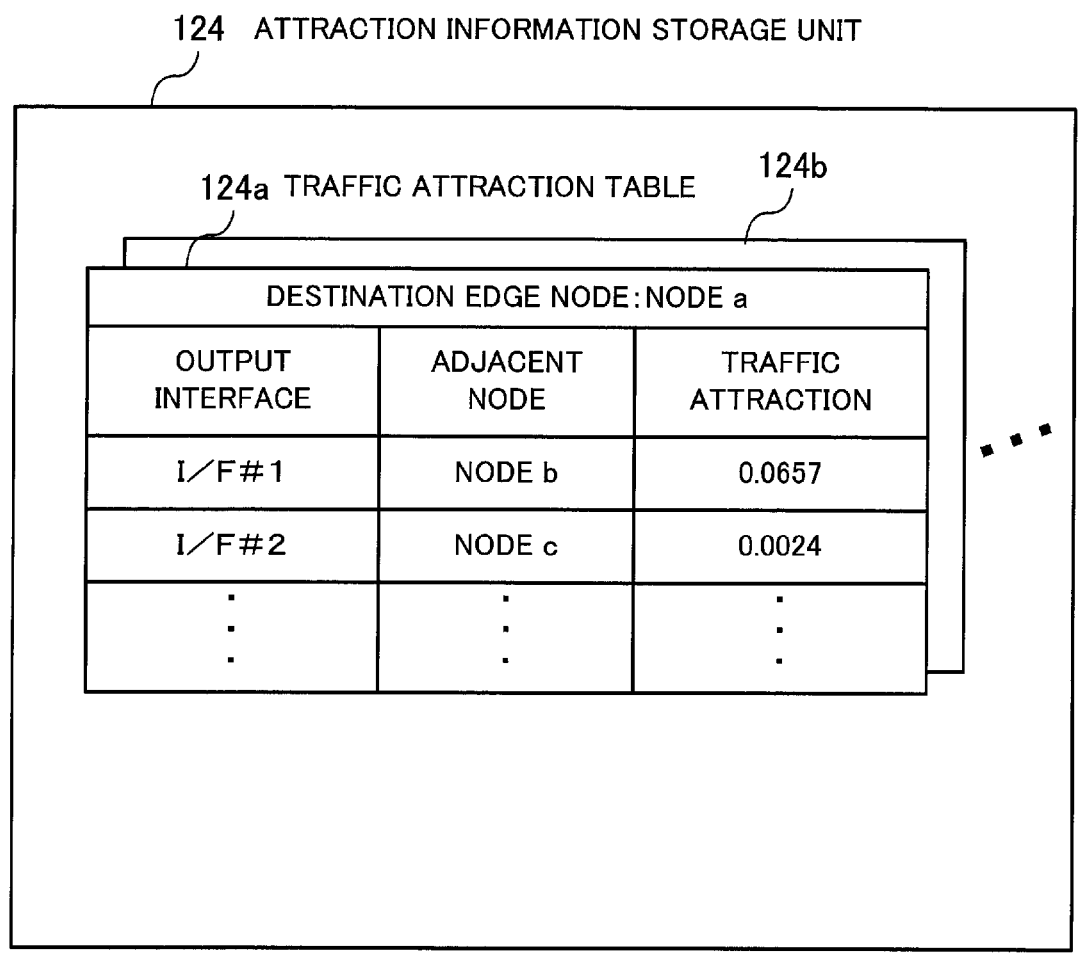

FIG. 7 illustrates an example of the structure of data in the attraction information storage unit. The attraction information storage unit 124 stores traffic attraction tables 124a, 124b, and so on according to edge nodes which are destinations. The identifier of an edge node which is a destination is set in each of the traffic attraction table 124a, 124b, and so on. The traffic attraction table 124a includes Output Interface, Adjacent Node, and Traffic Attraction columns.

The identifier of a communication interface which sends a packet with the destination of the corresponding edge node, is set in the Output Interface column.

The identifier of another router (adjacent node) connected via a corresponding communication interface is set in the Adjacent Node column.

Traffic attraction of a link, which communicates with the corresponding edge node as a traffic destination using a corresponding communication interface, is set in the Traffic Attraction column.

A control packet sending process will now be described.

Figure 8:
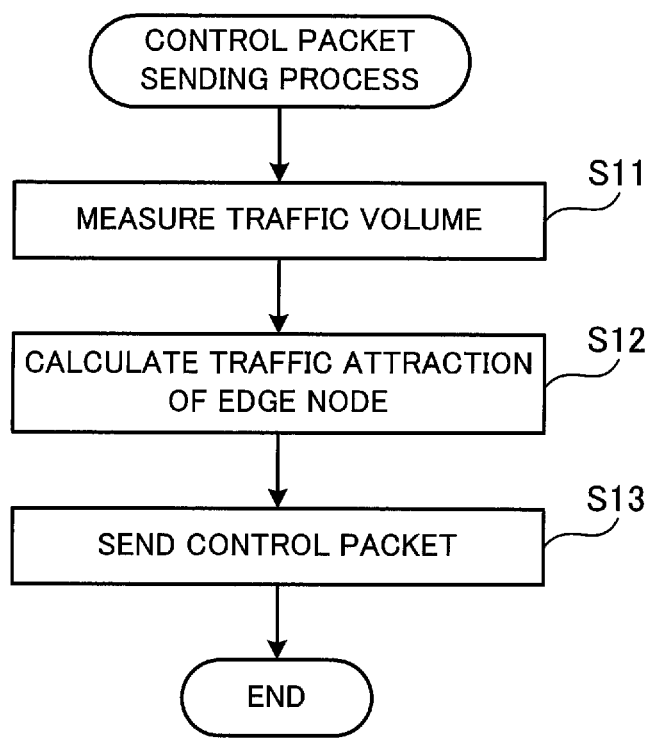

FIG. 8 is a flow chart of a procedure for a control packet sending process. This process is performed by each router which operates as an edge node. It is assumed that this process is performed by the router 100. The process illustrated in FIG. 8 will now be described in order of step number.

[Step S11] The traffic measurement unit 121 periodically measures inflow traffic volume according to communication interfaces. The traffic measurement unit 121 stores the inflow traffic volume measured in the traffic storage unit 122.

[Step S12] The attraction update unit 123 calculates traffic attraction of the router 100 itself which is an edge node, and inputs the traffic attraction of the router 100 itself to the control packet management unit 125.

[Step S13] When the control packet management unit 125 receives the traffic attraction, the control packet management unit 125 broadcasts a control packet including the traffic attraction of the router 100 itself via each communication interface.

By following the above procedure, the control packet is broadcast from the router which functions as an edge node.

Figure 9:
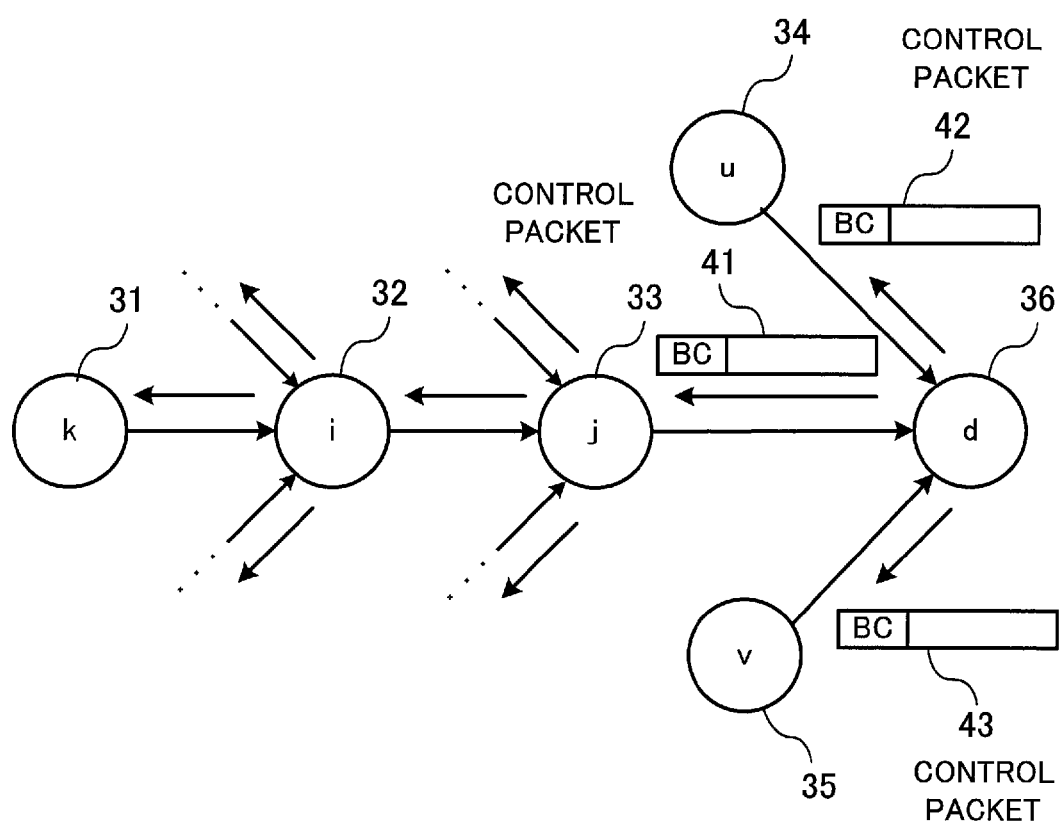

FIG. 9 is a schematic view of control packet sending status. FIG. 9 illustrates a route (transmission route) from an edge node 31 via relay nodes 32 and 33 to an edge node 36. It is assumed that in addition to this route, there are a link between the edge node 36 and a relay node 34 and a link between the edge node 36 and a relay node 35 and that traffic flows in from each link.

The directions in which traffic is transmitted into the relay nodes 32 and 33 and the edge node 36 are indicated by arrows. It is assumed that the identifiers of the edge node 31, the relay nodes 32, 33, 34, and 35, and the edge node 36 are "k," "i," "u," "v," and "d" respectively.

First the edge node 36 calculates its traffic attraction in order to determine traffic attraction of each link on the above route. The traffic attraction $\tau_d(d)$ of the edge node 36 is given by the formula:

$$\tau_d(d) = \max_x(Tr_{x,d}/Cr_{x,d}) \quad (1)$$

where $\tau$ indicates traffic attraction and a subscript of "$\tau$" is the identifier of an edge node which has the traffic attraction. In formula (1) a subscript of "$\tau$" is "d."

A character in the parentheses of the left side indicates traffic attraction regarding traffic with the destination of an edge node. In formula (1), a character in the parentheses of the left side is "d," so "$\tau_d(d)$" indicates the traffic attraction regarding traffic with the destination of the edge node 36 which is "d" (self-attraction value indicative of the inherent attraction of the edge node 36).

"$\max_x(Tr_{x,d}/Cr_{x,d})$" indicates that calculations are performed using the expression in the parentheses for all elements x and that a maximum value of calculation results is adopted. The element x is the identifier of another router that has a link with the edge node which is calculating its traffic attraction. In the example illustrated in FIG. 9, each of the relay nodes 33 through 35 has a link with the edge node 36, so the element x is each of the values "j," "u," and "v."

"T" indicates traffic volume of a link. A left subscript of "T" indicates the identifier of a router out of which traffic is transmitted, and a right subscript of "T" indicates the identifier of a router into which the traffic is transmitted. Therefore, "$Tr_{x,d}$" indicates the volume of traffic that is transmitted from a router (edge node or a relay node) which is "x" into the edge node 36 which is "d."

"C" indicates link capacity (maximum data transmission capacity). A left subscript of "C" indicates the identifier of a router out of which traffic is transmitted along a corresponding link, and a right subscript of "T" indicates the identifier of a router into which the traffic is transmitted along the corresponding link. Therefore, "$Cr_{x,d}$" indicates the capacity of a link from a router which is "x" to the edge node 36 which is "d." The traffic volume and the link capacity can be acquired from the traffic storage unit 122.

The expression "$Tr_{x,d}/Cr_{x,d}$" in the parentheses of the right side of formula (1) indicates the usage of traffic to link capacity. The edge node 36 has three links along which traffic is transmitted in. Therefore, on the basis of formula (1), a largest value of the traffic usage values of these links is the traffic attraction $\tau_d(d)$ of the edge node 36.

The traffic attraction $\tau_d(d)$ calculated is included in a control packet 41. A broadcast address ("BC" in FIG. 9) is set as a destination address of the control packet 41. The control packet 41 including the traffic attraction $\tau_d(d)$ is broadcast.

Similarly, the edge node 36 generates control packets 42 and 43 individually including the traffic attraction $\tau_d(d)$ and broadcasts the control packets 42 and 43 via corresponding links. The relay nodes 34 and 35 which receive the control packets 42 and 43 calculate traffic attraction $\tau_{u,d}(d)$ and $\tau_{v,d}(d)$ corresponding to "the link between the relay node 34 and the edge node 36" and "the link between the relay node 35 and the edge node 36" respectively.

The control packet 41 sent from the edge node 36 is received by the relay node 33. The control packet 41 is then propagated to the relay node 33, the relay node 32, and the edge node 31 in that order. In order to avoid a control packet transmission loop, a node which receives a same control packet does not transmit the control packet twice.

A control packet propagation process will now be described in detail.

Figure 10:
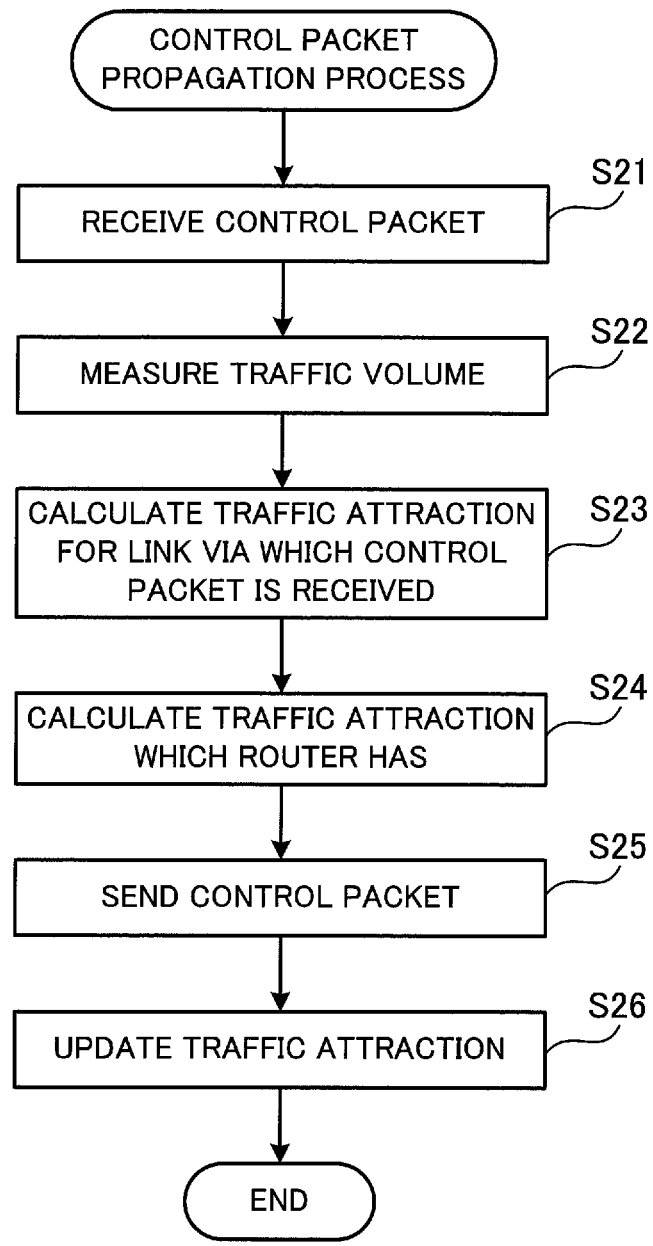

FIG. 10 is a flow chart of a procedure for a control packet propagation process. It is assumed that the router 100 functions as a relay node. A control packet propagation process which is illustrated in FIG. 10 and which is performed by the router 100 will now be described in order of step number.

[Step S21] The control packet management unit 125 receives a control packet. The control packet management unit 125 inputs traffic attraction included in the received control packet to the attraction update unit 123.

[Step S22] The traffic measurement unit 121 measures inflow traffic volume according to communication interfaces. The traffic measurement unit 121 can measure inflow traffic volume periodically without waiting till receiving the control packet. The traffic measurement unit 121 stores the inflow traffic volume measured in the traffic storage unit 122.

[Step S23] The attraction update unit 123 uses the traffic attraction included in the control packet, weights a link via which the control packet is received, and calculates traffic attraction of the router 100 regarding traffic with the destination of an edge node that generates the control packet. By weighting, a higher volume of traffic can be assigned to a link to which traffic is transmitted more frequently. The weighted traffic attraction is traffic attraction for the link via which the control packet is received.

[Step S24] The attraction update unit 123 then updates traffic attraction of the router 100 regarding traffic with the destination of the edge node using the calculated traffic attraction for the link via which the control packet is received, and inputs the traffic attraction of the router 100 regarding traffic with the destination of the edge node to the control packet management unit 125.

[Step S25] The control packet management unit 125 sets the traffic attraction of the router 100 regarding traffic with the destination of the edge node in the control packet and broadcasts the control packet via communication interfaces connected to links other than the link via which the control packet is received.

[Step S26] The attraction update unit 123 updates traffic attraction stored in the attraction information storage unit 124 using the traffic attraction for the link calculated in step S23 via which the control packet is received. Traffic attraction for the link, via which the control packet is received regarding traffic with destination of the edge node that generates the received control packet, is updated.

By following the above procedure, the control packet is propagated in order by a router which functions as a relay node, and traffic attraction in the relay node is updated.

Figure 11:
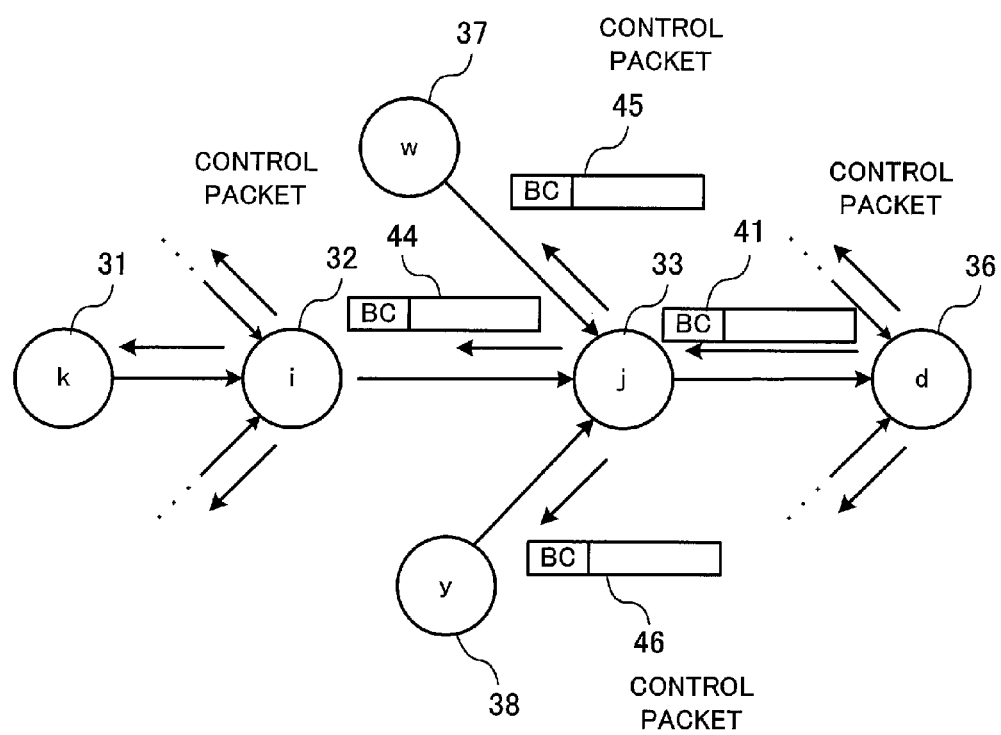

FIG. 11 is a schematic view of control packet propagation status. FIG. 11 illustrates control packet propagation status at a relay node 33 on a route from an edge node 31 via a relay node 32 and the relay node 33 to an edge node 36. It is assumed that in addition to a link with the relay node 32, the relay node 33 has a link with a relay node 37 and a link with a relay node 38, that traffic is transmitted in from each link, and that the identifiers of the relay nodes 37 and 38 are "w" and "y" respectively.

First the relay node 33 which receives a control packet 41 from the edge node 36 calculates traffic attraction of a link (control packet receiving link) via which the control packet 41 is received by the use of traffic attraction $\tau_d(d)$ included in the received control packet 41. Traffic with the destination of the edge node 36 is sent via this control packet in the received link. By using the weight parameter $\omega_{j,d}$, the traffic attraction $\tau_{j,d}(d)$ of the link between the relay node 33 and the edge node 36 the identifier of which is "d" is given by the formula:

$$\tau_{j,d}(d) = \omega_{j,d} \times \tau_d(d) \qquad (2)$$

$$\omega_{j,d} = Tr_{j,d}/Cr_{j,d} \qquad (3)$$

A left subscript of "$\tau$" of the left side of formula (2) is the identifier of a router out of which traffic is transmitted and a right subscript of "$\tau$" of the left side of formula (2) is the identifier of a router into which the traffic is transmitted. Therefore, "$\tau_{j,d}(d)$" is traffic attraction for the link between the relay node 33 which is "j" and the edge node 36 which is "d."

A character in the parentheses of the left side of formula (2) indicates traffic attraction regarding traffic with the destination of an edge node. In formula (2) a character in the parentheses of the left side is "d," so "$\tau_{j,d}(d)$" is traffic attraction regarding traffic with the destination of the edge node 36 which is "d."

$\omega$ is a weight parameter on a link. A left subscript of "$\omega$" is the identifier of a router out of which traffic is transmitted along a corresponding link and a right subscript of "$\omega$" is the identifier of a router into which the traffic is transmitted along the corresponding link. Therefore, "$\omega_{j,d}$" is a weight parameter on the link between the relay node 33 which is "j" and the edge node 36 which is "d."

"$Tr_{j,d}$" is the volume of traffic which is sent from the relay node 33 which is "j" to the edge node 36 which is "d." "$Cr_{j,d}$" is the capacity of the link from the relay node 33 which is "j" to the edge node 36 which is "d."

The relay node 33 then calculates traffic attraction of the relay node 33 itself regarding traffic with the destination of the edge node 36. The traffic attraction $\tau_j(d)$ of the relay node 33 is given by the formula:

$$\tau_j(d) = \text{AVERAGE}\{\max_x(Tr_{x,j}/Cr_{x,j}), \tau_{j,d}(d)\} \quad (4)$$

where "AVERAGE" indicates the average of the values of elements separated by a comma in the braces.

"$\max_x(Tr_{x,j}/Cr_{x,j})$" indicates that calculations are performed using the expression in the parentheses for all elements x and that a maximum value of calculation results is adopted. The element x is the identifier of another router that has a link with the relay node 33 which calculates its traffic attraction. In the example illustrated in FIG. 11, each of the edge node 36 and the relay nodes 32, 37, and 38 has the link with the relay node 33, so the element x is each of the values "i," "d," "w," and "y." The value of "$\max_x(Tr_{x,j}/Cr_{x,j})$" is a self-attraction value indicative of the inherent attraction of the relay node 33 the identifier of which is "j."

"$Tr_{x,j}$" is the volume of traffic which is transmitted from a router (edge node or a relay node) which is "x" into the relay node 33 which is "j." "$Cr_{x,j}$" is the capacity of a link from the router which is "x" to the relay node 33 which is "j." "$(Tr_{x,j}/Cr_{x,j})$" is the usage of the link.

$\tau_{j,d}(d)$ is traffic attraction for the link between the relay node 33 which is "j" and the edge node 36 which is "d" regarding traffic with the destination of the edge node 36 which is "d." This traffic attraction is calculated by the use of formulae (2) and (3) on the basis of the traffic attraction included in the control packet 41 sent from the edge node 36 and the volume of traffic which is transmitted along the link between the relay node 33 which is "j" and the edge node 36 which is "d."

By using formula (4), the average of the self-attraction value and the traffic attraction for the link which the relay node 33 calculates is obtained. This average is traffic attraction of the relay node 33 regarding traffic with the destination of the edge node 36.

In formula (4), the average (AVERAGE) of "$\max_x(Tr_{x,j}/Cr_{x,j})$" and "$\tau_{j,d}(d)$" is found. However, if a value other than the average becomes larger as "$\max_x(Tr_{x,j}/Cr_{x,j})$" and "$\tau_{j,d}(d)$" become larger, this value may be adopted. For example, the product of "$\max_x(Tr_{x,j}/Cr_{x,j})$" and "$\tau_{j,d}(d)$" may be considered as traffic attraction $\tau_j(d)$.

Furthermore, "$\max_x(Tr_{x,j}/Cr_{x,j})$" included in formula (4) may be replaced with "$\text{sum}_x(Tr_{x,j}/Cr_{x,j})$." "$\text{sum}_x(Tr_{x,j}/Cr_{x,j})$" is the total of "$(Tr_{x,j}/Cr_{x,j})$" for all elements x.

The traffic attraction $\tau_j(d)$ calculated in this way is included in a control packet 44. A broadcast address ("BC" in FIG. 11) is set as a destination address of the control packet 44. The control packet 44 is then broadcast via the corresponding link.

Similarly, the relay node 33 generates control packets 45 and 46 each including traffic attraction $\tau_j(d)$. A broadcast address is set as a destination address of each control packet. The control packets 45 and 46 are then broadcast via the corresponding links.

The relay node 32 which receives the control packet 44 calculates traffic attraction for the link along which traffic with the destination of the edge node 36 is transmitted out. By using the weight parameter $\omega_{i,j}$, the traffic attraction $\tau_{i,j}(d)$ for the link between the relay node 33 and the relay node 32 which is "i" is given by the formula:

$$\tau_{i,j}(d) = \omega_{i,j} \times \tau_j(d) \quad (5)$$

$$\omega_{i,j} = Tr_{i,j}/Cr_{i,j} \quad (6)$$

"$\tau_{i,j}(d)$" is the traffic attraction for the link between the relay node 32 which is "i" and the relay node 33 which is "j."

"$\omega_{i,j}$" is a weight parameter on the link between the relay node 32 which is "i" and the relay node 33 which is "j."

"$Tr_{x,j}$" is the volume of traffic which is sent from the relay node 32 the identifier of is "i" to the relay node 33 which is "j."

"$Cr_{i,j}$" is the capacity of the link from the relay node 32 the identifier of is "i" to the relay node 33 which is "j."

The relay node 32 also performs the above control packet propagation process. Each router which acquires a control packet calculates traffic attraction for a link via which the control packet is received from traffic attraction included in the acquired control packet, associates the traffic attraction with the link, and stores the traffic attraction. As a result, each of the edge node 31 and the relay node 32 and 33 illustrated in FIG. 11 stores traffic attraction regarding traffic with the destination of the edge node 36.

Traffic attraction regarding traffic with the destination of an edge node is stored in each router. As a result, when each router receives a packet or a packet flow with the destination of the edge node, it distributes the packet or the packet flow on the basis of the traffic attraction.

A traffic control process performed by the use of traffic attraction will now be described in detail.

Figure 12:
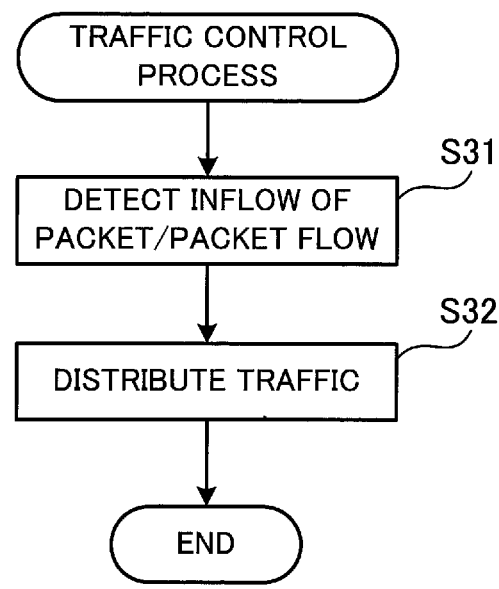

FIG. 12 is a flow chart of a procedure for a traffic control process. It is assumed that the router 100 exercises traffic control. The process illustrated in FIG. 12 will now be described in order of step number.

[Step S31] The traffic control unit 130 detects the inflow of a packet or a packet flow.

[Step S32] The traffic control unit 130 distributes the packets or the packet flow which is transmitted in between the links connected to the router 100 on the basis of traffic attraction. At this time, the traffic control unit 130 refers to the mode information storage unit 126 and determines a current traffic distribution mode. If the current traffic distribution mode is the centralization mode, then the traffic control unit 130 stochastically distributes packets with a specific destination between the links according to the magnitude of traffic attraction set for each link regarding traffic with the specific destination. In the first embodiment packet distribution is performed according to traffic attraction by a proportional distribution method.

Figure 13:
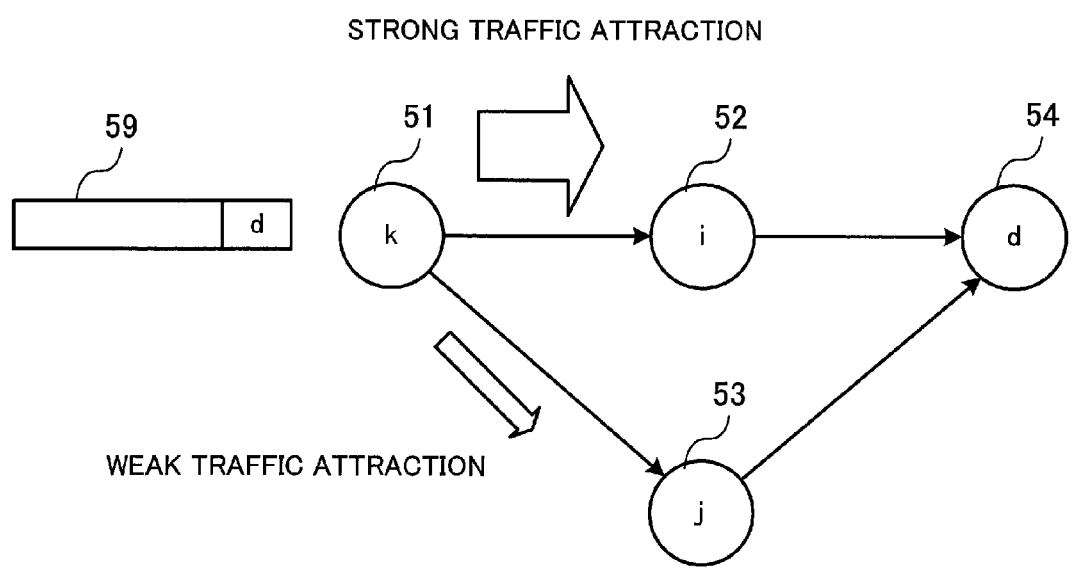

FIG. 13 illustrates the concept of packet distribution. In the example illustrated in FIG. 13, a packet 59 the destination of which is an edge node 54 the identifier of which is "d" is inputted to an edge node 51 the identifier of which is "k." There are a route via a relay node 52 and a route via a relay node 53 between the edge nodes 51 and 54.

In the example illustrated in FIG. 13, traffic attraction set for a link between the edge node 51 and the relay node 52 is more powerful than traffic attraction set for a link between the edge node 51 and the relay node 53. In this case, the packet 59 will be transmitted to the relay node 52 with a high probability.

The probability $P_{k,i}(d)$ that the relay node 52 the identifier of which is "i" is selected as a relay node to which a packet with the destination of the edge node 54 which is "d" is transmitted is given by the formula:

$$P_{k,i}(d) = \tau_{k,i}(d)/\Sigma_I \tau_{k,I}(d) \quad (7)$$

"P" indicates a packet distribution probability. A left subscript of "P" is the identifier of a router out of which a packet is transmitted, and a right subscript of "P" is the identifier of a router into which the packet is transmitted. A character in the parentheses of the left side of formula (7) indicates a probability for a packet with the destination of an edge node.

Therefore, "$P_{k,i}(d)$" indicates the probability that the packet is transmitted from the edge node 51 which is "k" to the relay node 52 which is "i."

"$\tau_{k,i}(d)$" is traffic attraction for the link between the edge node 51 which is "k" and the relay node 52 which is "i" regarding traffic with the destination of the edge node 54 which is "d."

"$\Sigma_l \tau_{k,l}(d)$" is the total of "$\tau_{k,l}(d)$" for all elements l. The element l is the identifier of each of other nodes connected by links to the edge node 51 which is a source. In the example illustrated in FIG. 13, the element l is each of "i" and "j" which are the identifiers of the relay nodes 52 and 53 respectively.

That is to say, the right side of formula (7) indicates the relative ratio of the traffic attraction defined for the link from the edge node 51 to the relay node 52 regarding traffic with the destination of the edge node 54 to the total of traffic attraction of all links defined for the edge node 51. This relative ratio is the probability that the relay node 52 is selected as a relay node to which the packet 59 with the destination of the edge node 54 will be transmitted.

The probability, which a relay node to which the packet 59 is transmitted will be selected, is determined by the use of formula (7). A relay node to which the packet 59 is transmitted is determined in accordance with the determined probability. For example, the edge node 51 can use a random number for performing packet distribution in accordance with probabilities. In this case, the edge node 51 assigns a numeric value range corresponding to a probability of a predetermined numeric value range to each link. It is assumed that there are two links, that one link has a probability of 0.8 (one link will be selected with a probability of 0.8), that the other link has a probability of 0.2 (the other link will be selected with a probability of 0.2), and that an entire numeric value range is 1 to 100. A numeric value range of 1 to 80 is assigned to the link having a probability of 0.8, and a numeric value range of 81 to 100 is assigned to the link having a probability of 0.2. When the edge node 51 determines the links between which a packet or a packet flow is distributed, the edge node 51 generates a random number which is within the entire numeric value range of 1 to 100. A link to which the generated random number is assigned is selected as a link along which the packet or the packet flow is transmitted.

The above packet distribution probability is calculated individually according to packet destinations.

FIG. 14 illustrates an example of calculating packet distribution probabilities according to destinations. In the example illustrated in FIG. 14, three relay nodes 62 through 64 are connected to an edge node 61. In addition to the edge node 61, two edge nodes 65 and 66 are included in a network. The identifiers of the edge nodes 65 and 66 and the relay nodes 62 through 64 are "A," "B," "C," "D," and "E" respectively.

It is assumed that a packet 67 with the destination of the edge node 65 which is "A" and a packet 68 with the destination of the edge node 66 which is "B" are inputted to the edge node 61. The edge node 61 has a traffic attraction table 61a for assigning the packet 67 with the destination of the edge node 65 and a traffic attraction table 61b for assigning the packet 68 with the destination of the edge node 66.

When the packet 67 with the destination of the edge node 65 which is "A" is inputted to the edge node 61, the edge node 61 uses the traffic attraction table 61a corresponding to the edge node 65 for calculating an assignment probability for each of links with the relay nodes 62 through 64.

In the traffic attraction table 61a, for example, traffic attraction for an interface (I/F #1) connected to the link between the edge node 61 and the relay node 62 which is "C" is "$\tau_1$." Traffic attraction for an interface (I/F #2) connected to the link between the edge node 61 and the relay node 63 which is "D" is "$\tau_2$." Traffic attraction for an interface (I/F #3) connected to the link between the edge node 61 and the relay node 64 which is "E" is "$\tau_3$."

Accordingly, the packet 67 will be transmitted to the relay node 62 the identifier of which is "C" with a probability of "$\tau_1/(\tau_1+\tau_2+\tau_3)$." The packet 67 will be transmitted to the relay node 63 which is "D" with a probability of "$\tau_2/(\tau_1+\tau_2+\tau_3)$." The packet 67 will be transmitted to the relay node 64 which is "E" with a probability of "$\tau_3/(\tau_1+\tau_2+\tau_3)$."

When a large number of packets 67 with the destination of the edge node 65 which is "A" are inputted, the above calculations are performed and the packets 67 are proportionally distributed among the relay nodes 62 through 64 according to the value of the traffic attraction. Similarly, packets 68 with the destination of the edge node 66 which is "B" are proportionally distributed on the basis of the traffic attraction table 61b corresponding to the edge node 66.

A state change at the time of traffic centralization will now be described with reference to FIGS. 15 through 17.

Figure 15:
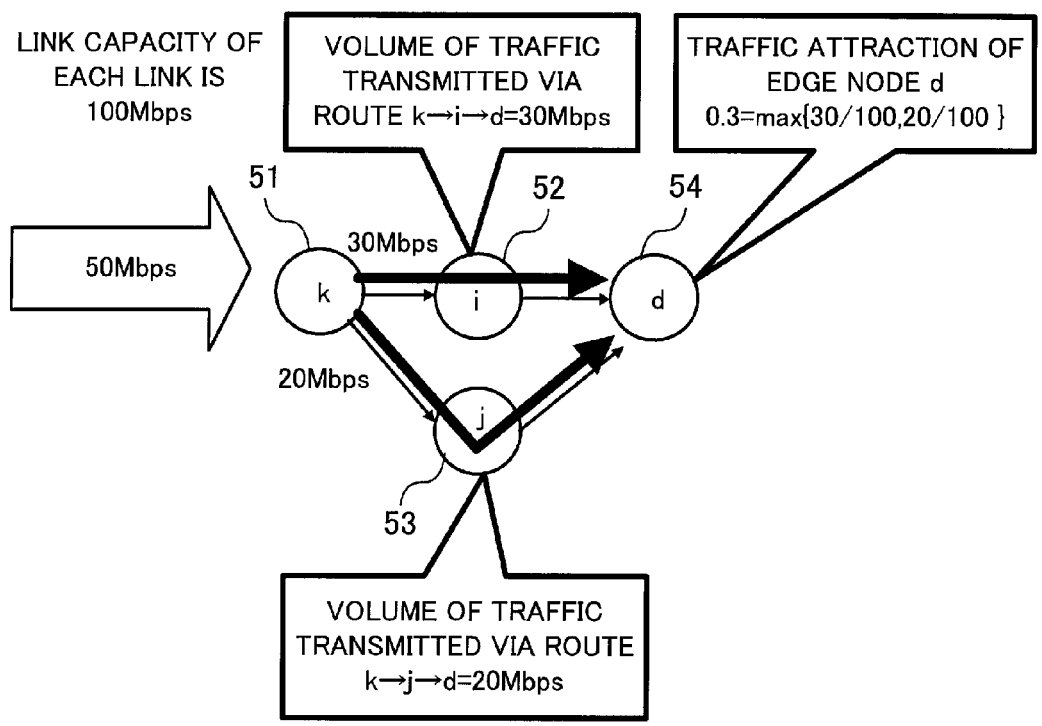

FIG. 15 illustrates the status of packet distribution performed by the proportional distribution method. Network structure illustrated in FIG. 15 is the same as that illustrated in FIG. 13. It is assumed that the capacity of each link between routers is 100 Mbps.

In the example illustrated in FIG. 15, only 50 Mbps of traffic with the destination of an edge node 54 is inputted to an edge node 51. 30 Mbps of the traffic inputted to the edge node 51 is transmitted to the edge node 54 along a route via a relay node 52. The remaining 20 Mbps is transmitted to the edge node 54 along a route via a relay node 53.

The edge node 54 calculates its traffic attraction by the use of formula (1) on the basis of the volume of the traffic which is transmitted in. The usage ($Tr_{i,d}/Cr_{i,d}$) of the traffic which is transmitted in from the relay node 52 which is "i" to the link capacity is "30/100=0.3." The usage ($Tr_{j,d}/Cr_{j,d}$) of the traffic which is transmitted in from the relay node 53 which is "j" to the link capacity is "20/100=0.2." The maximum value of the usage is "0.3." Therefore, the traffic attraction $\tau_d(d)$ of the edge node 54 is "0.3."

A control packet including this traffic attraction is broadcast from the edge node 54 via the corresponding links.

Each of the relay nodes 52 and 53 then calculates traffic attraction for the link connected to the edge node 54 by the use of formulae (2) and (3) on the basis of the traffic attraction $\tau_d(d)$ of the edge node 54.

Figure 16:
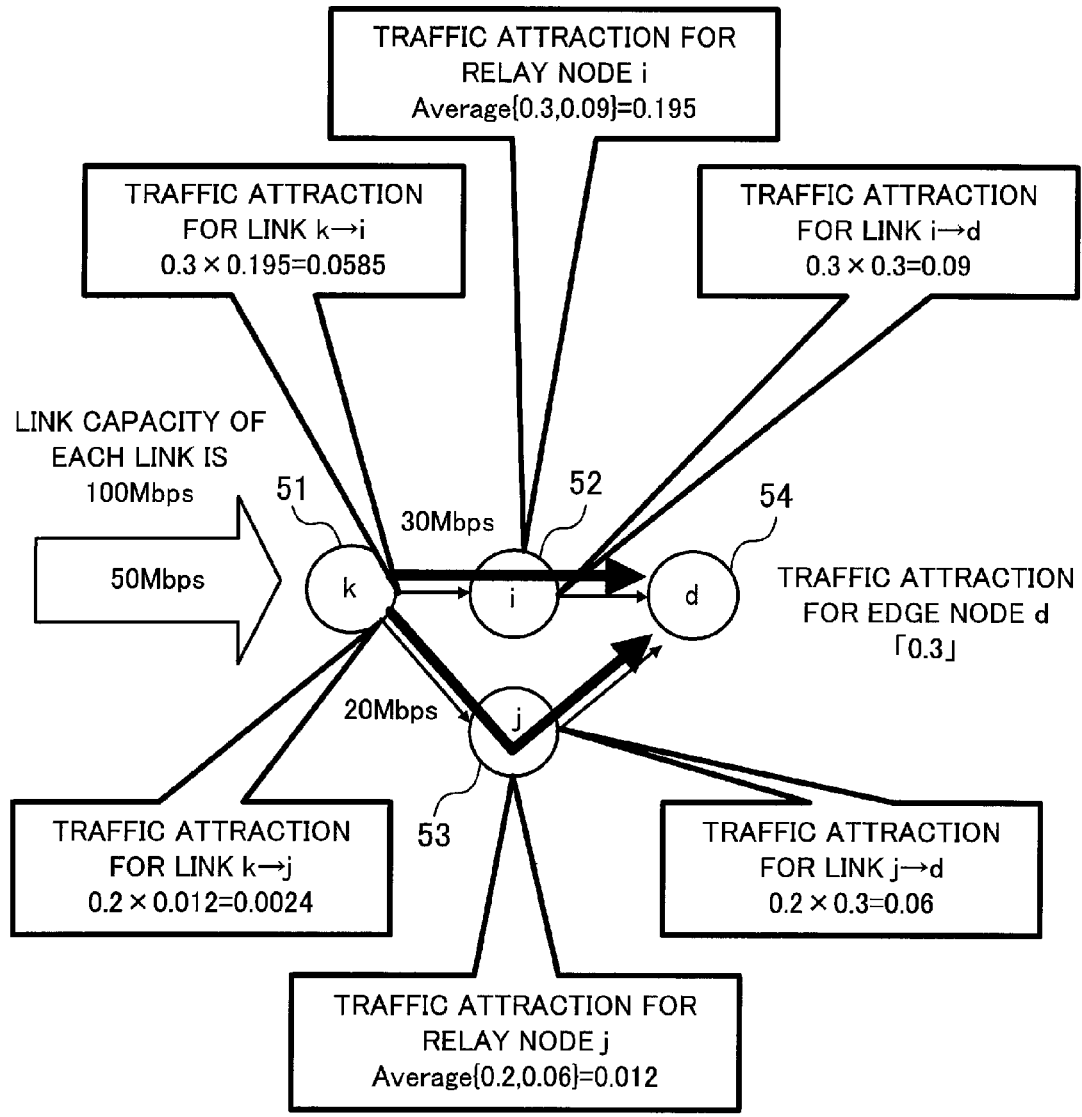

FIG. 16 illustrates the status of updating traffic attraction by propagating a control packet. Each of the relay nodes 52 and 53 associates the traffic attraction for the link set with a communication interface from which traffic is sent to the link.

The weight parameter $\omega_{i,d}$ on the link from the relay node 52 to the edge node 54 is $Tr_{i,d}/Cr_{i,d}=0.3$. The result "0.09" obtained by multiplying the traffic attraction "0.3" for the edge node 54 by the value "0.3" of the weight parameter is the traffic attraction for the link from the relay node 52 to the edge node 54. The relay node 52 associates this traffic attraction with a communication interface connected to the edge node 54, and stores this traffic attraction.

The weight parameter $\omega_{j,d}$ on the link from the relay node 53 to the edge node 54 is $Tr_{j,d}/Cr_{j,d}=0.2$. The result "0.06" obtained by multiplying the traffic attraction "0.3" for the edge node 54 by the value "0.2" of the weight parameter is the traffic attraction for the link from the relay node 53 to the edge node 54. The relay node 53 associates this traffic attraction with a communication interface connected to the edge node 54, and stores this traffic attraction.

Each of the relay nodes 52 and 53 calculates its traffic attraction by the use of formula (4) on the basis of the traffic attraction set for the link with the edge node 54.

The traffic flows from the edge node 51 into the relay node 52. The usage "$Tr_{k,i}/Cr_{k,i}$" of a link with the edge node 51 is "30/100=0.3." In the example illustrated in FIG. 16, there is no other link along which traffic is transmitted in. Accordingly, a maximum value is "0.3." The average "0.195" of this maximum value and the traffic attraction "0.09" for the link from the relay node 52 to the edge node 54 is the traffic attraction of the relay node 52.

The traffic is transmitted from the edge node 51 into the relay node 53. The usage "$Tr_{k,j}/Cr_{k,j}$" of a link with the edge node 51 is "20/100=0.2." In the example illustrated in FIG. 16, there is no other link along which traffic is transmitted in. Accordingly, a maximum value is "0.2." The average "0.012" of this maximum value and the traffic attraction "0.06" for the link from the relay node 53 to the edge node 54 is the traffic attraction of the relay node 53.

Furthermore, the edge node 51 receives a control packet from each of the relay nodes 52 and 53 and calculates traffic attraction for the links with the relay nodes 52 and 53 by the use of formulae (5) and (6).

The weight parameter $\omega_{k,i}$ on the link from the edge node 51 to the relay node 52 is "30/100=0.3." The result "0.0585" obtained by multiplying the traffic attraction "0.195" for the relay node 52 by the value "0.3" of the weight parameter is the traffic attraction for the link from the edge node 51 to the relay node 52. The edge node 51 associates this traffic attraction with a communication interface connected to the relay node 52, and stores this traffic attraction.

The weight parameter $\omega_{k,j}$ on the link from the edge node 51 to the relay node 53 is "20/100=0.2." The result "0.0024" obtained by multiplying the traffic attraction "0.012" of the relay node 53 by the value "0.2" of the weight parameter is the traffic attraction for the link from the edge node 51 to the relay node 53. The edge node 51 associates this traffic attraction with a communication interface connected to the relay node 53, and stores this traffic attraction.

The edge node 51 proportionally distributes packets with the destination of the edge node 54 according to traffic attraction set for each communication interface with a probability given by formula (7).

Figure 17:
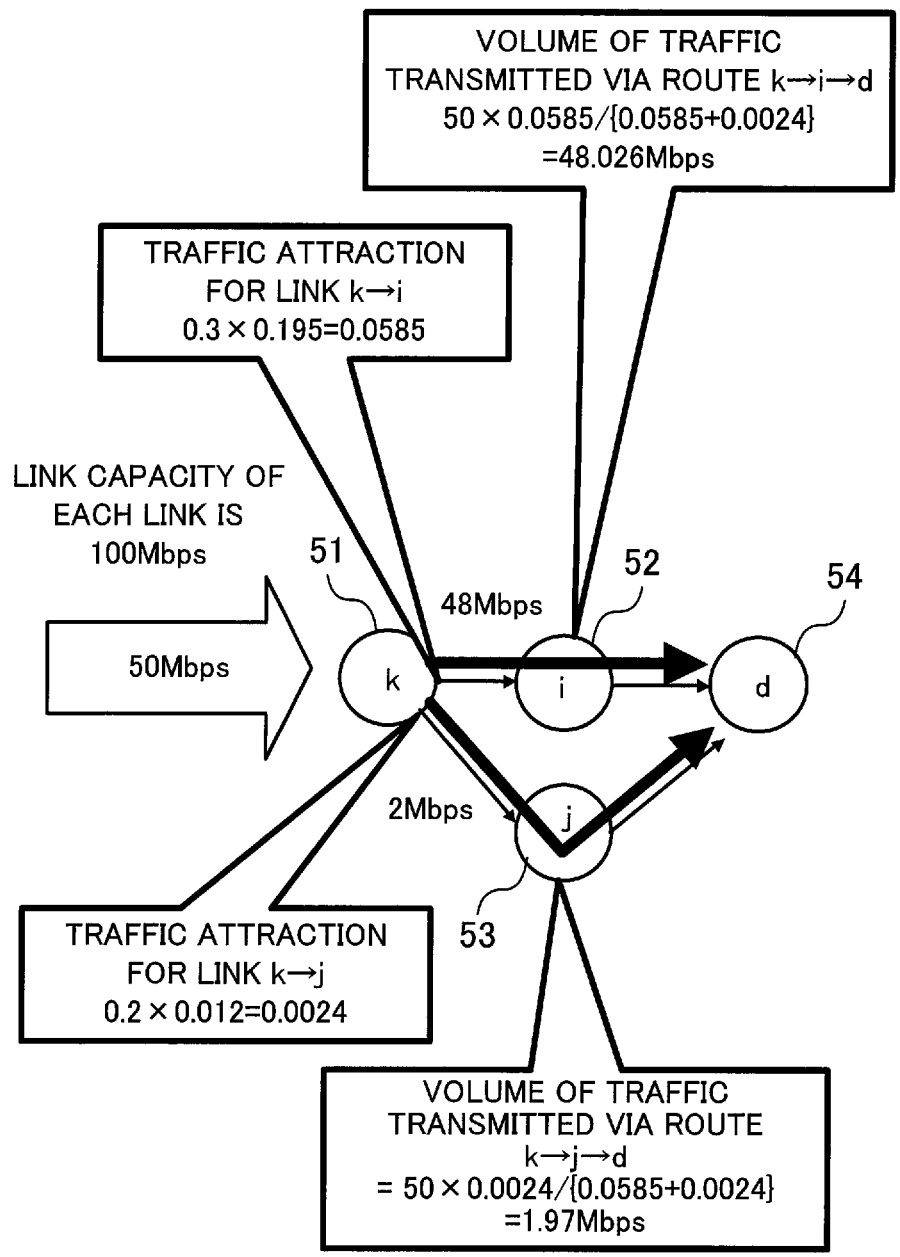

FIG. 17 illustrates packet distribution status after updating traffic attraction. The probability $P_{k,i}(d)$ that the edge node 51 assigns traffic to the link with the relay node 52 is "0.0585/{0.0585+0.0024}." Traffic volume which is 50 Mbps and which is inputted to the edge node 51 is transmitted to the relay node 52 with this probability $P_{k,i}(d)$. As a result, the volume of traffic which is transmitted to the edge node 54 via the relay node 52 is 48. 026 Mbps (about 48 Mbps).

The probability $P_{k,j}(d)$ that the edge node 51 assigns traffic to the link with the relay node 53 is "0.0024/{0.0585+0.0024}." The traffic volume which is 50 Mbps and which is inputted to the edge node 51 is transmitted to the relay node 53 with this probability $P_{k,j}(d)$. As a result, the volume of traffic which is transmitted to the edge node 54 via the relay node 53 is 1.97 Mbps (about 2 Mbps).

Traffic centralization is promoted in this way. The ratio of traffic distribution is changed according to traffic attraction after update. After that, the destination edge node 54 calculates its traffic attraction. At this time a large value corresponding to collected traffic attraction is obtained. In addition, the volume of traffic transmitted via the relay node 52 increases, so the traffic attraction of the relay node 52 also becomes more powerful. Each time the traffic attraction of each router is updated, the degree of traffic centralization rises in this way. Eventually it is possible to prevent traffic from being transmitted via the relay node 53.

By the way, when the volume of entire traffic increases, a rise in the degree of traffic centralization easily causes congestion. Therefore, in this embodiment the following method is adopted. If there is a link along which traffic that exceeds a predetermined threshold is transmitted before the congestion, then a router which sends the traffic to the link sends alarm information using a control packet. Each router which receives the alarm information changes a traffic distribution mode from the centralization mode to the distribution mode.

Figure 18:
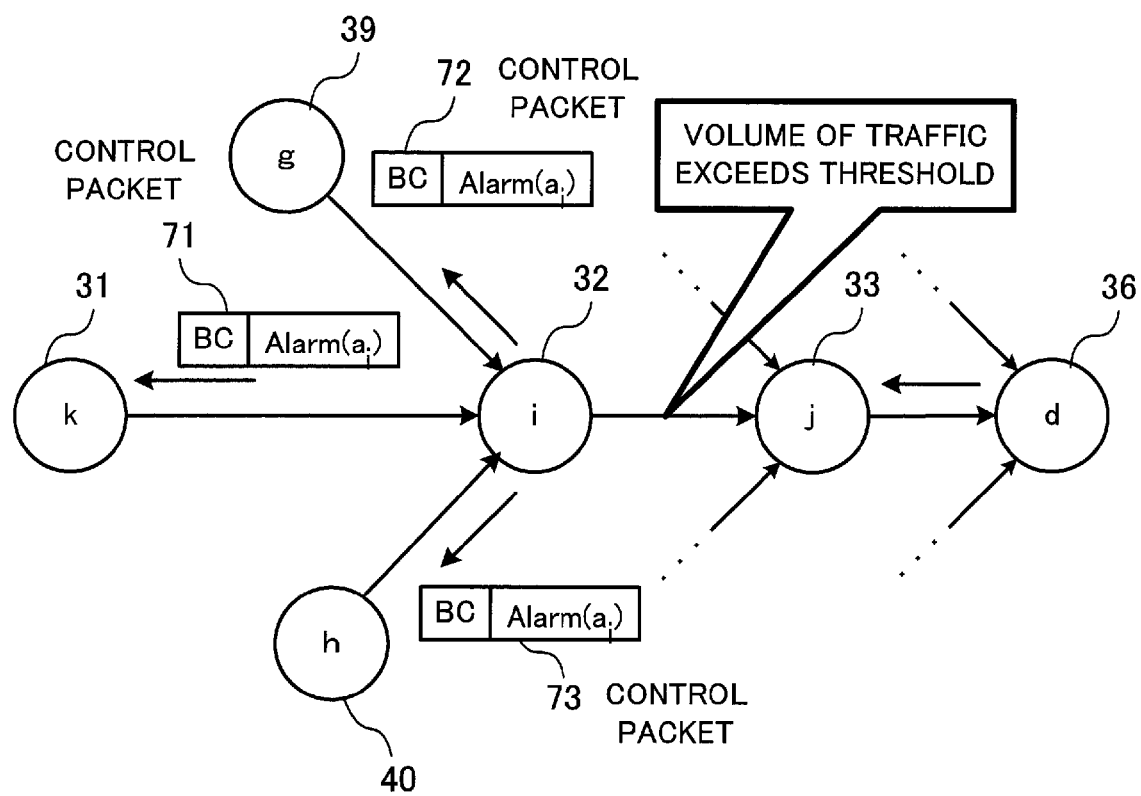

FIG. 18 illustrates alarm information transmission status. In the example illustrated in FIG. 18, it is assumed that the volume of traffic which is transmitted from a relay node 32 which is "i" to a relay node 33 which is "j" exceeds a traffic use limit value. In this case, the relay node 32 recognizes that the volume of the traffic sent via a link with the relay node 33 exceeds the traffic use limit value. The relay node 32 then generates alarm information ($a_i$) regarding the link (congestion avoidance link) on which the volume of the traffic exceeds the traffic use limit value.

In order to return the volume of traffic on each congestion avoidance link to the traffic use limit value or less, a control rate a is calculated periodically as the alarm information using the following formulae:

$$a_i[t]=a_i[t-1]+f_i(T_{i,j}-Tr_{i,j}[t]) \quad (8)$$

$$\text{initial value } a_i[0]=1 \quad (9)$$

A subscript of the control rate "a" is the identifier of a router which detects a congestion avoidance link. Accordingly, "$a_i[t]$" indicates that the relay node 32 detects a congestion avoidance link. "t" is an integer that indicates a period in which the control rate "a" is calculated. When the control rate is calculated for the first time after shifting from traffic distribution mode to the distribution mode, "t" is "1." Each time the control rate is calculated, the value of "t" is incremented by one. In formula (8) a control rate $a_i[t-1]$ calculated in the preceding period is used for calculating the control rate. Therefore, in order to make a calculation by the use of formula (8) possible at the time of calculating the control rate for the first time (when t=1), $a_i[0]$ is defined as "1" as indicated by formula (9).

"$T_{i,j}$" is a traffic use limit value. "$Tr_{i,j}[t]$" is the usage of a congestion avoidance link (traffic volume/link capacity) at the time of calculating the control rate in a t-th period.

The function $f_i$ is a feedback controller which is designed so that the traffic use limit value of the congestion avoidance link {i, j} will not be exceeded. A PI (Proportional-Integral) controller can be used as a typical feedback controller. If a PI controller is used, the control rate a is calculated by the use of the formulae:

$$a_i[t]=a_i[t-1]+P_I\times(e_{i,j}[t]-e_{i,j}[t-1])+I_I\times e_{i,j}[t] \quad (10)$$

$$e_{i,j}[t]=T_{i,j}-Tr_{i,j}[t] \quad (11)$$

"$P_I$" and "$I_I$" are control parameters on the PI controller. "e" indicates the difference between the traffic use limit value $T_{i,j}$ and the volume of traffic on the congestion avoidance link. In the formula (10), the controller controls the control rate "a" so that the difference will become small when the usage of the congestion avoidance link is high.

The control rate calculated in this way is included in the alarm information. Control packets 71 through 73 including the alarm information respectively are sent to an edge node 31 and relay nodes 39 and 40 respectively.

The edge node 31 which receives the control packet 71 including the alarm information changes its traffic distribution mode from the centralization mode to the distribution mode. When the edge node 31 receives the control packet 71 including the alarm information, the edge node 31 updates traffic attraction regarding traffic with the destination of an edge node 36 which is "d."

When the traffic attraction for each link is updated in the distribution mode, a calculation method depends on whether the traffic attraction for all links except a link, via which a control packet including alarm information is received, is 0.

If the traffic attraction for all links from the edge node 31 except a link from the edge node 31 to the relay node 32 is 0 (complete limitation state), then new traffic attraction is calculated by the use of the formulae:

$$\text{if}(\{\Sigma_l \tau_{k,l}\}=0)(l \ne i) \quad (12)$$

$$\tau_{k,i}(d) = a_i[t] \times \tau_{k,i}(d) \quad (13)$$

$$\tau_{k,l}(d) = (1-a_i[t]) \times \tau_{k,i}(d)/(\text{total number of links}-1) \quad (14)$$

The symbol "=" in formula (13) or (14) is a substitution operator which indicates that a value of the right side is substituted for a variable of the left side. Furthermore, a value obtained by performing a calculation by the use of formula (13) is substituted for "$\tau_{k,i}(d)$" in formula (14). In addition, the element l in formula (14) is the identifier of an adjacent router other than the router which is "i" and from which the alarm information is sent ($l \ne i$).

Formula (12) indicates a condition under which calculations are performed by the use of formulae (13) and (14). If the traffic attraction of all the links from the edge node 31 except the link from the edge node 31 to the relay node 32 which is "i" and from which the alarm information is sent is 0, then new traffic attraction is calculated by the use of formulae (13) and (14).

Formula (13) is used for calculating traffic attraction for the link from the edge node 31 to the relay node 32 which is "i" and from which the alarm information is sent. Formula (13) indicates that a result obtained by multiplying current traffic attraction and a control rate included in the alarm information together is set as new traffic attraction.

Formula (14) is used for calculating traffic attraction for a link from the edge node 31 to a router other than the relay node 32 which is "i" and from which the alarm information is sent. In formula (14), a value obtained by subtracting a regulation rate from 1 and the traffic attraction obtained by performing a calculation by the use of formula (13) are multiplied and an obtained result is divided by a number which is smaller than the total number of links by 1. The number which is smaller than the total number of links by 1 means the number of links which can be used for transmission from the edge node 31 to the edge node 36 except the link from the edge node 31 to the relay node 32 which is "i" and from which the alarm information is sent.

If the total of the traffic attraction for all the links from the edge node 31 except the link from the edge node 31 to the relay node 32 is greater than 0 (noncomplete centralization state), new traffic attraction is calculated by the use of the formulae:

$$\text{if}(\{\Sigma_l \tau_{k,l}\}=0)(l \ne i) \quad (15)$$

$$\tau_{k,i}(d) = (\{P_{k,i}(d) \times a_i[t]\}/1 - P_{k,i}(d) \times a_i[t]) \times \Sigma_l \tau_{k,l}(d)(l \ne i) \quad (16)$$

Formula (15) indicates a condition under which formula (16) is calculated. If the total of the traffic attraction for all the links from the edge node 31 except the link from the edge node 31 to the relay node 32 which is "i" and from which the alarm information is sent is greater than 0, then new traffic attraction is calculated by the use of formula (16). Each time a control packet is received, the new traffic attraction $\tau_{k,l}(d)$ for a link from the edge node 31 other than the link from the edge node 31 to the relay node 32 which is "i" and from which the alarm information is sent is changed to a value included in the control packet. This is the same with the centralization mode.

As a result, the probability of traffic with the destination of the edge node 36 which is "d", distributed among all adjacent routers 1 by the edge node 31, is set as follows:

$$P_{k,l}(d) = \tau_{k,l}(d)/\Sigma_l \tau_{k,l}(d) \quad (17)$$

The identifier, including "i," of each router which has a link with the edge node 31 is set as the element l in formula (17).

An example of updating traffic attraction for avoiding congestion will now be described with reference to FIGS. 19 through 22. In the following example, it is assumed that a PI controller indicated by formulae (10) and (11) is used as a feedback controller. A traffic distribution process performed at the time of avoiding congestion differs between the case where traffic is transmitted only along a route via a congestion avoidance link (complete centralization state) and the case where traffic also is transmitted along a route other than a route via a congestion avoidance link (noncomplete centralization state). Accordingly, congestion avoidance status in a complete centralization state and a noncomplete limitation state will be described in order.

Figure 19:
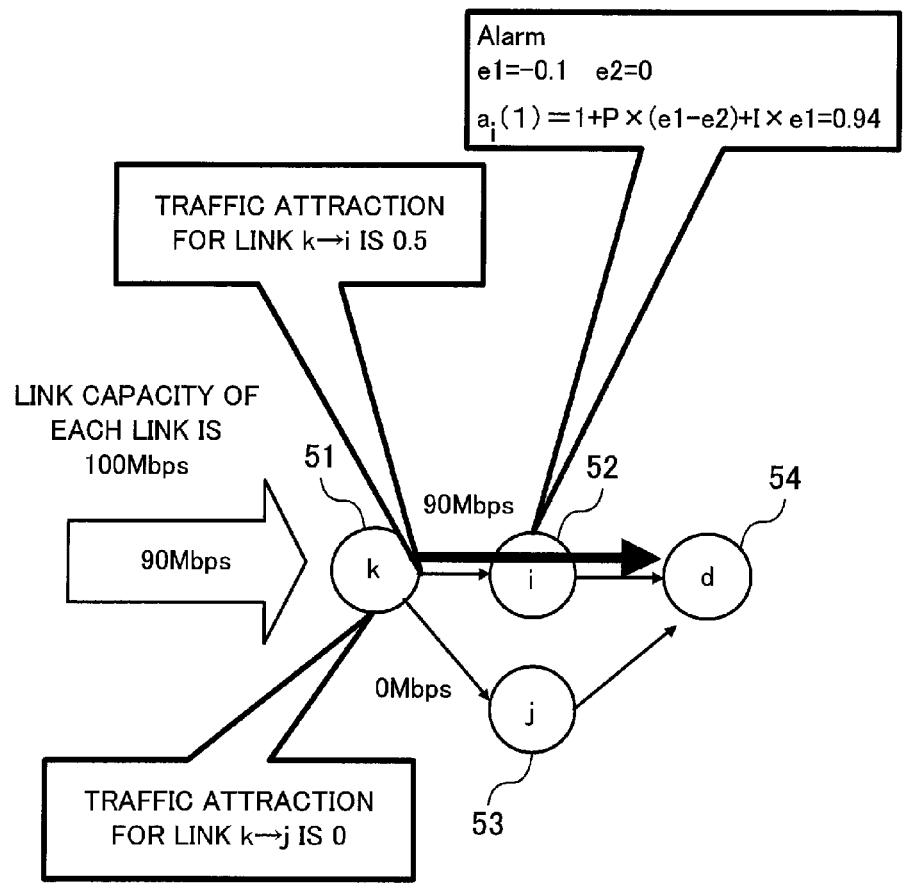

FIG. 19 illustrates the status of detecting a congestion avoidance link in a complete centralization state. An edge node 51 is operating in the centralization mode. Traffic attraction for a link from the edge node 51 to a relay node 52 regarding traffic with the destination of an edge node 54 is 0.5. Traffic attraction for a link from the edge node 51 to a relay node 53 regarding traffic with the destination of the edge node 54 is 0. It is assumed that the edge node 51 proportionally distributes traffic with the destination of the edge node 54 on the basis of the traffic attraction for each link.

Under the above situation it is assumed that the volume of traffic with the destination of the edge node 54 and which is inputted to the edge node 51 is 80 Mbps, that this state continues for a while, and that the volume of traffic with the destination of the edge node 54 and which is inputted to the edge node 51 then increases to 90 Mbps. In this case, all traffic is assigned to a route via the relay node 52. It is assumed that the control parameters $P_I$ and $I_I$ in formula (10) are 0.5 and 0.1 respectively.

In addition, it is assumed that a traffic use limit value of a link from the relay node 52 to the edge node 54 is 0.8. That is to say, the capacity of each link is 100 Mbps. Therefore, if the volume of traffic exceeds 80 Mbps, then the link from the relay node 52 to the edge node 54 is detected as a congestion avoidance link.

In the state illustrated in FIG. 19, traffic is limited to the route via the relay node 52. Accordingly, if the volume of traffic with the destination of the edge node 54 increases from 80 to 90 Mbps, then the relay node 52 detects that the link from the relay node 52 to the edge node 54 is a congestion avoidance link. As a result, the relay node 52 calculates a control rate.

A control rate $a_i(0)$ of one period before (t=0) is "1" according to formula (9). It is assumed that a difference at the present time (t=1) given by formula (11) is e1. e1=0.8−0.9=−0.1. It is assumed that a difference of one period before (t=0) is e2. e2=0.8−0.8=0.

Accordingly, a control rate $a_i(1)$ at the present time (t=1) is given by $$a_i(1)=1+P_I\times(e1-e2)+I_I\times e1=0.94 \quad (18a)$$

The relay node 52 generates alarm information including the above control rate. A control packet including the alarm information is sent to the edge node 51. As a result, the edge node 51 changes the transmission mode to the distribution mode. The traffic attraction for each link via which a packet with the destination of the edge node 54 can be transmitted is updated.

Figure 20:
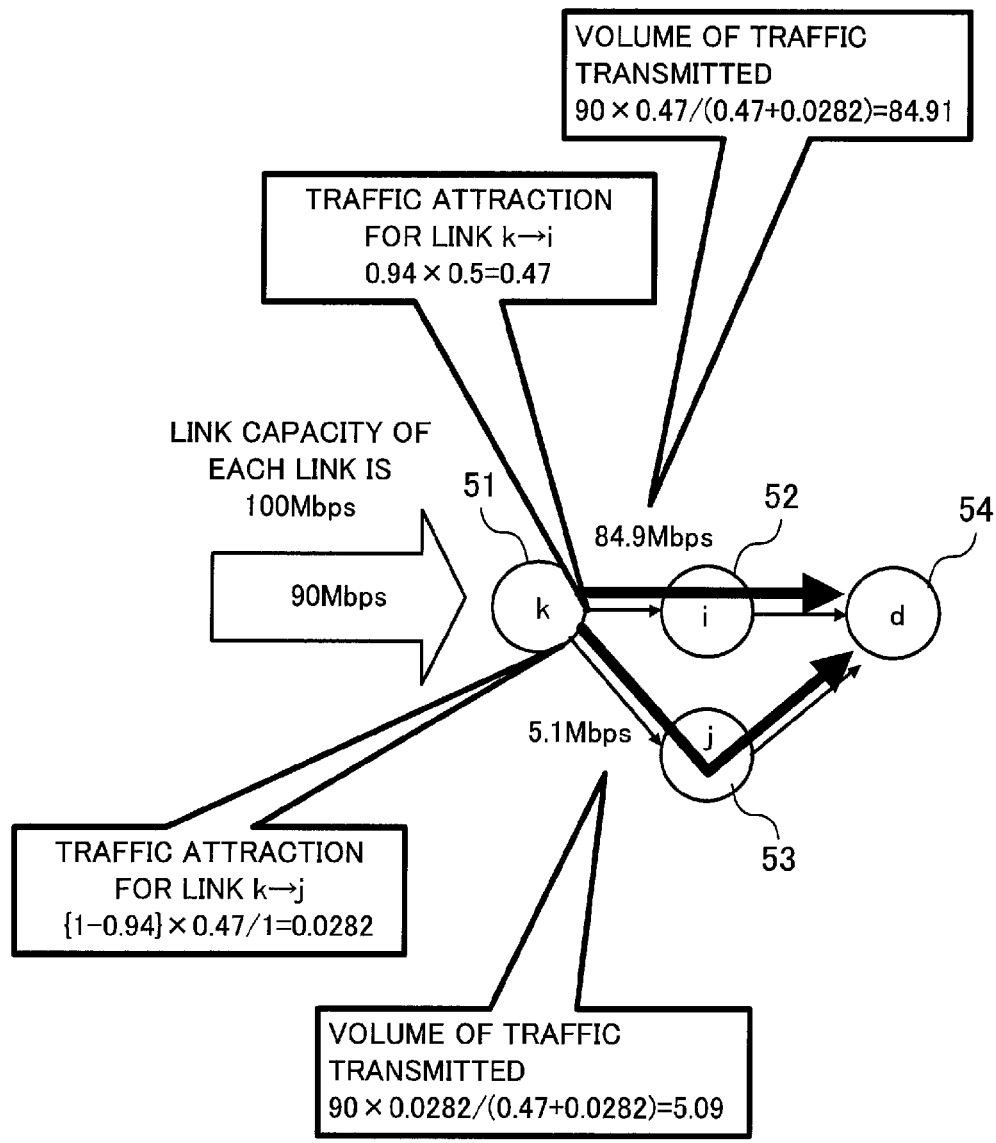

FIG. 20 illustrates the status of updating traffic attraction on the basis of alarm information in a complete centralization state. A control rate is 0.94 and traffic attraction is 0.5 just before update. Accordingly, by performing a calculation by the use of formula (13), the traffic attraction $\tau_{k,i}(d)$ for the link from the edge node 51 to the relay node 52 is 0.47 (=0.94× 0.5). In addition, by performing a calculation by the use of formula (14) and the traffic attraction $\tau_{k,i}(d)$ calculated in this way, the traffic attraction $\tau_{k,j}(d)$ for the link from the edge node 51 to the relay node 53 is 0.0282 (={1−0.94}×0.47/1).

On the basis of the above traffic attraction, the probability of traffic being assigned to each link is calculated by the use of formula (7). By distributing traffic on the basis of this distribution probability, the volume of traffic transmitted from the edge node 51 to the relay node 52 becomes 84.91 (=90×0.47/(0.47+0.0282)) Mbps (about 84.9 Mbps). The volume of traffic transmitted from the edge node 51 to the relay node 53 becomes 5.09 (=90×0.0282/(0.47+0.0282)) Mbps (about 5.1 Mbps).

In this state, the volume of traffic transmitted from the edge node 51 to the relay node 52 is still greater than the traffic use limit value 0.8 (80 Mbps). Accordingly, the relay node 52 sends the edge node 51 a control packet including alarm information at predetermined intervals. Each time the edge node 51 acquires the alarm information, the edge node 51 updates the traffic attraction. As a result, the volume of traffic transmitted from the edge node 51 to the relay node 52 converges at a value near the traffic use limit value.

An example of the case where the volume of traffic on a link other than the link along which the alarm information is inputted is greater than 0 (noncomplete centralization state) at the time of receiving the alarm information will now be described with reference to FIGS. 21 and 22.

Figure 21:
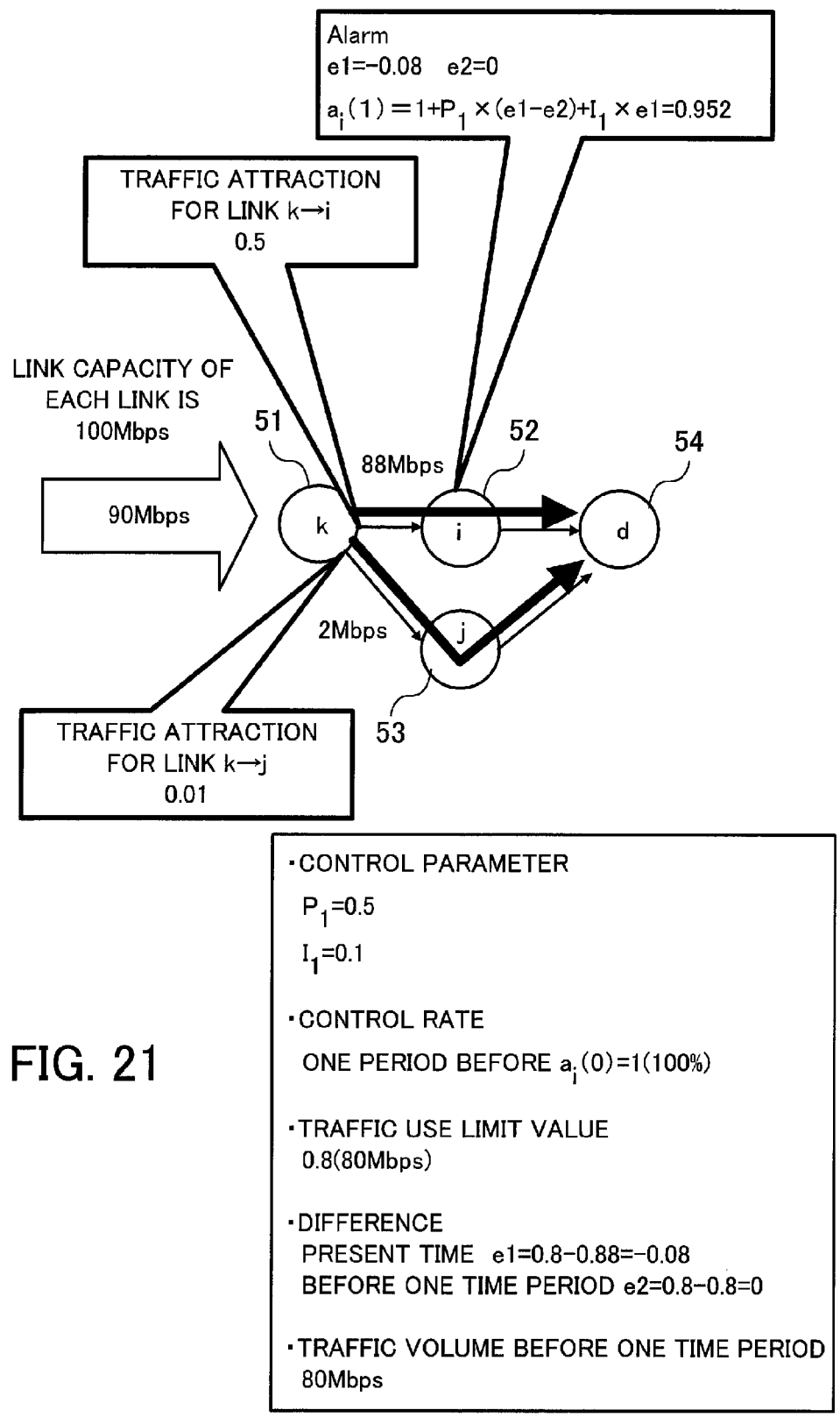

FIG. 21 illustrates the status of detecting a congestion avoidance link in a noncomplete centralization state. The edge node 51 is operating in the centralization mode. The traffic attraction for the link from the edge node 51 to the relay node 52 regarding traffic with the destination of the edge node 54 is 0.5. The traffic attraction of the link from the edge node 51 to the relay node 53 regarding traffic with the destination of the edge node 54 is 0.01. It is assumed that the edge node 51 proportionally distributes traffic with the destination of the edge node 54 on the basis of the traffic attraction of each link.

Under the above situation it is assumed that the volume of traffic with the destination of the edge node 54 and which is inputted to the edge node 51 is 80 Mbps, that this state continues for a while, and that the volume of traffic with the destination of the edge node 54 and which is inputted to the edge node 51 then increases to 90 Mbps. When the volume of traffic with the destination of the edge node 54 increases to 90 Mbps, traffic volume which is 88 Mbps is assigned to the route via the relay node 52 and traffic volume which is 2 Mbps is assigned to a route via the relay node 53. It is assumed that the control parameters $P_I$ and $I_I$ in formula (10) are 0.5 and 0.1 respectively. In addition, it is assumed that the traffic use limit value of the link from the relay node 52 to the edge node 54 is 0.8.

In the state illustrated in FIG. 21, most of traffic is transmitted into the route via the relay node 52. Accordingly, if the volume of traffic with the destination of the edge node 54 increases from 80 to 90 Mbps, then the relay node 52 detects that the link from the relay node 52 to the edge node 54 is a congestion avoidance link. As a result, the relay node 52 calculates a regulation rate.

A regulation rate $a_i(0)$ of one period before (t=0) is "1" according to formula (9). It is assumed that a difference at the present time (t=1) given by formula (11) is e1. e1=0.8− 0.88=−0.08. It is assumed that a difference of one period before (t=0) is e2. e2=0.8−0.8=0.

Accordingly, a regulation rate $a_i(1)$ at the present time (t=1) is given by $$a_i(1)=1+P_I\times(e1-e2)+I_I\times e1=0.952 \quad (18b)$$

The relay node 52 generates alarm information including the above regulation rate. A control packet including the alarm information is sent to the edge node 51. As a result, the edge node 51 changes traffic transmission traffic distribution mode to the distribution mode. The traffic attraction for each link via which a packet with the destination of the edge node 54 can be transmitted is updated.

Figure 22:
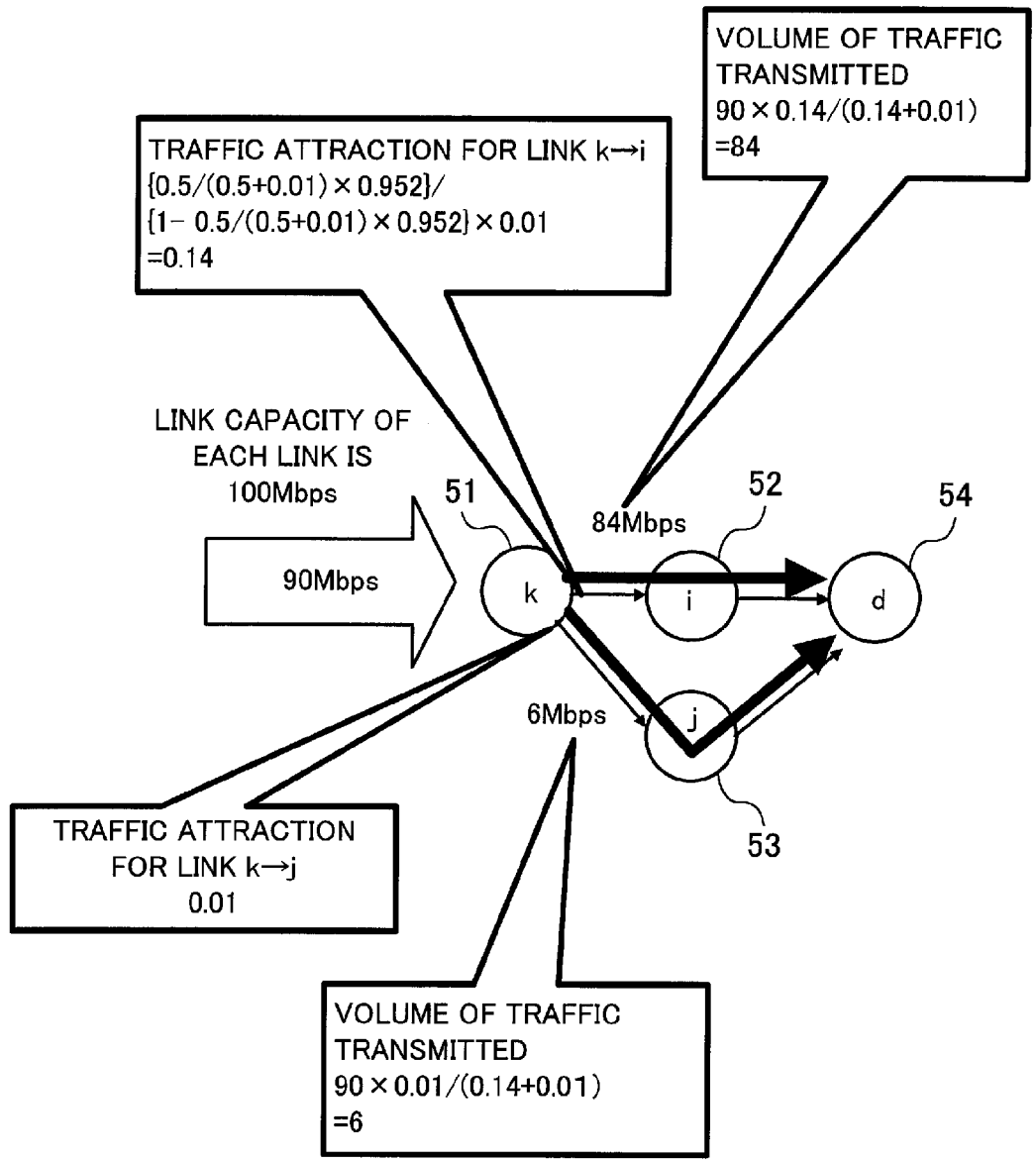

FIG. 22 illustrates the status of updating traffic attraction on the basis of alarm information in a noncomplete centralization state. The edge node 51 which acquires alarm information calculates the traffic attraction for the link from the edge node 51 to the relay node 52 by the use of formula (16) in which a regulation rate included in the alarm information is used.

$P_{k,i}(d)$ in formula (16) is 0.5/(0.5+0.01). $a_i(1)$ is 0.952 given by formula (18b). $\Sigma_j\tau_{k,i}(d)$ is the traffic attraction for the link from the edge node 51 to the relay node 53 and is 0.01. When these values are substituted in formula (16), traffic attraction $\tau_{k,i}(d)=\{0.5/(0.5+0.01)\times 0.952\}/\{1-0.5/(0.5+0.01)\times 0.952\}\times 0.01=0.14$ On the other hand, even if the alarm information is received, the traffic attraction for the link from the edge node 51 to the relay node 53 is not updated. That is to say, the traffic attraction for the link from the edge node 51 to the relay node 53 remains at 0.01.

Traffic distribution is performed on the basis of the above traffic attraction. As a result, traffic the volume of which is 84 (=90×0.14/(0.14+0.01)) Mbps is assigned to the link from the edge node 51 to the relay node 52. In addition, traffic the volume of which is 6 (=90×0.01/(0.14+0.01)) Mbps is assigned to the link from the edge node 51 to the relay node 53.

Traffic centralization and congestion avoidance are performed in the above way. If traffic is centralized, the function of a router through which traffic is not transmitted can be stopped. For example, the relay node 53 in FIG. 19 can be stopped. Each router has the function of shifting autonomously to a sleep state at the time of processing no traffic.

Figure 23:
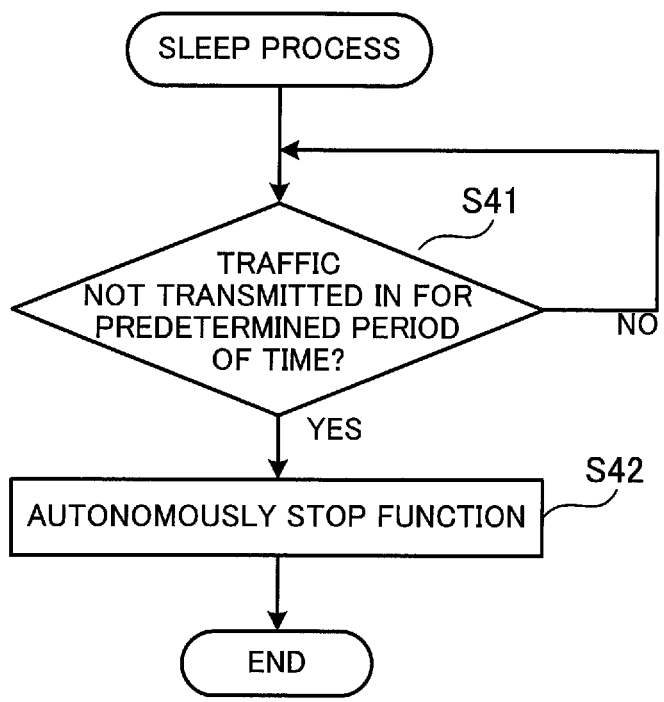

FIG. 23 is a flow chart of a procedure for a sleep process. A sleep process is begun when a router starts or when a router returns from a sleep state to a normal state. It is assumed that the router 100 performs a sleep process. The process illustrated in FIG. 23 will now be described in order of step number.

[Step S41] The sleep control unit 110 determines whether traffic is not transmitted in for a predetermined time period. If traffic is not transmitted in for a predetermined time period, then step S42 is performed. If traffic is transmitted in or traffic is not transmitted in for a time period shorter than the predetermined time period, then step S41 is repeated.

[Step S42] The sleep control unit 110 autonomously stops the function of the router 100. In this case, the function of receiving traffic which is transmitted in via a communication interface, the function of detecting the traffic receiving by the sleep control unit 110, and the function of propagating a control packet remain available.

As stated above, in this embodiment a router the function of which is stopped can exchange a control packet. As a result, even if the function of a router is stopped, it is possible to make another router recognize that a packet can be transmitted along a route to the router.

When traffic is transmitted in, the router 100, which goes into a sleep state, starts (wakes up) autonomously.

Figure 24:
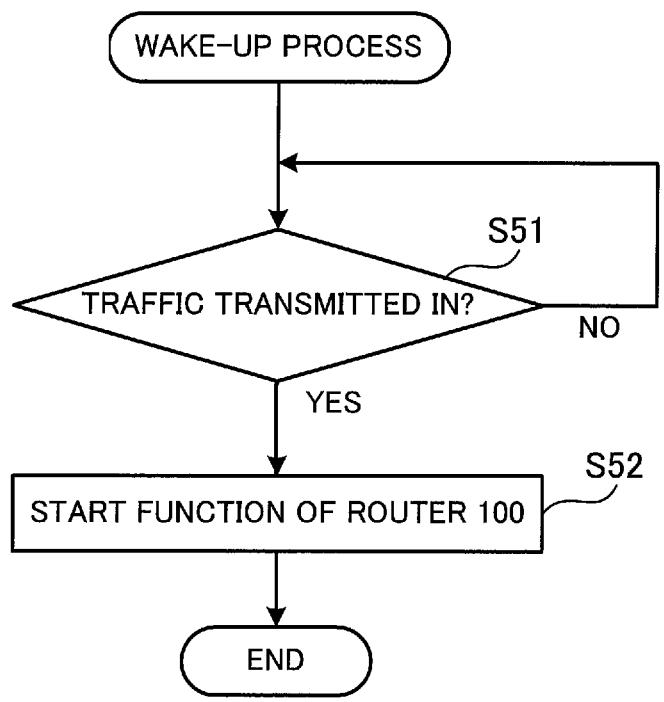
FIG. 24 is a flow chart of a procedure for a wake-up process.

FIG. 24 is a flow chart of a procedure for a wake-up process. A wake-up process is begun when a router shifts from a normal state to a sleep state. It is assumed that the router 100 performs a wake-up process. The process illustrated in FIG. 24 will now be described in order of step number.

[Step S51] The sleep control unit 110 determines whether traffic is transmitted in. If traffic is transmitted in, then step S52 is performed. If traffic is not transmitted in, then step S51 is repeated.

[Step S52] The sleep control unit 110 starts the function of the router 100 which is stopped.

The router 100 can return autonomously from a stopped state to a normal state in this way.

Even if traffic with the destination of one edge node is inputted to a plurality of edge nodes, traffic centralization can be performed properly by the traffic centralization process according to the first embodiment.

Figure 25:
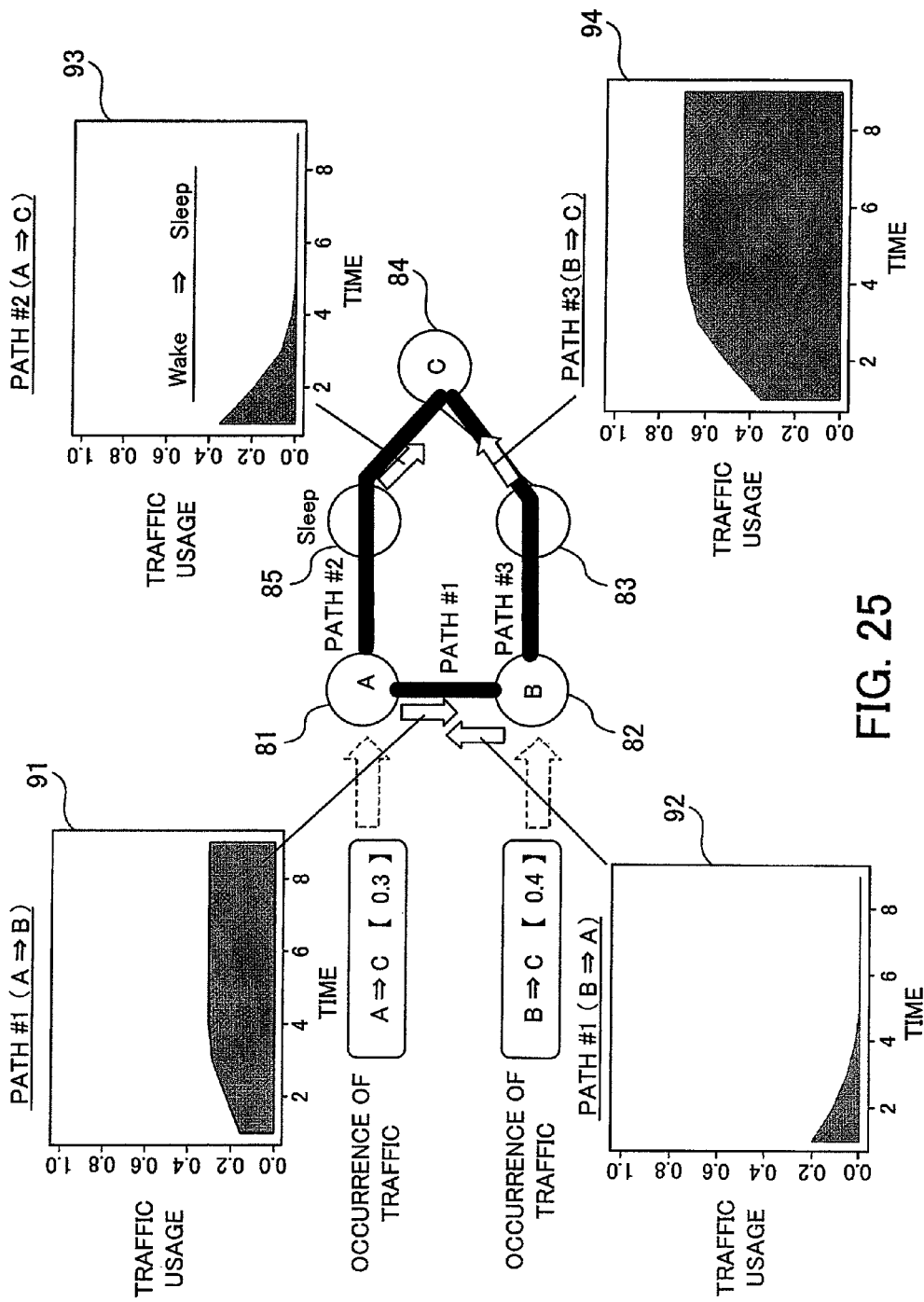
FIG. 25 illustrates an example of traffic limitation.

FIG. 25 illustrates an example of traffic centralization. In FIG. 25, five routers 81 through 85 are connected like a ring. The routers 82 through 85 are arranged counterclockwise from the router 81. It is assumed that the identifiers of the routers 81, 82, and 84 are "A," "B," and "C" respectively.

In the above network topology, traffic by which route usage becomes 0.3 is transmitted from the router 81 which is "A" to the router 84 which is "C," and traffic by which link usage becomes 0.4 is transmitted from the router 82 which is "B" to the router 84 which is "C." Graphs 91 through 94 indicate a change in traffic on each route at this time. In each of the graphs 91 through 94, a horizontal axis indicates time and a vertical axis indicates the traffic usage of a route.

The graph 91 indicates traffic which is transmitted into a path (path #1) from the router 81 which is "A" to the router 82 which is "B." The graph 92 indicates traffic which is transmitted into the path (path #1) from the router 82 which is "B" to the router 81 which is "A." The graph 93 indicates traffic which is transmitted into a path (path #2) from the router 81 which is "A" to the router 84 which is "C." The graph 94 indicates traffic which is transmitted into a path (path #3) from the router 82 which is "B" to the router 84 which is "C."

In the graph 91, part of traffic which is inputted to the router 81 is transmitted into the path #1 just after traffic is generated. After that, the volume of the traffic which is transmitted into the path #1 is increased gradually in a transient state. When all of the traffic to the router 81 are transmitted into the path #1, the volume of traffic becomes a steady state and this state is maintained.

In the graph 92, part of traffic which is inputted to the router 82 is transmitted into the path #1 just after the traffic is generated. After that, the volume of the traffic which is transmitted into the path #1 is decreased gradually in a transient state. When the volume of traffic which is transmitted into the path #1 becomes 0, the volume of traffic becomes a steady state and this state is maintained.

In the graph 93, part of the traffic which is inputted to the routers 81 and 82 flows into the path #2 just after the traffic is generated. After that, the volume of traffic which is transmitted into the path #2 is decreased gradually in a transient state. When the volume of traffic which is transmitted into the path #2 becomes 0, the volume of traffic becomes a steady state and this state is maintained.

In the graph 94, part of the traffic which is inputted to the routers 81 and 82 is transmitted into the path #3 just after the traffic is generated. After that, the volume of the traffic which is transmitted into the path #3 is increased gradually in a transient state. When all of the traffic to the routers 81 and 82 is transmitted into the path #3, the volume of traffic becomes a steady state and this state is maintained.

Traffic centralization proceeds in this way with time. Ultimately, only the paths #1 and #4 are used. As a result, there is no traffic which is transmitted into the router 85, and the router 85 can be stopped.

Congestion avoidance control which is exercised in the case of traffic which is inputted to the router 82 and has the destination of the router 84 increasing after each steady state illustrated in FIG. 25 will now be described.

Figure 26:
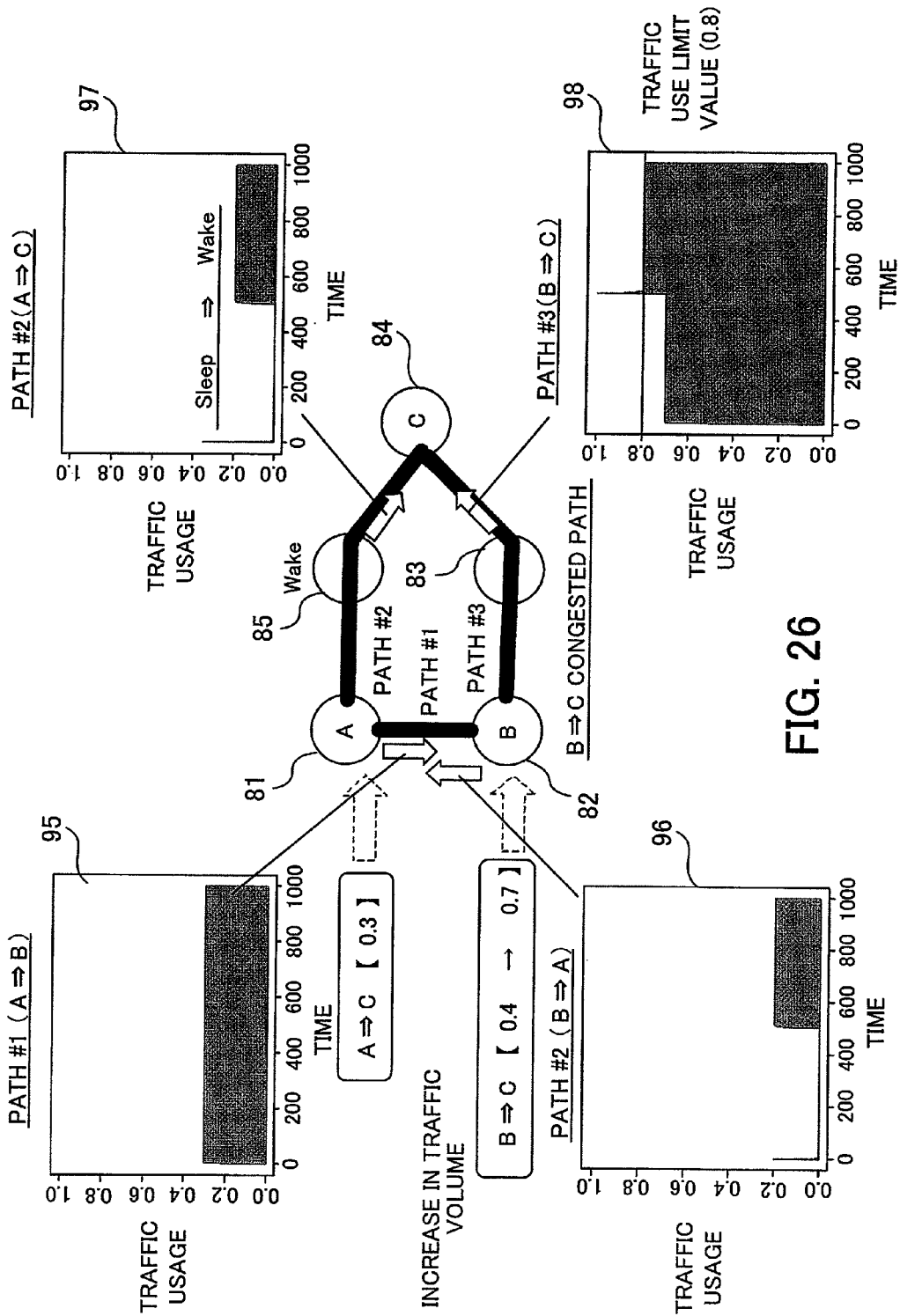
FIG. 26 illustrates the status of avoiding congestion at the time of an increase in the volume of traffic.

FIG. 26 illustrates the status of avoiding congestion at the time of increasing the volume of traffic. In the example illustrated in FIG. 26, the volume of traffic, which is transmitted from the router 82 which is "B" into the router 84 which is "C", is increased to the usage 0.7 of the path #3. In the steady state before increasing the volume of the traffic, the traffic which is inputted to the router 81 and which is 0.3 in route usage reaches the router 84 via the path #3. Accordingly, the usage of the path #3 is approximately 1 after increasing the volume of the traffic.

It is assumed that the traffic use limit value of a link included in the path #3 is 0.8. Then the router 82 or 83 detects that the traffic usage has exceeded the traffic use limit value. In the example illustrated in FIG. 26, it is assumed that the router 83 detects that the traffic usage has exceeded the traffic use limit value before the router 82 does. In this case, a control packet including alarm information is sent from the router 83 to the router 82. The router 82 which acquires the alarm information changes the traffic transmission from the centralization mode to the distribution mode. As a result, the traffic changes as shown in graphs 95 through 98. In each of the graphs 95 through 98, a horizontal axis indicates time and a vertical axis indicates the traffic usage of a route.

The graph 95 indicates traffic which is transmitted into the path (path #1) from the router 81 which is "A" to the router 82 which is "B." The graph 96 indicates traffic which is transmitted into the path (path #1) from the router 82 which is "B" to the router 81 which is "A." The graph 97 indicates traffic which is transmitted into the path (path #°) from the router 81 which is "A" to the router 84 which is "C." The graph 98 indicates traffic which is transmitted into the path (path #3) from the router 82 which is "B" to the router 84 which is "C."

In the graph 95, all of the traffic to the router 81 is transmitted into the path #1 before and after increasing the volume of traffic.

In the graph 96, the volume of the traffic which is transmitted from the router 82 into the path #1 is 0 before increasing the volume of traffic. When the volume of traffic inputted to the router 82 increases and the router 82 begins packet distribution in the distribution mode, part (excess over the traffic use limit value of the path #3) of the traffic inputted to the router 82 is transmitted into the path #1.

As can be seen from the graph 97, the volume of traffic which is transmitted into the path #2 is 0 before the increase in the volume of traffic. Traffic is transmitted into the path #2 as a result of the increase in the volume of traffic. The volume of traffic which is transmitted into the path #2 is the same as that of the traffic which is transmitted from the router 82 into the path #1. The router 85 detects that the traffic begins to be transmitted in, and starts the operation of the function. The router 85 which returns from a sleep state to a normal state transmits the traffic through the path #2 to the router 84 properly.

In the graph 98, all of the traffic which is inputted to the routers 81 and 82 is transmitted into the path #3 before increasing the volume of traffic. When the volume of traffic to the router 82 is increased, the traffic volume which exceeds the traffic use limit value is transmitted into the path #3 and then the volume of traffic converges so that the traffic usage of the path #3 will be equal to the traffic use limit value. Traffic which cannot be transmitted via the path #3 is transmitted to the router 84 via the paths #1 and #2.

Each of the routers 81 through 85 operates autonomously and the congestion occurrence can be avoided.

Second Embodiment

In a second embodiment, traffic distribution is performed by a ranking method. With the ranking method, there is no need to manage a traffic distribution mode.

Components included in a router according to the second embodiment are the same as those included in the router according to the first embodiment and illustrated in FIG. 5. However, a mode information storage unit 126 is not necessary to the router according to the second embodiment. In addition, a traffic control unit 130 included in the router according to the second embodiment differs from the traffic control unit 130 included in the router according to the first embodiment in function.

The traffic control unit 130 included in the router according to the second embodiment performs traffic distribution by a ranking method.

Figure 27:
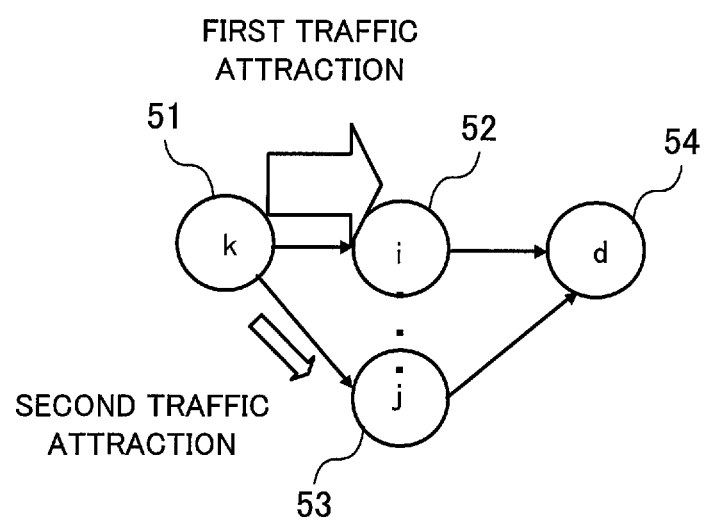
FIG. 27 illustrates the status of distributing traffic by a ranking method.

FIG. 27 illustrates the status of distributing traffic by a ranking method. With the ranking method, links via which a packet can be transmitted are ranked according to their traffic attraction. The link with stronger traffic attraction ranks higher. FIG. 27 illustrates the status of distributing traffic which is inputted to an edge node 51 and the destination of which is an edge node 54. In this example, a relay node 52 ranks first and a relay node 53 ranks second.

In this case, traffic inputted to the edge node 51 is transmitted preferentially to the relay node 52. Part of the traffic which cannot be transmitted to the relay node 52 because of its traffic use limit is transmitted to the relay node 53 which ranks second.

Figure 28:
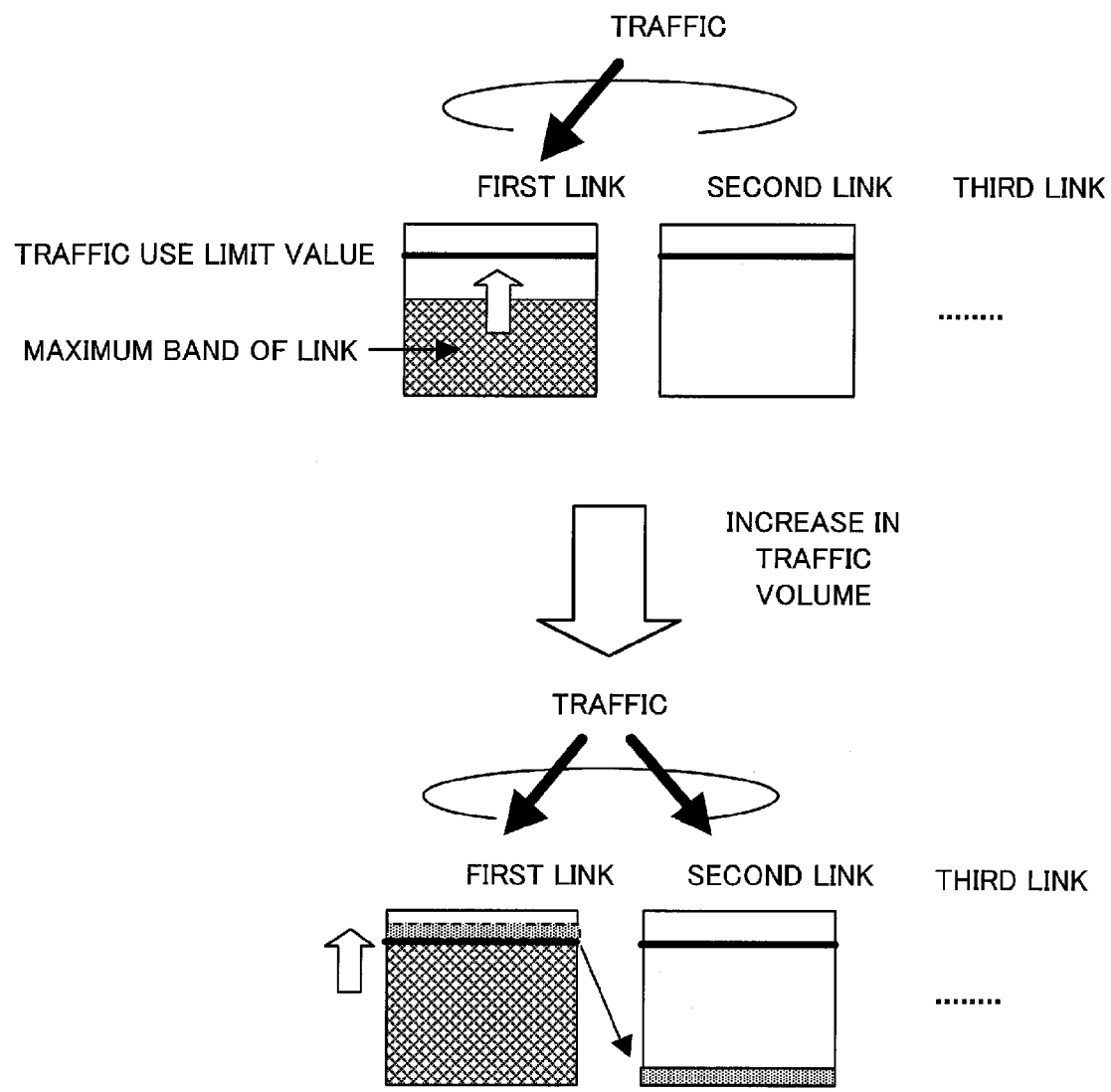
FIG. 28 is a schematic view of traffic distribution by the ranking method.

FIG. 28 is a schematic view of traffic distribution by the ranking method. Traffic inputted to a router is sent to a link (first link) to a destination the traffic attraction of which is the strongest with a probability of 100 percent. If the volume of traffic increases and the traffic usage of the first link reaches the traffic use limit value, then part of the traffic, which cannot be transmitted via the first link, is transmitted into a second link. Similarly, if the traffic usage of the second link exceeds the traffic use limit value, part of the traffic which cannot be transmitted via the first link or the second link is transmitted into a third link.

If there are a plurality of links with the same traffic attraction, then ranking will be performed in ascending order of link index (link identification number, for example).

With reference to FIG. 27, the following describes how to calculate a probability that traffic is assigned to each link in the case of the edge node 51 distributing traffic with the destination of the edge node 54 which is "d". The edge node 51 ranks links to which the traffic with the destination of the edge node 54 can be sent according to their traffic attraction. The edge node 51 can determine a probability P that the traffic with the destination of the edge node 54 is sent to each link by the use of an ordinary feedback controller f so as not to exceed the traffic use limit value of each link. It is assumed that a probability that the traffic is sent to a link which ranks first is P__1(d)[t] and that a probability that the traffic is sent to a link which ranks second is P__2(d)[t]. Each probability is given by the following formula. When a control packet is received, the probability P is updated. "t" is an integer that indicates which update period it is.

First Link:

$$P\_1(d)[t] = P\_1(d)[t-1] + f_2(T_x) \quad (19)$$

$$0 \leq P\_1(d)[t] \leq 1 \quad (20)$$

Second Link:

$$P\_2(d)[t] = P\_2(d)[t-1] + f_2(T_x) \quad (21)$$

$$0 \leq P\_2(d)[t] \leq (1 - P\_1(d)[t]) \quad (22)$$

Similarly, a probability that the traffic is sent to a link which ranks third and more is calculated in the range of a value obtained by subtracting, from 1, the total of probabilities that the traffic is sent to the links which rank higher.

"$T_x$" is the traffic use limit value of a link for which a probability is calculated and which is "x." The function "$f_2$" is a feedback controller which is designed so as not to exceed the traffic use limit value of a link with a specific ranking. The PI controller can be used as a typical feedback controller. In this case, the probability that the traffic is assigned to the link which is "x" is given by the formulae:

$$P_x[t] = P_x[t-1] + P_2 \times (e_x[t] - e_x[t-1]) + I_2 \times e_x[t] \quad (23)$$

$$e_x[t] = T_x - Tr_x[t] \quad (24)$$

"$P_2$" and "$I_2$" are control parameters. "$e_x[t]$" indicates the error between the traffic use limit value "$T_x$" and the traffic usage of the link which is "x." The controller in formulae (23) and (24) controls the probability $P_X$ so that when the traffic usage of the link is high, the difference will become small.

A concrete example of traffic distribution by the ranking method will now be described.

Figure 29:
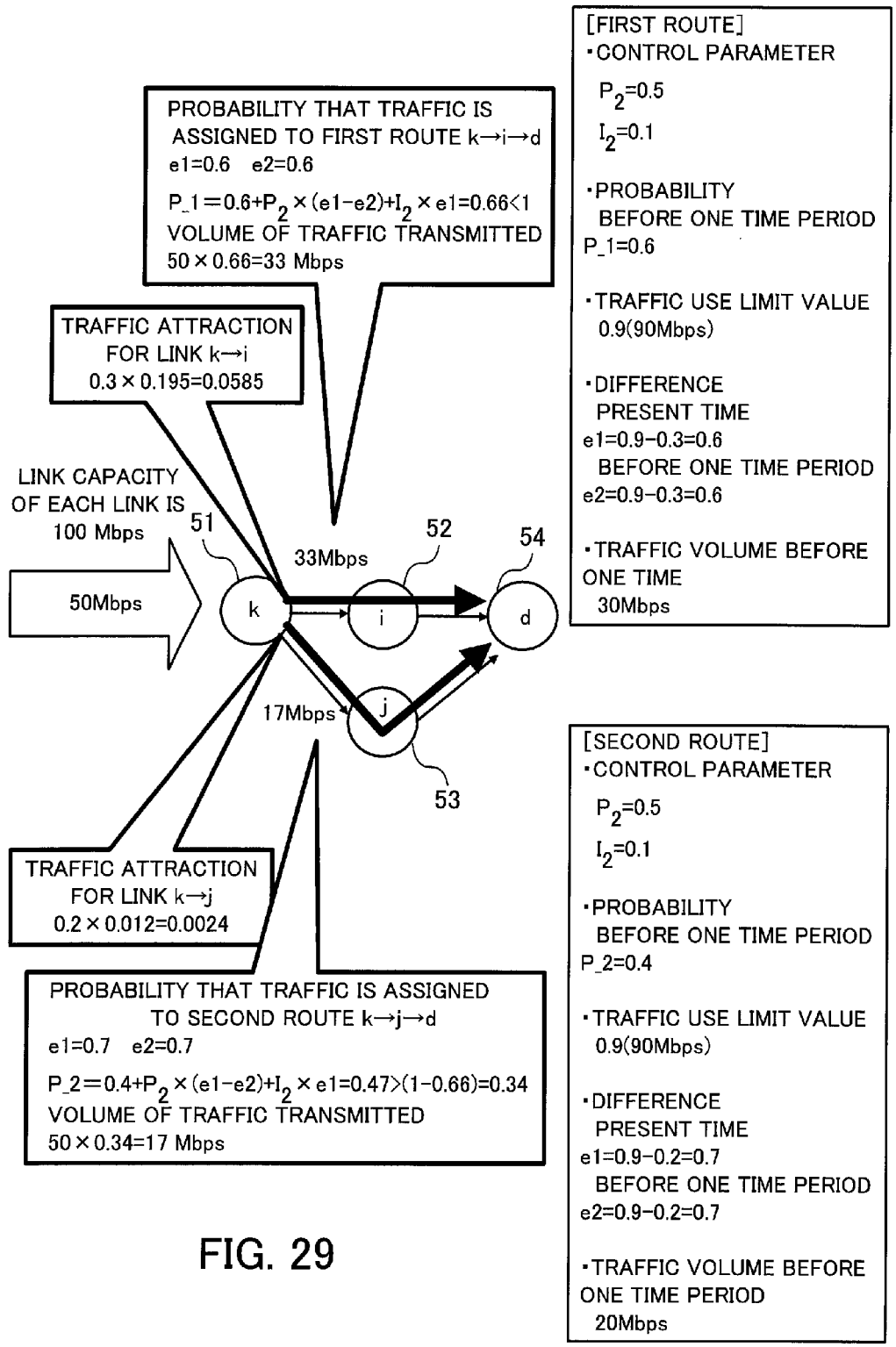
FIG. 29 illustrates an example of traffic distribution by the ranking method.

FIG. 29 illustrates an example of traffic distribution by the ranking method. This example shows results obtained by updating the probability that the traffic is assigned to each link by the ranking method in the case of the traffic volume and traffic attraction in FIG. 16.

In the state illustrated in FIG. 16, the traffic attraction for the link from the edge node 51 to the relay node 52 is more powerful than the traffic attraction for the link from the edge node 51 to the relay node 53. Accordingly, the link from the edge node 51 to the relay node 52 ranks first and the link from the edge node 51 to the relay node 53 ranks second.

It is assumed that the control parameters "$P_2$" and "$I_2$" in formula (23) are 0.5 and 0.1 respectively.

A probability P__1(d) that the traffic is assigned to the first link (route via the relay node 52) is calculated first. Traffic volume which is 30 Mbps in 50 Mbps is assigned to the first link before 1 time period. Accordingly, the probability that the traffic is assigned to the first link before 1 time period is 0.6. It is assumed that the traffic use limit value of the link from the edge node 51 to the relay node 52 is 0.9.

It is assumed that a difference at the present time indicated by formula (24) is e1. Then e1 is 0.6 (=0.9−0.3). It is assumed that an error before 1 time period is e2. Then e2 is 0.6 (=0.9−0.3).

Accordingly, the probability P_1(d) that the traffic is assigned to the first link at the present time is as follows:

$$P\_1(d) = 0.6 + P_2 \times (e1 - e2) + I_2 \times e1 = 0.66 \quad (25)$$

The value of P_1(d) calculated is 0.66 and is smaller than 1. This meets the condition indicated by inequality (20).

As a result, the volume of traffic transmitted to the first link is 33 (=50×0.66) Mbps.

Next, a probability P_2(d) that the traffic is assigned to the second link (route via the relay node 53) is calculated. The traffic volume which is 20 Mbps in 50 Mbps is assigned to the second link before 1 time period. Accordingly, the probability that the traffic is assigned to the second link before 1 time period is 0.4. It is assumed that the traffic use limit value of the link from the edge node 51 to the relay node 53 is 0.9.

It is assumed that an error at the present time indicated by formula (24) is e1. Then e1 is 0.7 (=0.9−0.2). It is assumed that an error before 1 time period is e2. Then e2 is 0.7 (=0.9−0.2).

Accordingly, the probability P_2(d) that the traffic is assigned to the second link at the present time is as follows:

$$P\_2(d) = 0.4 + P_2 \times (e1 - e2) + I_2 \times e1 = 0.47 \quad (26)$$

The value of P_2(d) calculated is 0.47 and is greater than 0.34 (=1−P_1(d)=1−0.66). Therefore, the maximum value 0.34 that meets inequality (22) is applied as the probability that the traffic is assigned to the second link.

As a result, the volume of traffic transmitted to the second link is 17 (=50×0.34) Mbps.

Congestion avoidance control by the ranking method will now be described. With the ranking method, congestion is avoided by a feedback controller. Accordingly, control such as a change in traffic distribution mode is unnecessary.

Figure 30:
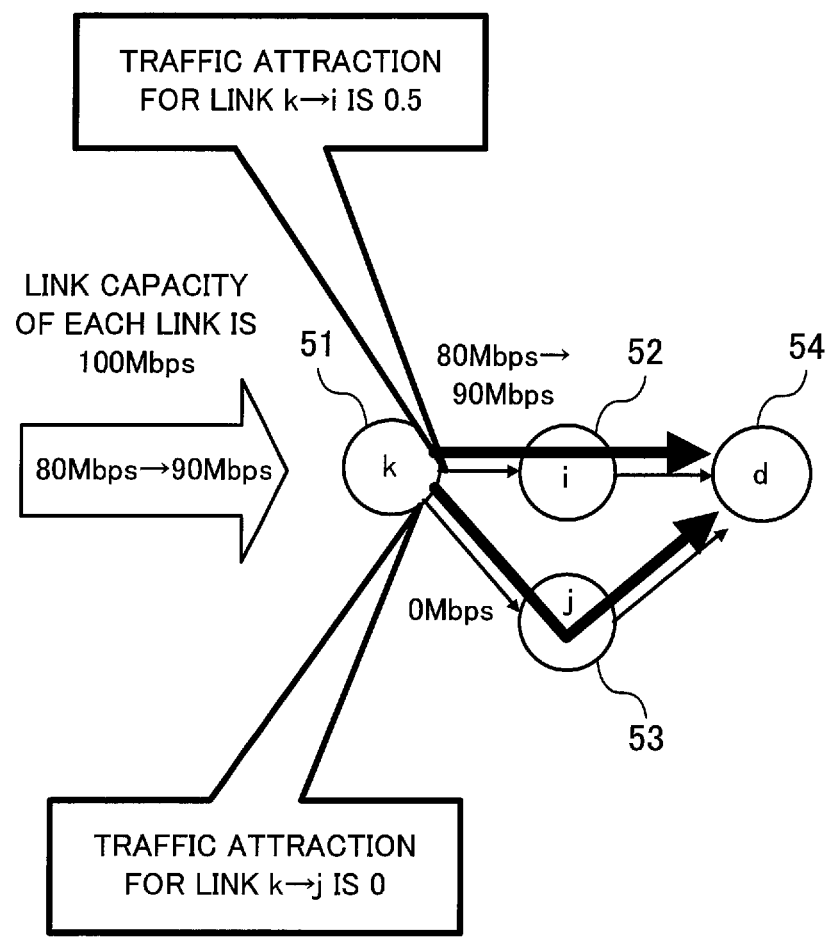
FIG. 30 illustrates the status of the occurrence of excess traffic by the ranking method.

FIG. 30 illustrates the status that the traffic volume excesses the traffic use limit value by the ranking method. In the example illustrated in FIG. 30, it is assumed that the traffic use limit value of each link is 0.8.

With the ranking method, all traffic is centralized to a first link when the traffic usage of the first link is lower than or equal to the traffic use limit value. In the example illustrated in FIG. 30, traffic is centralized to a link from an edge node 51 to a relay node 52.

It is assumed that traffic attraction for the link from the edge node 51 to the relay node 52 is 0.5 and that traffic attraction for a link from the edge node 51 to a relay node 53 is 0. Under these conditions, it is assumed that the volume of traffic which is inputted to the edge node 51 and the destination of which is an edge node 54 is increased from 80 to 90 Mbps. In this case, congestion is avoided by the function of the feedback controller.

Figure 31:
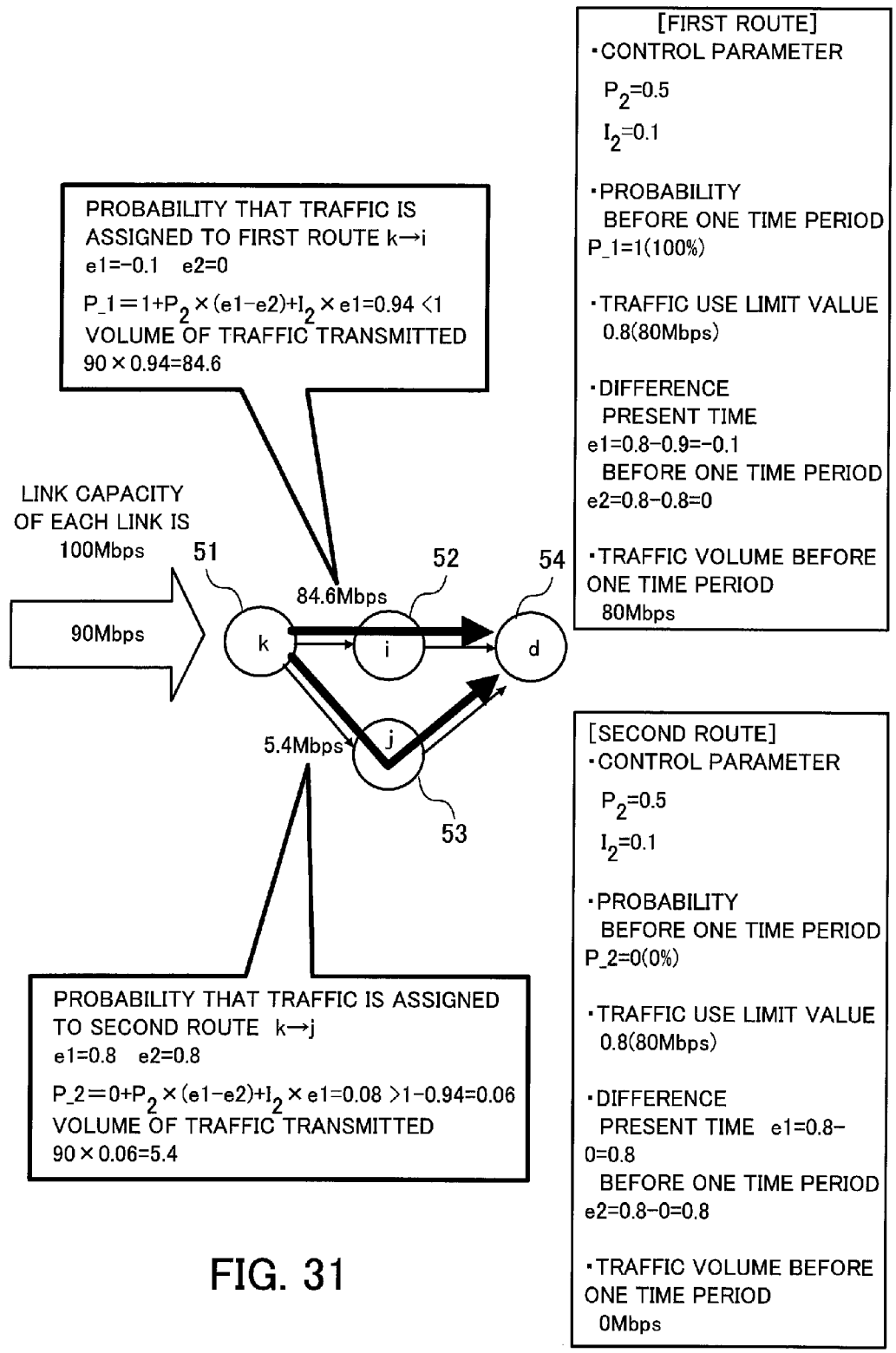
FIG. 31 illustrates the status of avoiding congestion by the ranking method.

FIG. 31 illustrates the status of avoiding congestion by the ranking method. It is assumed that the control parameters "P_2" and "I_2" in formula (23) are 0.5 and 0.1 respectively.

A probability P_1(d) that the traffic is assigned to the first link (route via the relay node 52) is calculated first. The traffic volume which is all in 80 Mbps is assigned to the first link before 1 time period. Accordingly, the probability that the traffic is assigned to the first link before 1 time period is 1. The traffic use limit value of the link from the edge node 51 to the relay node 52 is 0.8.

It is assumed that an error at the present time indicated by formula (24) is e1. Then e1 is −0.1 (=0.8−0.9). It is assumed that an error before 1 time period is e2. Then e2 is 0 (=0.8−0.8).

Accordingly, the probability P_1(d) that the traffic is assigned to the first link at the present time is as follows:

$$P\_1(d) = 1 + P_2 \times (e1 - e2) + I_2 \times e1 = 0.94 \quad (27)$$

The value of P_1(d) calculated is 0.94 and is smaller than 1. This meets the condition indicated by inequality (20).

As a result, the volume of traffic transmitted to the first link is 84.6 (=90×0.94) Mbps.

Next, a probability P_2(d) that the traffic is assigned to the second link (route via the relay node 53) is calculated. Traffic is not assigned to the second link before 1 time period. Accordingly, the probability that the traffic is assigned to the second link before 1 time period is 0. The traffic use limit value of the link from the edge node 51 to the relay node 53 is 0.8.

It is assumed that an error at the present time indicated by formula (24) is e1. Then e1 is 0.8 (=0.8−0). It is assumed that an error before 1 time period is e2. Then e2 is 0.8 (=0.8−0).

Accordingly, the probability P_2(d) that the traffic is assigned to the second link at the present time is as follows:

$$P\_2(d) = 0 + P_2 \times (e1 - e2) + I_2 \times e1 = 0.08 \quad (28)$$

The value of P_2(d) calculated is 0.08 and is greater than 0.06 (=1−P_1(d)=1−0.94). Therefore, the maximum value 0.06 that meets inequality (22) is applied as the probability that the traffic is assigned to the second link.

As a result, the volume of traffic transmitted to the second link is 5.4 (=90×0.06) Mbps.

In the second embodiment it is possible to exercise congestion avoidance control autonomously in the above way without exercising control such as traffic distribution mode.

Third Embodiment

In a third embodiment, a relay node performs only update of traffic attraction and a propagation process and an edge node at the sending end determines a transmission path. In this case, each transmission path to an edge node which is the destination of traffic is referred to as a path. One path includes one or more links between nodes.

Components included in a router according to the third embodiment are the same as those included in the router according to the first embodiment and illustrated in FIG. 5. However, some components included in the router according to the third embodiment differ from the corresponding components included in the router according to the first embodiment in function. Accordingly, the functions of these components included in the router according to the third embodiment will now be described.

If a router functions as a relay node, a traffic control unit 130 does not perform a traffic control process like that illustrated in FIG. 12 but transmits a packet which is transmitted in via a path indicated in the packet.

If the router functions as an edge node, an attraction update unit 123 recognizes paths according to destinations on the basis of information included in a control packet, and stores the traffic attraction for each path in an attraction information storage unit 124. In addition, if the router functions as an edge node, the traffic control unit 130 distributes traffic with the destination of another edge node among paths and sends packets including route information corresponding to a path to the paths.

Figure 32:
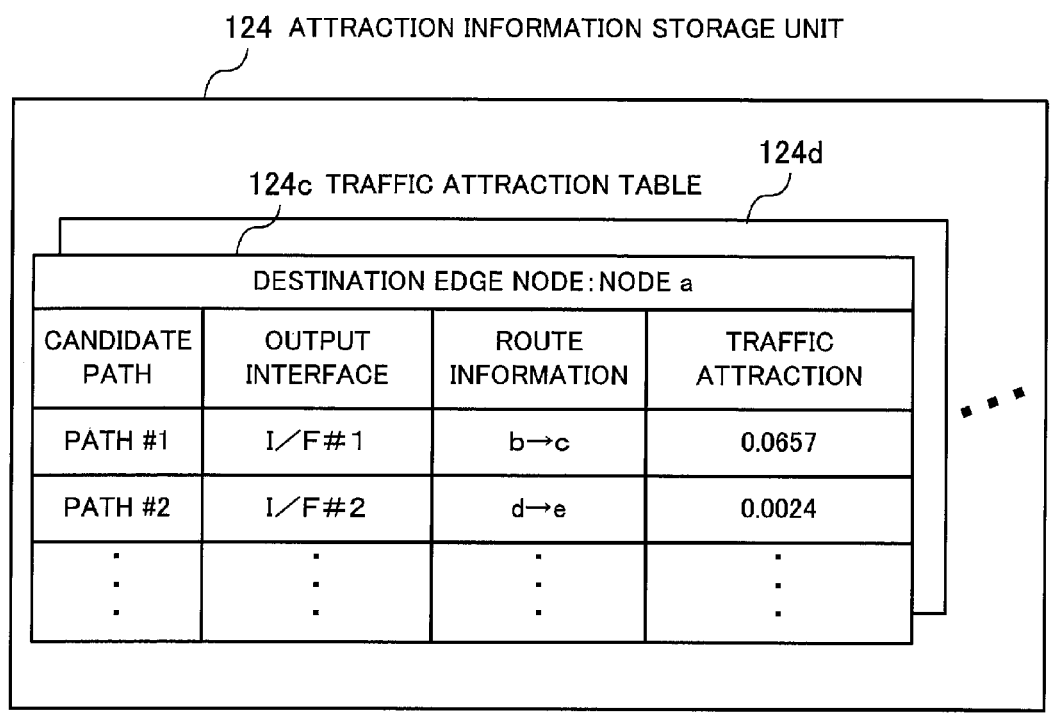
FIG. 32 illustrates an example of the structure of data in an attraction information storage unit included in a router according to a third embodiment.

FIG. 32 illustrates an example of the structure of data in the attraction information storage unit included in the router according to the third embodiment. With the router according to the third embodiment, traffic attraction tables 124c and 124d corresponding to destination edge nodes are stored in the attraction information storage unit 124. The identifiers of the destination edge nodes are given to the traffic attraction tables 124c and 124d. Each of the traffic attraction tables 124c and 124d includes Candidate Path, Output Interface, Route Information, and Traffic Attraction columns.

The identifier of a path (candidate path) which can be selected as a transmission route to a destination edge node is set in the Candidate Path column.

The identifier of a communication interface (output interface) connected to an adjacent router on a corresponding path is set in the Output Interface column. When the traffic control unit 130 selects a path via which a packet is transmitted, the traffic control unit 130 sends the packet from an output interface corresponding to the path.

Route information which shows the route of a corresponding path is set in the Route Information column. When the traffic control unit 130 sends a packet, the traffic control unit 130 refers to the route information and sets the identifier of a router which relays the packet in the packet.

The traffic attraction for a corresponding path is set in the Traffic Attraction column. A method for setting traffic attraction is the same as that described in the first embodiment.

An edge node as the sending distributes traffic among paths by the use of the above traffic attraction tables. For example, traffic can be distributed proportionally according to the traffic attraction of each path.

FIG. 33 illustrates assignment probabilities according to paths in the third embodiment. In the example illustrated in FIG. 33, it is assumed that traffic which is inputted to an edge node 201 and the destination of which is an edge node 202 is distributed among three paths 211 through 213.

The edge node 201 has a traffic attraction table 201a corresponding to the edge node 202. In the example of FIG. 33, only Candidate Path and Traffic Attraction columns of the traffic attraction table 201a are illustrated. In this example, the traffic attraction of the path 211 which is "path #1" is $\tau_1$. The traffic attraction for the path 212 which is "path #2" is $\tau_2$. The traffic attraction of the path 213 which is "path #3" is $\tau_3$.

When a packet 221 with the destination of A is inputted to the edge node 201, the probability that the packet 221 is assigned to each of the paths 211 through 213 is calculated on the basis of the traffic attraction registered in the traffic attraction table 201a. The probability that the packet 221 is assigned to the path 211 is "$\tau_1/(\tau_1+\tau_2+\tau_3)$." The probability that the packet 221 is assigned to the path 212 is "$\tau_2/(\tau_1+\tau_2+\tau_3)$." The probability that the packet 221 is assigned to the path 213 is "$\tau_3/(\tau_1+\tau_2+\tau_3)$."

Traffic can be distributed proportionally in this way on the basis of the traffic attraction for each path.

Furthermore, in the third embodiment, a control packet generated by an edge node is broadcast. This control packet includes information (route information) which shows a path to the edge node. Each time each relay node propagates the control packet, it updates the route information.

Figure 34:
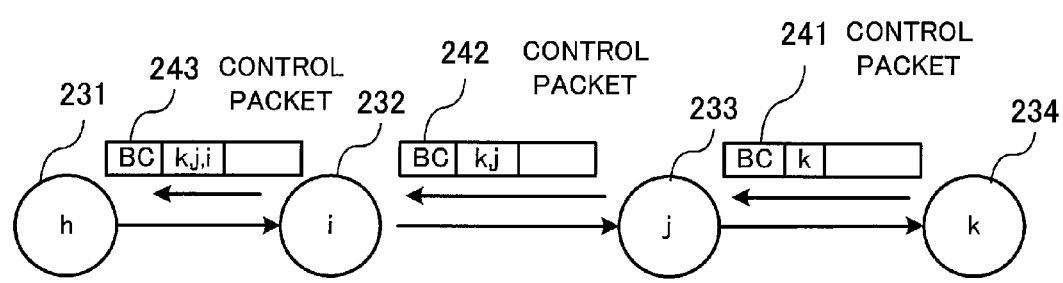
FIG. 34 illustrates control packet propagation status in the third embodiment.

FIG. 34 illustrates control packet propagation status in the third embodiment. In FIG. 34, a path from an edge node 231 via relay nodes 232 and 233 to en edge node 234 is shown as an example. It is assumed that the identifiers of the edge node 231, the relay nodes 232 and 233, and the edge node 234 are "h," "j," and "k" respectively.

The edge node 234 calculates its traffic attraction periodically. In addition, the edge node 234 generates a control packet 241 including its traffic attraction and transmits the control packet 241 to the adjacent relay node 233. At this time, the edge node 234 sets the identifier "k" of the edge node 234 which is a source in a header portion or a payload portion of the control packet 241 as route information. A broadcast address ("BC" in FIG. 34) is set in a destination field of a header of the control packet 241.

The relay node 233 which receives the control packet 241 calculates traffic attraction of a link between the relay node 233 and the edge node 234 according to traffic which is transmitted out of the relay node 233. This is the same with the first embodiment. In addition, the relay node 233 calculates its traffic attraction regarding traffic with the destination of the edge node 234. This is the same with the first embodiment. The relay node 233 then generates a control packet 242 including the calculated traffic attraction and transmits the control packet 242 to the adjacent relay node 232. At this time the relay node 233 adds its identifier "j" to the route information included in the received control packet 241, and sets route information after the update in the control packet 242.

The relay node 232 which receives the control packet 242 calculates traffic attraction for a link between the relay nodes 232 and 233. This is the same with the first embodiment. In addition, the relay node 232 calculates its traffic attraction regarding traffic with the destination of the edge node 234. The relay node 232 then generates a control packet 243 including its traffic attraction and transmits the control packet 243 to the adjacent edge node 231. At this time the relay node 232 adds its identifier "i" to the route information included in the received control packet 242, and sets route information after the update in the control packet 243.

The edge node 231 which receives the control packet 243 calculates traffic attraction for a link between the edge node 231 and the relay node 232 on the basis of the traffic attraction included in the control packet 243.

The control packet 241 generated by the edge node 234 is propagated to the edge node 231 in this way. At this time each of the relay nodes 233 and 232 updates the traffic attraction and the route information included in the control packet 241. The edge node 231 updates a traffic attraction table corresponding to the edge node 234 on the basis of the received control packet 243. When a packet with the destination of the edge node 234 is then inputted to the edge node 231, the edge node 231 refers to the traffic attraction table corresponding to the edge node 234 and determines a path via which the packet is transmitted.

Figure 35:
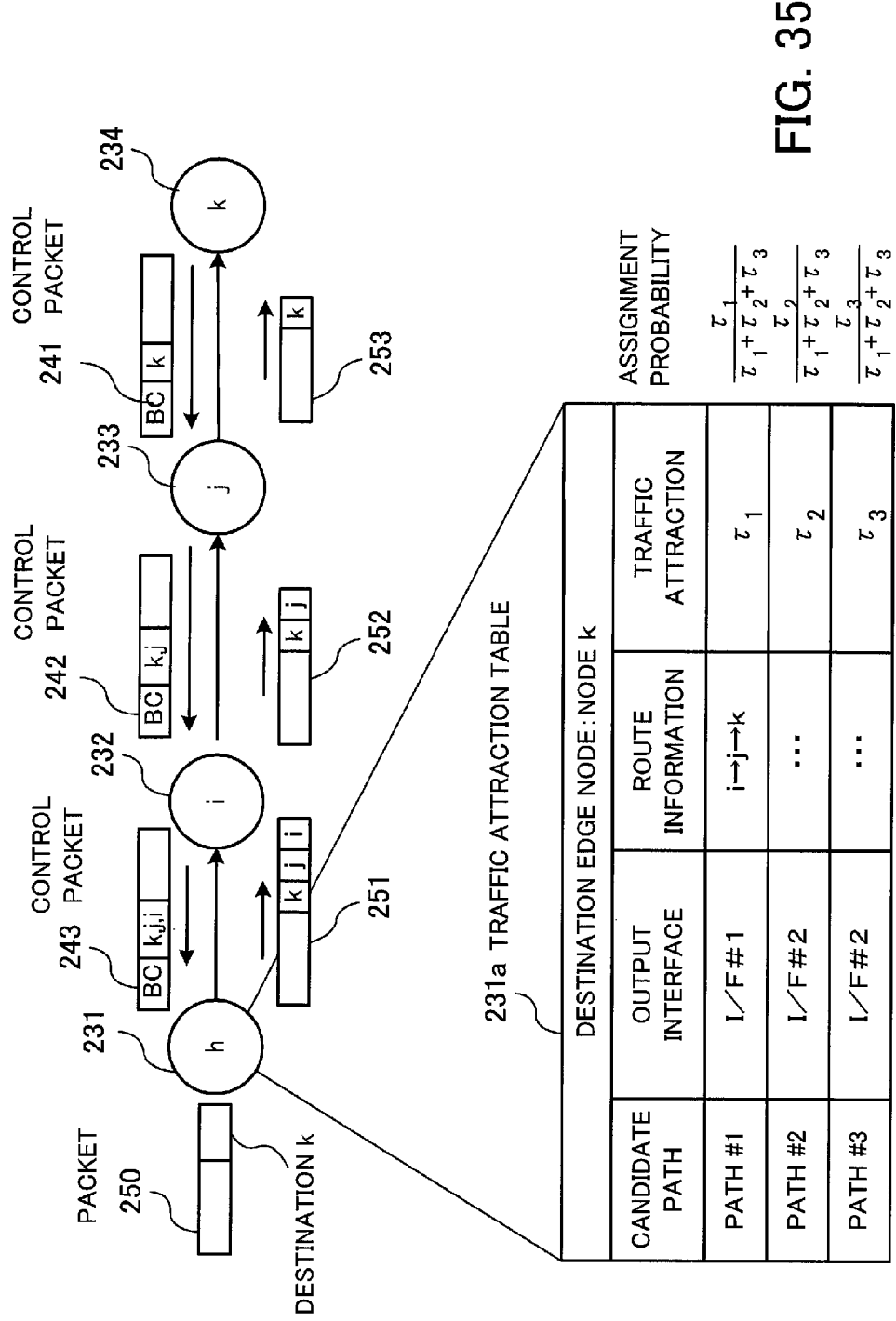
FIG. 35 illustrates the status of traffic distribution by an edge node.

FIG. 35 illustrates the status of traffic distribution by an edge node. An edge node 231 has a traffic attraction table 231a corresponding to an edge node 234. The edge node 231 which receives a control packet 243 recognizes a path to the edge node 234 from route information included in the control packet 243. To be concrete, the edge node 231 determines whether the same route information that is included in the control packet 243 is registered in the traffic attraction table 231a.

If the same route information that is included in the control packet 243 is not registered in the traffic attraction table 231a, then the edge node 231 registers a new candidate path in the traffic attraction table 231a. In this case, a path identifier different from existing path identifiers is given to the new candidate path and the new candidate path is set in a Candidate Path column. The identifier of a communication interface to which the control packet 243 is inputted is set in an Output Interface column corresponding to the new candidate path. The route information included in the control packet 243 is set in a Route Information column corresponding to the new candidate path. Traffic attraction for a control packet receiving link calculated from traffic attraction included in the control packet 243 is set in a Traffic Attraction column corresponding to the new candidate path.

If the same route information that is included in the control packet 243 is already registered in the traffic attraction table 231a, then the edge node 231 updates traffic attraction for an appropriate candidate path. That is to say, the edge node 231 changes the value of the traffic attraction for the candidate path specified by the route information included in the control packet 243 to the traffic attraction of the control packet receiving link calculated from the traffic attraction included in the control packet 243.

Each time the edge node 231 receives a new control packet, the edge node 231 updates the traffic attraction table 231a in this way. As a result, if there are a plurality of routes as paths between the edge nodes 231 and 234, a candidate path corresponding to each route is registered in the traffic attraction table 231a. In the example illustrated in FIG. 35, it is assumed that three candidate paths are registered.

When a packet 250 with the destination of the edge node 234 is then inputted to the edge node 231, the edge node 231 refers to the traffic attraction table 231a and calculates an assignment probability. A method for calculating an assignment probability was described above with reference to FIG. 33. The edge node 231 selects one of the candidate paths with a probability indicated in Assignment Probability. In the example illustrated in FIG. 35, it is assumed that the candidate path "path #1" in the route information given by the control packet 243 is selected.

The edge node 231 refers to the route information regarding the selected candidate path and generates a packet 251 to be sent. The packet 251 is obtained by adding the identifier of each router indicated in the route information to the packet 250 inputted as destination information. Identifiers of relay nodes are arranged in ascending order of distance from the edge node 231 on the route. In the example illustrated in FIG. 35, the identifier "i" of a relay node 232, the identifier "j" of a relay node 233, and the identifier "k" of the edge node 234 are arranged in that order. The packet 251 obtained by adding the destination information in this way is transmitted to the adjacent relay node 232 via a communication interface indicated in the Output Interface column.

When the relay node 232 receives the packet 251, the relay node 232 removes its identifier "i" from the destination information included in the packet 251. The identifier of a router which is the next destination leads the destination information from which the identifier "i" has been removed. In the example illustrated in FIG. 35, the identifier "j" of the relay node 233 leads the destination information included in a packet 252. Accordingly, the relay node 232 transmits the packet 252 to the relay node 233 the identifier "j" of which leads the destination information.

When the relay node 233 receives the packet 252, the relay node 233 removes its identifier "j" from the destination information included in the packet 252. The identifier "k" of the edge node 234 leads the destination information of a packet 253 from which the identifier "j" has been removed. Accordingly, the relay node 233 transmits the packet 253 to the edge node 234 the identifier "k" of which leads the destination information.

As described above, each edge node manages paths between edge nodes and can distribute traffic among the paths. As a result, it is not necessary for a relay node to perform a distribution process according to traffic attraction. That is to say, a processing load on the relay node can be reduced.

Fourth Embodiment

In a fourth embodiment the volume of traffic between relay nodes is estimated by exchanging information between edge nodes. As a result, traffic distribution can be performed properly. It is not necessary for a relay node to update control packet information.

In the fourth embodiment each edge node sets paths between edge nodes and recognizes a physical route corresponding to each path in advance. Each edge node measures the volume of traffic which is transmitted in along each path. The edge nodes exchange measurement information with each other and refer to link (physical route) information which they recognize in advance. As a result, the volume of traffic which each relay node transmits is estimated. Each edge node calculates traffic attraction of each path between the edge nodes by the same method that is described in the third embodiment on the basis of the volume of traffic estimated.

Figure 36:
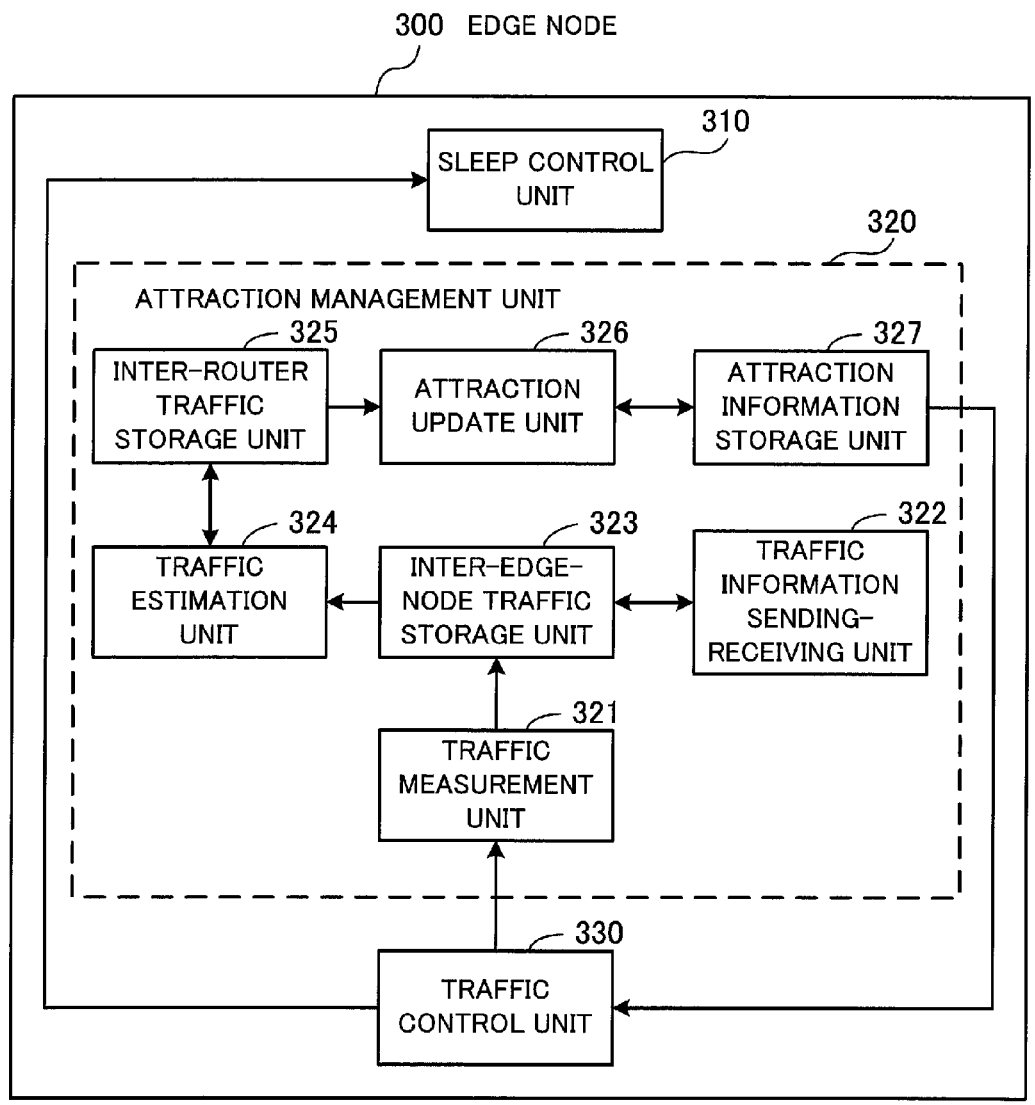
FIG. 36 is a block diagram of the function of an edge node in a fourth embodiment.

FIG. 36 is a block diagram of the function of an edge node in the fourth embodiment. An edge node 300 comprises a sleep control unit 310, an attraction management unit 320, and a traffic control unit 330. The function of the sleep control unit 310 is the same as that of the sleep control unit 110 which is included in the router according to the first embodiment and which is illustrated in FIG. 5.

The attraction management unit 320 manages attraction regarding traffic between routers in a network. Accordingly, the attraction management unit 320 includes a traffic measurement unit 321, a traffic information sending-receiving unit 322, an inter-edge-node traffic storage unit 323, a traffic estimation unit 324, an inter-router traffic storage unit 325, an attraction update unit 326, and an attraction information storage unit 327.

The traffic measurement unit 321 monitors the contents of packet sending-receiving by the traffic control unit 330 and measures the volume (logical connection traffic volume) of traffic between the edge node 300 and a second edge node. The traffic measurement unit 321 stores a measurement result in the inter-edge-node traffic storage unit 323.

The traffic information sending-receiving unit 322 exchanges information indicative of traffic volume regarding logical connection for communication with the second edge node. The traffic information sending-receiving unit 322 then stores the information which shows traffic volume regarding logical connection received from the second edge node in the inter-edge-node traffic storage unit 323.

The inter-edge-node traffic storage unit 323 stores traffic volume regarding logical connection between the edge nodes in the network. For example, part of a storage area in a RAM included in the edge node 300 is used as the inter-edge-node traffic storage unit 323.

The traffic estimation unit 324 refers to the inter-edge-node traffic storage unit 323 and estimates traffic volume regarding physical connection (physical connection traffic volume). The traffic estimation unit 324 stores the estimated physical connection traffic volume in the inter-router traffic storage unit 325.

The inter-router traffic storage unit 325 stores the estimated traffic volume regarding physical connection between routers in the network. For example, part of the storage area in the RAM included in the edge node 300 is used as the inter-router traffic storage unit 325.

The attraction update unit 326 calculates traffic attraction of each path to the second edge node on the basis of the estimated traffic volume regarding physical connection between routers. The attraction update unit 326 stores the traffic attraction of each path calculated in the attraction information storage unit 327.

The attraction information storage unit 327 stores the traffic attraction of each path regarding traffic with the destination of the second edge node. For example, part of the storage area in the RAM included in the edge node 300 is used as the attraction information storage unit 327.

When a packet with the destination of the second edge node in the network is inputted, the traffic control unit 330 refers to the attraction information storage unit 327 and selects a path to the destination on the basis of the traffic attraction of each path. The traffic control unit 330 then sets the identifier of a relay node on the path in the packet to be transmitted and transmits the packet via the path. This is the same with the third embodiment.

FIG. 37 illustrates an example of the structure of data in the inter-edge-node traffic storage unit. The inter-edge-node traffic storage unit 323 stores an inter-edge-node traffic management table 323a. The inter-edge-node traffic management table 323a includes Path, Source Edge Node, Destination Edge Node, and Traffic Volume columns.

An identifier for a path between edge nodes is set in the Path column. A transmission route (route information) corresponding to a path indicated by an identifier is defined in the attraction information storage unit 327.

The identifier of an edge node which is the source of traffic is set in the Source Edge Node column. The identifier of an edge node which is the destination of traffic is set in the Destination Edge Node column. The volume per unit time of traffic which is transmitted from an edge node set in the Source Edge Node column to an edge node set in the Destination Edge Node column is set in the Traffic Volume column.

A system administrator set information in advance in the Path, Source Edge Node, and Destination Edge Node columns. Logical topology is defined by the information set in the Source Edge Node and Destination Edge Node columns. Logical connection is associated with a physical transmission route by the identifier of a path corresponding to a source edge node and a destination edge node. The traffic measurement unit 321 and the traffic information sending-receiving unit 322 set information in the Traffic Volume column.

FIG. 38 illustrates an example of the structure of data in the inter-router traffic storage unit. The inter-router traffic storage unit 325 stores an inter-router traffic management table 325a. The inter-router traffic management table 325a includes Outflow Router, Inflow Router, Estimated Traffic Volume, Link Capacity, and Traffic Use Limit Value columns.

The identifier of a router (outflow router) out of which traffic is transmitted along a link between the router and another router is set in the Outflow Router column. The identifier of a router (inflow router) into which traffic that is transmitted out of an outflow router is set in the Inflow Router column. The estimated volume per unit time of traffic which is transmitted from an outflow router to an inflow router is set in the Estimated Traffic Volume column. The maximum value per unit time of traffic, which can be transmitted along a link from an outflow router to an inflow router, is set in the Link Capacity column. The limit value of the traffic usage of a link from an outflow router to an inflow router is set in the Traffic Use Limit Value column.

The system administrator set information in advance in the Outflow Router, Inflow Router, Link Capacity, and Traffic Use Limit Value columns of the inter-router traffic management table 325a. Physical topology is defined by the information set in the Outflow Router and Inflow Router columns. The traffic estimation unit 324 sets information in the Estimated Traffic Volume column.

Figure 39:
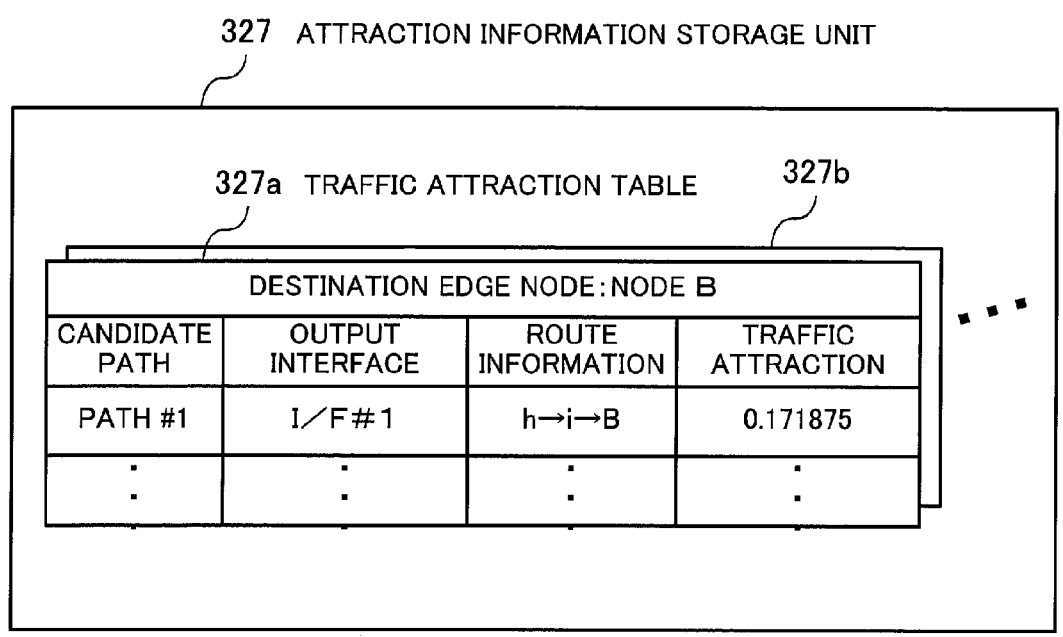
FIG. 39 illustrates an example of the structure of data in an attraction information storage unit.

FIG. 39 illustrates an example of the structure of data in the attraction information storage unit. The attraction information storage unit 327 stores traffic attraction tables 327a, 327b, and so on according to destination edge nodes. The identifier of a destination edge node is set in each of the traffic attraction tables 327a, 327b, and so on.

The traffic attraction table 327a includes Candidate Path, Output Interface, Route information, and Traffic Attraction columns.

The identifier of a path (candidate path) which can be selected as a transmission route to a destination edge node is set in the Candidate Path column. The identifier of a communication interface (output interface) connected to an adjacent router on a corresponding path is set in the Output Interface column. Rout information which shows the route of a corresponding path is set in the Route information column. Traffic attraction of a corresponding path is set in the Traffic Attraction column.

Each edge node in the network has the above structure. Each edge node calculates traffic attraction of a link between routers.

Figure 40:
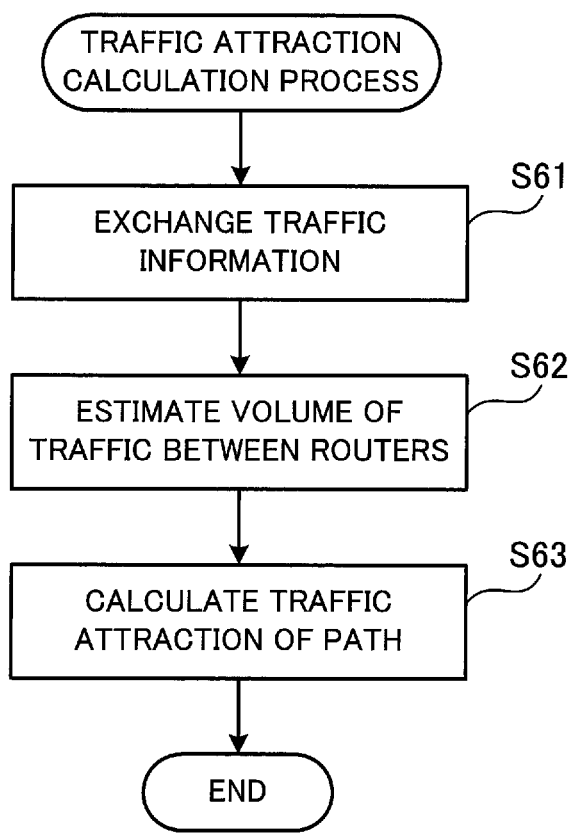
FIG. 40 is a flow chart of a procedure for a traffic attraction calculation process.

FIG. 40 is a flow chart of a procedure for a traffic attraction calculation process. The process illustrated in FIG. 40 will now be described in order of step number.

[Step S61] The traffic information sending-receiving unit 322 exchanges information which shows traffic volume according to paths with the second edge node. To be concrete, the traffic measurement unit 321 measures the volume of traffic between the edge node 300 and the second edge node periodically and stores the traffic volume in the inter-edge-node traffic storage unit 323. The traffic information sending-receiving unit 322 sends the second edge node the traffic information measured by the traffic measurement unit 321 of traffic information in the inter-edge-node traffic storage unit 323. In addition, when the traffic information sending-receiving unit 322 receives traffic information from the second edge node, the traffic information sending-receiving unit 322 updates the volume of traffic between the edge node 300 and the second edge node in the inter-edge-node traffic storage unit 323 on the basis of the received traffic information.

[Step S62] The traffic estimation unit 324 estimates the volume of traffic between routers. To be concrete, physical connection relations among routers (physical topology) and communication relations among edge nodes (logical topology) are defined in advance in the traffic estimation unit 324. The traffic estimation unit 324 refers to the inter-edge-node traffic storage unit 323 and estimates the volume of traffic which flows along a link between routers on the basis of traffic volume on each path.

[Step S63] The attraction update unit 326 refers to the inter-router traffic storage unit 325 and calculates traffic attraction of a path between routers according to destination edge nodes. To be concrete, the attraction update unit 326 selects one destination edge node. The attraction update unit 326 then calculates traffic attraction of the selected edge node by the use of formula (1) on the basis of the volume of traffic which is transmitted into the selected edge node. In addition, the attraction update unit 326 calculates traffic attraction corresponding to the volume of traffic which is transmitted in according to links connected to the selected edge node by the use of formulae (2) and (3).

The attraction update unit 326 then calculates traffic attraction of a router (relay node or an edge node) adjacent to the destination edge node. The attraction update unit 326 calculates the traffic attraction of the router adjacent to the destination edge node by the use of formula (4) on the basis of the traffic attraction according to the links connected to the destination edge node and the volume of traffic which is transmitted from the adjacent router connected by a link into the destination edge node. The attraction update unit 326 then calculates traffic attraction corresponding to the volume of traffic which is transmitted in according to links connected to the adjacent router by the use of formulae (5) and (6).

The attraction update unit 326 calculates the traffic attraction of each router. That is to say, the attraction update unit 326 first calculates the traffic attraction of the edge node selected as a destination, then calculates the traffic attraction of from the router adjacent to the destination edge node to a router adjacent to the edge node 300 in order, and then calculates traffic attraction of the edge node 300 itself. When the attraction update unit 326 acquires traffic attraction for a link between the edge node 300 and the adjacent router, the attraction update unit 326 associates the traffic attraction with a path (order of the routers selected) which the attraction update unit 326 follows before calculating the traffic attraction, and stores the traffic attraction in the attraction information storage unit 327.

Traffic attraction for each path to the second edge node can be calculated in this way.

Figure 41:
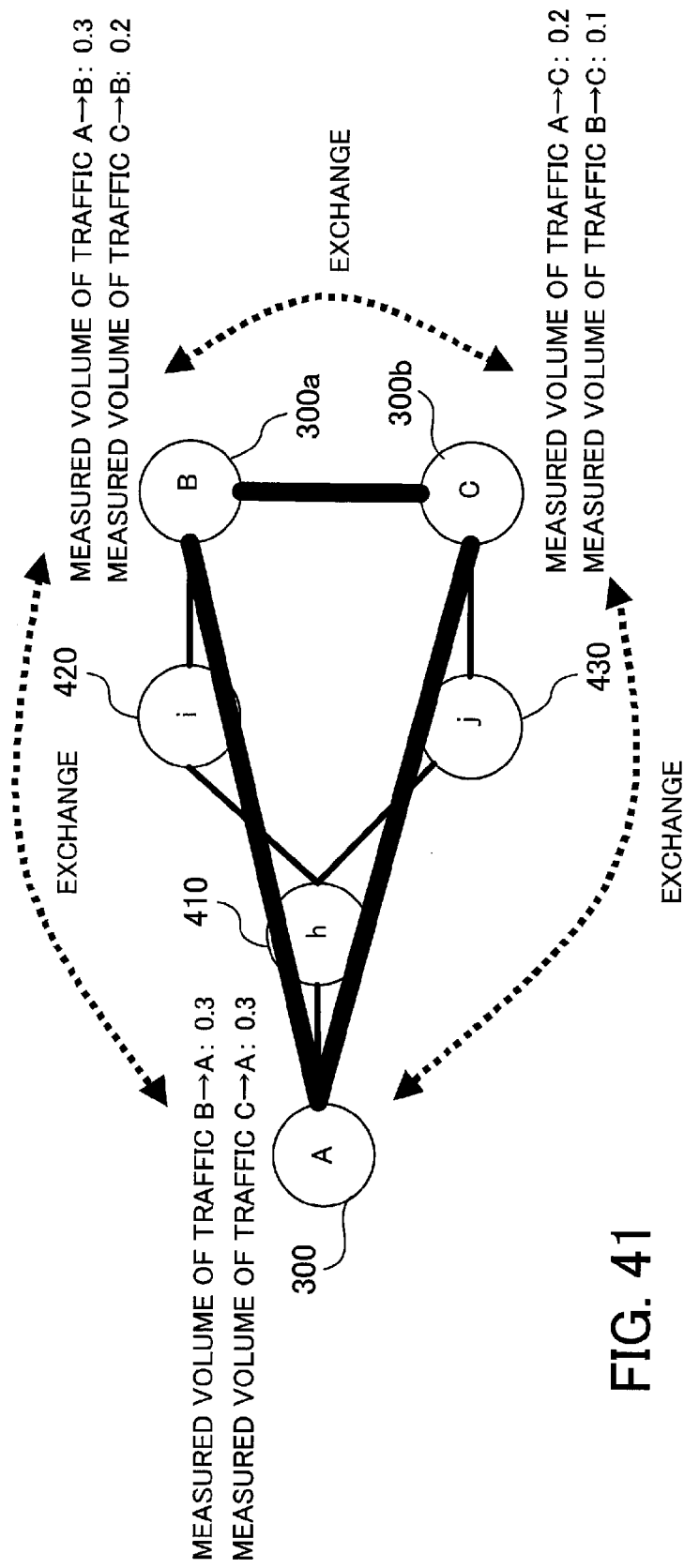
FIG. 41 illustrates the status of exchanging traffic information.

FIG. 41 illustrates the status of exchanging traffic information. FIG. 41 illustrates part of connection relations among three edge nodes 300, 300a, and 300b. That is to say, it is assumed that routes between the edge nodes 300, 300a, and 300b are not limited those illustrated in FIG. 41. In the example illustrated in FIG. 41, physical connection (link) between routers is indicated by a thin line and a logical connection relation (path) is indicated by a thick line. The identifiers of the edge nodes 300, 300a, and 300b and relay nodes 410, 420, and 430 are "A," "B," "C," "h," and "j" respectively.

There is a path via the relay nodes 410 and 420 between the edge nodes 300 and 300a. There is a path via the relay nodes 410 and 430 between the edge nodes 300 and 300b. There is a path via the relay nodes 410, 420, and 430 between the edge nodes 300a and 300b.

Each of the edge nodes 300, 300a, and 300b measures the volume of traffic which flows along each path. In the example illustrated in FIG. 41, it is assumed that the capacity of each link is 100 Mbps. Link traffic volume is indicated by the traffic usage to link capacity of each link. The edge nodes 300, 300a, and 300b exchange the traffic volume measured with one another. As a result, each of the edge nodes 300, 300a, and 300b can recognize the volume of two-way traffic on each path in a network.

Each of the edge nodes 300, 300a, and 300b estimates the volume of traffic (usage) between routers by applying the volume of traffic (usage) on each path to physical topology which is recognized in advance.

Figure 42:
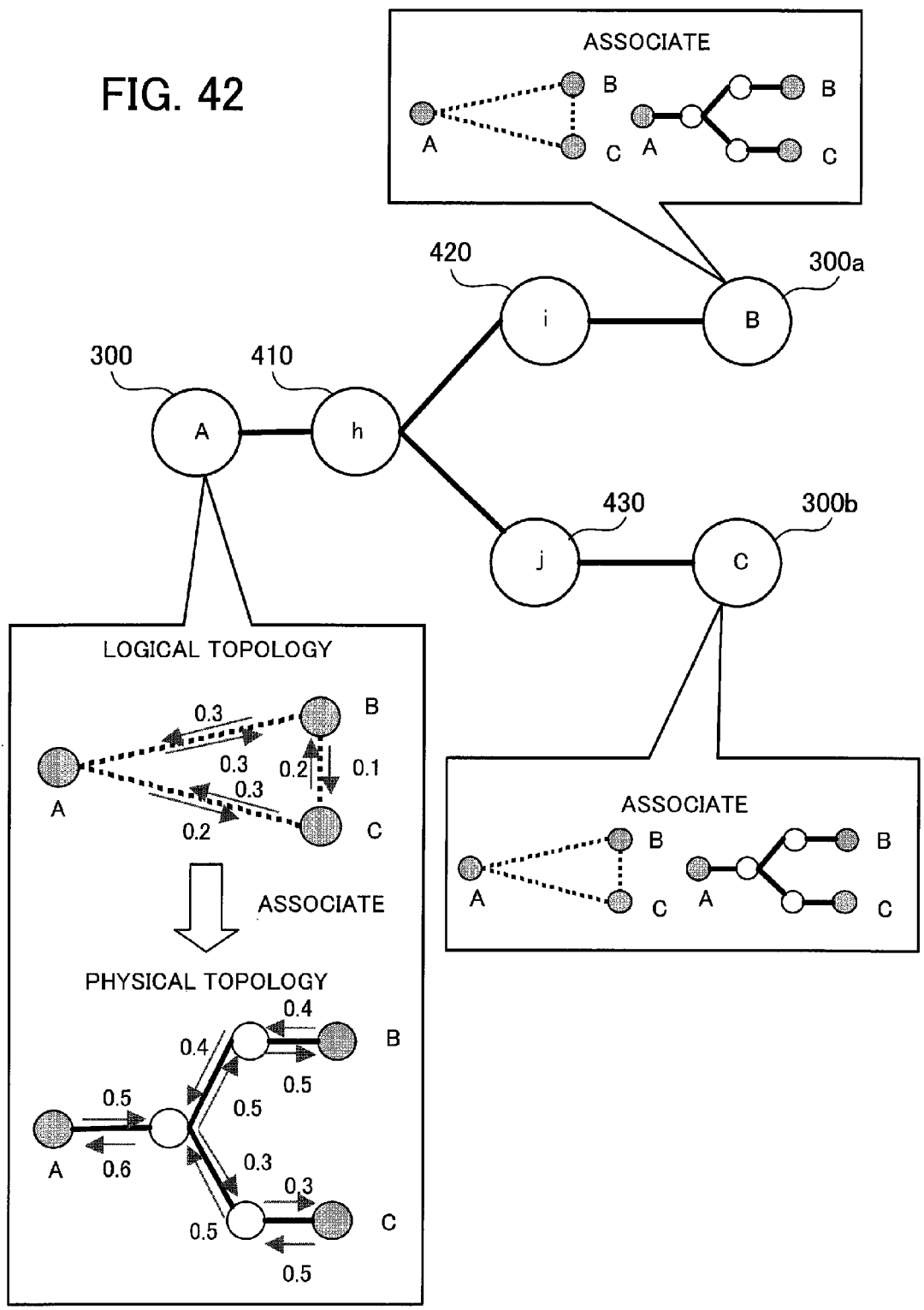
FIG. 42 illustrates the status of associating logical topology with physical topology.

FIG. 42 illustrates the status of associating logical topology with physical topology. In an associating process, traffic volume on logical paths is added. A value obtained by the addition is traffic volume on a link included in both physical routes corresponding to the logical paths.

For example, a path from the edge node 300 to the edge node 300a and a path from the edge node 300 to the edge node 300b use a link from the edge node 300 to the relay node 410. The volume of traffic on the path from the edge node 300 to the edge node 300a is 0.3 (30 Mbps). The volume of traffic on the path from the edge node 300 to the edge node 300b is 0.2 (20 Mbps). The total "0.5 (50 Mbps)" of the volume of traffic on these paths is the volume of traffic on the link from the edge node 300 to the relay node 410.

The same calculation is performed for all links. As a result, the edge node 300 can estimate the volume of two-way traffic on all the links. In addition, each of the edge nodes 300a and 300b performs the same calculation. Each of the edge nodes 300, 300a, and 300b performs the same calculation on the basis of traffic volume in the same logical topology, so the same result is obtained by associating them. That is to say, the edge nodes 300, 300a, and 300b share information regarding the volume of traffic on each physical link.

Traffic attraction for each path is then calculated on the basis of the volume of traffic on each link in the physical topology.

Figure 43:
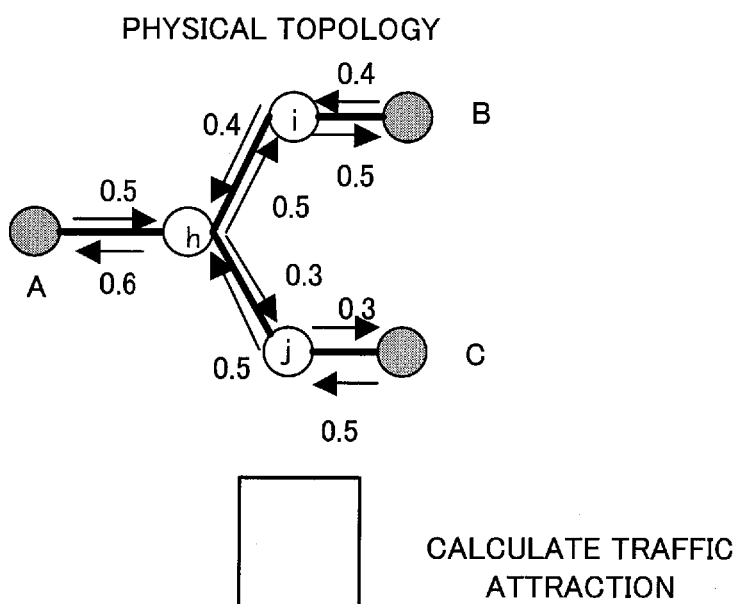
FIG. 43 illustrates an example of calculating traffic attraction.

FIG. 43 illustrates an example of calculating traffic attraction. FIG. 43 illustrates an example of calculating traffic attraction for the path from the edge node 300 to the edge node 300a. This calculation is performed by the attraction update unit 326 of the edge node 300.

The attraction update unit 326 first calculates traffic attraction for the edge node 300a which is a destination and which is "B" by the use of formula (1). As a result, the traffic attraction for the edge node 300a is "0.5."

The attraction update unit 326 then calculates traffic attraction for a link from the relay node 420 which is "i" to the edge node 300a by the use of formulae (2) and (3). As a result, the traffic attraction for the link from the relay node 420 to the edge node 300a is "0.25 (=0.5×0.5)."

The attraction update unit 326 then calculates traffic attraction for the relay node 420 by the use of formula (4). As a result, the traffic attraction of the relay node 420 is "0.375 (=Average{0.5, 0.25})."

The attraction update unit 326 then calculates traffic attraction for a link from the relay node 410 which is "h" to the relay node 420 by the use of formulae (5) and (6). As a result, the traffic attraction for the link from the relay node 410 to the relay node 420 is "0.1875 (=0.5×0.375)."

The attraction update unit 326 then calculates traffic attraction for the relay node 410 by the use of formulae (4). As a result, the traffic attraction for the relay node 410 is "0.34375 (=Average{0.5, 0.1875})."

The attraction update unit 326 then calculates traffic attraction for the link from the edge node 300 which is "A" to the relay node 410 by the use of formulae (5) and (6). As a result, the traffic attraction for the link from the edge node 300 to the relay node 410 is "0.171875 (=0.5×0.34375)." Accordingly, the edge node 300 recognizes that the traffic attraction for the route from the edge node 300 to the edge node 300a which is "B" is "0.171875."

After the traffic attraction of each path is calculated, each of the edge nodes 300, 300a, and 300b proportionally distributes traffic among paths according to the traffic attraction for each path. When each of the edge nodes 300, 300a, and 300b sends a packet, it sets route information which shows the route of a path in the packet and sends the packet. This is the same with the third embodiment. Each relay node recognizes a destination of the packet from the route information and transmits the packet along the route designated. As a result, the packet is transmitted via the path which an edge node at the sending end selects, and reaches a destination edge node.

Even if a relay node does not update control packet information, traffic can be distributed in this way according to the traffic attraction for paths between edge nodes. Traffic distribution control may be exercised by the use of an overlay routing method by which route control is exercised only by paths between edge nodes.

(Other Applications)

When a router is stopped, an adjacent router may hold information regarding an exchange of control packets made before then, and information regarding the possibility of a destination via a route along which traffic is not transmitted may be acquired from the adjacent router. In this case, the control packet propagation function of the stopped router can also be stopped. Even if a control packet is not transmitted from the router which is stopped, at this time the adjacent router determines that a transmission route via the router which is stopped continues to exist. As a result, for example, if congestion occurs on a transmission route via a router other than the router which is stopped, the sending of traffic to the router which is stopped can be begun quickly.

Traffic attraction can be determined not only according to traffic volume but also according to the power consumption of each router. In this case, power consumption efficiency (device power consumption/processing capacity) P of a node is reflected in traffic attraction determined according to traffic volume by the use of the formula:

$$\tau_p = \tau/P^\alpha \quad (29)$$

"$\tau_p$" is traffic attraction in which power consumption efficiency is reflected. "$\tau$" is traffic attraction in which power consumption efficiency is not reflected, and is calculated by the use of formula (1) or (4). "$\alpha$" is a weight parameter set in advance, and its value is positive. The smaller P grows, the higher the power consumption efficiency of a node becomes. The smaller P grows, the more powerful traffic attraction given by formula (29) becomes. That is to say, traffic can be assigned preferentially to a router which has the low power consumption. As a result, power consumption can be reduced.

Furthermore, route length in data transmission can be limited. For example, it is assumed that traffic attraction for each path is managed. If a hop count (number of routers through which a packet passes) on a path is greater than or equal to a predetermined number, then traffic attraction of this path is set to 0. This prevents a packet from being transmitted via an extremely roundabout transmission route.

In the third or fourth embodiment, an upper limit may be set on a hop count in control packet transmission. When a hop count in control packet transmission reaches the upper limit, further control packet transmission can be terminated. In this case, the presence of a route is not recognized between edge nodes the distance between which exceeds the upper limit of a hop count. This prevents each edge node from autonomously generating an extremely long transmission route.

The above functions can be realized with a computer. In this case, a program in which the contents of the functions each router (edge node or a relay node) should have are described is provided. By executing this program on the computer, the above functions are realized on the computer. This program can be recorded on a computer readable record medium. A computer readable record medium can be a magnetic recording device, an optical disk, a magneto-optical recording medium, a semiconductor memory, or the like. A magnetic recording device can be a hard disk drive (HDD), a flexible disk (FD), a magnetic tape, or the like. An optical disk can be a DVD, a DVD-RAM, a CD-ROM/RW, or the like. A magneto-optical recording medium can be a magneto-optical disk (MO) or the like.

To place the program on the market, portable record media, such as DVDs or CD-ROMs, on which it is recorded are sold. Alternatively, the program is stored in advance on a hard disk in a server computer and is transferred from the server computer to another computer via a network.

When the computer executes this program, it will store the program, which is recorded on a portable record medium or which is transferred from the server computer, on, for example, its hard disk. Then the computer reads the program from its hard disk and performs processes in compliance with the program. The computer can also read the program directly from a portable record medium and perform processes in compliance with the program. Furthermore, each time the program is transferred from the server computer, the computer can perform processes in turn in compliance with the program it receives.

The above router can limit traffic to be sent to a route via an adjacent router on which the volume of traffic is high by autonomous control.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that various changes, substitutions and alterations could be made hereto without departing from the spirit and scope of the invention.

What is claimed is:

1. A data transmission apparatus comprising:
   a plurality of communication interfaces;
   a memory; and
   one or more processors to perform a procedure including:
   acquiring first attraction values corresponding to volume of traffic relayed by adjacent nodes connected via each of the plurality of communication interfaces from the adjacent nodes, each of the first attraction values becoming larger with increase in corresponding traffic volume;
   associating the first attraction values with the plurality of communication interfaces connected to the adjacent nodes;
   storing the first attraction values in the memory;
   distributing, in the case of a plurality of packets with a same destination being inputted, the plurality of packets inputted among communication interfaces connected to transmission routes to the destination so that a higher volume of traffic is sent to a communication interface with which a larger first attraction value of the first attraction values in the memory is associated; and
   sending the plurality of packets via the communication interfaces.

2. The data transmission apparatus according to claim 1, wherein the procedure further includes, when alarm information indicative of a possibility of congestion is inputted from an adjacent node, reducing volume of traffic to be sent from a communication interface connected to the adjacent node.

3. The data transmission apparatus according to claim 1, wherein the procedure further includes:
   periodically calculating a self-attraction value that becomes larger with an increase in volume of traffic which is transmitted in on the basis of volume of traffic which is transmitted into the plurality of communication interfaces; and
   sending the self-attraction value via the plurality of communication interfaces.

4. The data transmission apparatus according to claim 1, wherein the procedure further includes weighting a first attraction value acquired according to volume of traffic sent via a communication interface connected to an adjacent node which has sent the first attraction value, associating the weighted first attraction value with the communication interface connected to the adjacent node, and wherein the storing stores the weighted first attraction value in the memory.

5. The data transmission apparatus according to claim 1, wherein the procedure further includes:
   generating a second attraction value on the basis of a first attraction value acquired via a first communication interface and volume of traffic which is transmitted into the plurality of communication interfaces; and sending the generated second attraction value via a second communication interface other than the first communication interface.

6. The data transmission apparatus according to claim 5, wherein the procedure further includes calculating a self-attraction value according to volume of traffic which is transmitted in from each of the plurality of communication interfaces, and wherein the generating generates the second attraction value so that the second attraction value becomes larger with an increase in the self-attraction value.

7. The data transmission apparatus according to claim 5, wherein the generating generates the second attraction value so that the second attraction value becomes larger with a decrease in power consumption of the data transmission apparatus itself.

8. The data transmission apparatus according to claim 5, wherein the procedure further includes acquiring, from the adjacent node, route information to indicate a route along which the first attraction value was propagated, adding an identifier of the data transmission apparatus to the route information, and sending the route information including the identifier via the second communication interface.

9. The data transmission apparatus according to claim 1, wherein the distributing proportionally distributes the plurality of packets among the communication interfaces connected to the transmission routes to the destination according to the first attraction values associated with the communication interfaces.

10. The data transmission apparatus according to claim 1, wherein the distributing ranks the communication interfaces connected to the transmission routes to the destination according to the first attraction values associated with the communication interfaces, and assigns the plurality of packets preferentially to a communication interface which ranks first.

11. The data transmission apparatus according to claim 1, wherein:
the acquiring acquires the first attraction values corresponding to volume of traffic addressed to the same destination from the adjacent nodes, and associates the first attraction values with the destination; and
the distributing distributes the plurality of packets with the destination inputted among the communication interfaces on the basis of the first attraction values corresponding to the destination of the plurality of packets inputted.

12. The data transmission apparatus according to claim 1, wherein:
the acquiring acquires first attraction values according to transmission routes to a traffic destination from the adjacent node, associates the first attraction values with the traffic destination and the transmission routes, and stores the first attraction values in the memory; and
the distributing distributes the plurality of packets inputted among the transmission routes to the destination of the plurality of packets inputted on the basis of the first attraction values according to the transmission routes to the destination of the plurality of packets inputted, adds route information indicative of the transmission routes to the plurality of packets, and sends the plurality of packets via the communication interfaces connected to the transmission routes.

13. The data transmission apparatus according to claim 1, wherein the procedure further includes stopping the distributing in the case of traffic not flowing into the plurality of communication interfaces for a predetermined period of time.

14. A data transmission apparatus comprising:
a plurality of communication interfaces;
a memory; and
one or more processors to perform a procedure including:
measuring traffic volume on each transmission route between the data transmission apparatus and one or more nodes in a network;
storing the measured traffic volume in the memory;
acquiring traffic volume on each transmission route between the nodes that the nodes measure from one another;
storing the acquired traffic volume in the memory;
estimating traffic volume between nodes arranged on a transmission route on the basis of the measured traffic volume and the acquired traffic volume on each transmission route stored in the memory;
calculating an attraction value of each transmission route between the data transmission apparatus and the one or more nodes that becomes larger with an increase in traffic volume on the basis of the estimated traffic volume between nodes;
distributing, in the case of a plurality of packets with a same destination being inputted, the plurality of packets inputted among transmission routes to the destination so that a higher volume of traffic is sent to a transmission route associated with a larger attraction value in the calculated attraction values; and
sending the plurality of packets via the transmission routes.

15. A computer readable, non-transitory medium on which a program is recorded, the program making a computer which includes a plurality of communication interfaces perform a process, the process comprising:
acquiring attraction values corresponding to volume of traffic relayed by adjacent nodes connected via each of the plurality of communication interfaces from the adjacent nodes, each of the attraction values becoming larger with increase in corresponding traffic volume;
associating the attraction values with the plurality of communication interfaces connected to the adjacent nodes;
storing the attraction values in a memory;
referring to the memory, distributing, in the case of a plurality of packets with a same destination being inputted, the plurality of packets inputted among communication interfaces connected to transmission routes to the destination so that a higher volume of traffic is sent to a communication interface with which a larger attraction value of the attraction values is associated; and
sending the plurality of packets via the communication interfaces.

* * * * *